United States Patent
Zhu et al.

(10) Patent No.: US 12,451,949 B2
(45) Date of Patent: Oct. 21, 2025

(54) METHOD AND APPARATUS FOR RECOVERING BEAM FAILURE IN A WIRELESS COMMUNICATIONS SYSTEM

(71) Applicant: Samsung Electronics Co., Ltd., Suwon-si (KR)

(72) Inventors: Dalin Zhu, Richardson, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 404 days.

(21) Appl. No.: 17/661,714

(22) Filed: May 2, 2022

(65) Prior Publication Data

US 2022/0360314 A1    Nov. 10, 2022

Related U.S. Application Data

(60) Provisional application No. 63/317,778, filed on Mar. 8, 2022, provisional application No. 63/316,272, filed
(Continued)

(51) Int. Cl.
*H04B 7/06* (2006.01)
*H04L 5/00* (2006.01)
(Continued)

(52) U.S. Cl.
CPC ......... *H04B 7/0695* (2013.01); *H04L 5/0051* (2013.01); *H04W 72/02* (2013.01); *H04W 76/19* (2018.02); *H04W 80/02* (2013.01)

(58) Field of Classification Search
CPC ..... H04B 7/0695; H04W 76/19; H04L 5/0051
See application file for complete search history.

(56) References Cited

U.S. PATENT DOCUMENTS

2021/0051754 A1  2/2021 Zhou et al.
2021/0058805 A1* 2/2021 Ji ..................... H04W 24/04
(Continued)

FOREIGN PATENT DOCUMENTS

CN  114765498 A * 7/2022 ............ H04W 72/23
WO  2021034672 A1  2/2021

OTHER PUBLICATIONS

International Search Report and Written Opinion issued Aug. 9, 2022 regarding International Application No. PCT/KR2022/006581, 7 pages.
Ericsson, "On beam management enhancements for simultaneous multi-TRP transmission with multi-panel reception", 3GPP TSG-RAN WG1 Meeting #104bis-e, R1-2103545, Apr. 2021, 8 pages.
Nokia et al., "Enhancements on Beam Management for Multi-TRP/Panel Transmission", 3GPP TSG RAN WG1 #104bis-e, R1-2103368, Apr. 2021, 11 pages.
(Continued)

*Primary Examiner* — Derrick V Rose

(57) ABSTRACT

Methods and apparatus for beam failure recovery in a wireless communication system. A method of operating a user equipment (UE) is includes receiving, in a radio resource control (RRC) signaling, a pool of one or more reference signal (RS) resource indexes for a beam failure detection RS (BFD-RS) configuration; receiving a medium access control control element (MAC CE) command for BFD-RS activation; and receiving a control resource set (CORESET) with one or two transmission configuration information (TCI) states. The method further includes determining, based on the MAC CE command, a first set of one or more RS resource indexes for beam failure detection and determining, based on the one or two TCI states for the CORESET, one or more RS resource indexes in a second set of one or more RS resource indexes for beam failure detection.

15 Claims, 13 Drawing Sheets

Related U.S. Application Data on Mar. 3, 2022, provisional application No. 63/279,445, filed on Nov. 15, 2021, provisional application No. 63/186,579, filed on May 10, 2021.

(51) Int. Cl.
*H04W 72/02* (2009.01)
*H04W 76/19* (2018.01)
*H04W 80/02* (2009.01)

(56) References Cited

U.S. PATENT DOCUMENTS

| | | | | |
|---|---|---|---|---|
| 2021/0351975 | A1* | 11/2021 | Matsumura | H04L 27/261 |
| 2022/0109547 | A1* | 4/2022 | Svedman | H04L 5/0091 |
| 2023/0144010 | A1* | 5/2023 | Kwak | H04W 74/0833 370/329 |
| 2023/0180033 | A1* | 6/2023 | Cirik | H04W 24/08 |
| 2023/0284235 | A1* | 9/2023 | Gao | H04W 72/23 370/329 |
| 2023/0413077 | A1* | 12/2023 | Määttänen | H04W 24/08 |
| 2023/0422111 | A1* | 12/2023 | Da Silva | H04W 36/0072 |
| 2024/0048215 | A1* | 2/2024 | Yuan | H04L 5/0048 |
| 2024/0214142 | A1* | 6/2024 | Muruganathan | H04L 5/0048 |

OTHER PUBLICATIONS

ZTE, "Enhancements on beam management for multi-TRP", 3GPP TSG RAN WG1 Meeting #104bis-e, R1-2102663, Apr. 2021, 17 pages.

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

* cited by examiner

METHOD AND APPARATUS FOR RECOVERING BEAM FAILURE IN A WIRELESS COMMUNICATIONS SYSTEM

CROSS-REFERENCE TO RELATED APPLICATIONS AND CLAIM OF PRIORITY

The present application claims priority to:
U.S. Provisional Patent Application No. 63/186,579, filed on May 10, 2021;
U.S. Provisional Patent Application No. 63/279,445, filed on Nov. 15, 2021;
U.S. Provisional Patent Application No. 63/316,272, filed on Mar. 3, 2022; and
U.S. Provisional Patent Application No. 63/317,778, filed on Mar. 8, 2022. The content of the above-identified patent documents is incorporated herein by reference.

TECHNICAL FIELD

The present disclosure relates generally to wireless communication systems and, more specifically, the present disclosure relates to a beam failure recovery in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a beam failure recovery in a wireless communication system.

In one embodiment, a user equipment (UE) is provided. The UE includes a transceiver configured to receive, in a radio resource control (RRC) signaling, a pool of one or more reference signal (RS) resource indexes for a beam failure detection RS (BFD-RS) configuration; receive a medium access control control element (MAC CE) command for BFD-RS activation; and receive a control resource set (CORESET) with one or two transmission configuration information (TCI) states. The UE further includes a processor operably coupled to the transceiver. The processor is configured to determine, based on the MAC CE command, a first set of one or more RS resource indexes for beam failure detection; and determine, based on the one or two TCI states for the CORESET, one or more RS resource indexes in a second set of one or more RS resource indexes for beam failure detection. A RS resource index in the first or second sets corresponds to a synchronization signal block (SSB) resource index or a channel state information RS (CSI-RS) resource configuration index.

In another embodiment, a base station (BS) is provided. The BS includes a transceiver configured to: transmit, in a RRC signaling, a pool of one or more RS resource indexes for a BFD-RS configuration; transmit a MAC CE command for BFD-RS activation to indicate a first set of one or more RS resource indexes for beam failure detection; and transmit a CORESET with one or two TCI states to indicate one or more RS resource indexes in a second set of one or more RS resource indexes for beam failure detection. A RS resource index in the first or second sets corresponds to a SSB resource index or a CSIRS resource configuration index.

In yet another embodiment, a method of operating a UE is provided. The method includes receiving, in a RRC signaling, a pool of one or more RS resource indexes for a BFD-RS configuration; receiving a MAC CE command for BFD-RS activation; and receiving a CORESET with one or two TCI states. The method further includes determining, based on the MAC CE command, a first set of one or more RS resource indexes for beam failure detection and determining, based on the one or two TCI states for the CORESET, one or more RS resource indexes in a second set of one or more RS resource indexes for beam failure detection. A RS resource index in the first or second sets corresponds to a SSB resource index or a CSI-RS resource configuration index.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
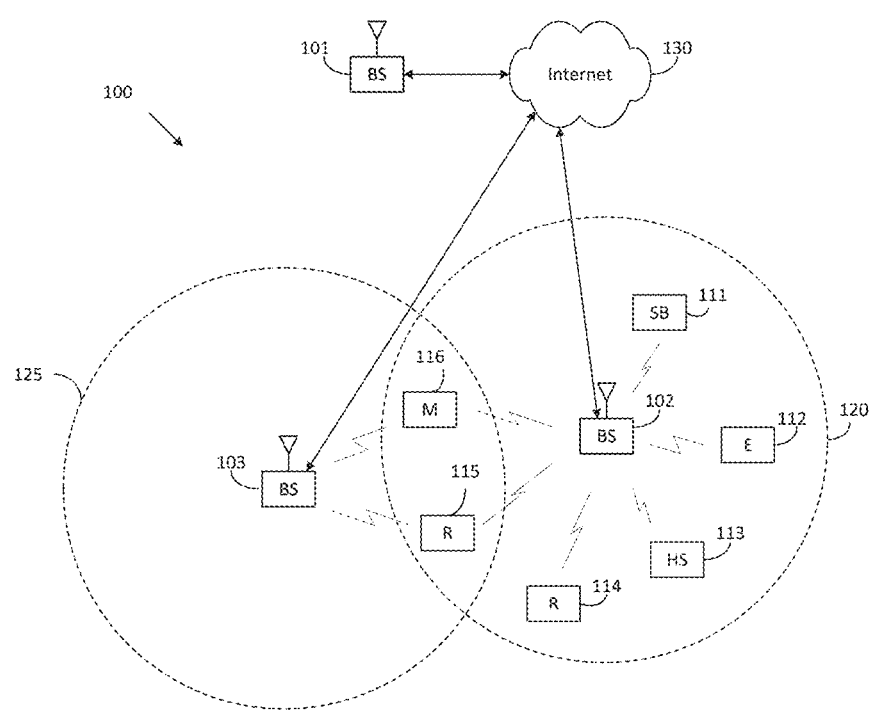
FIG. 1 illustrates an example of wireless network according to embodiments of the present disclosure.
Figure 2:
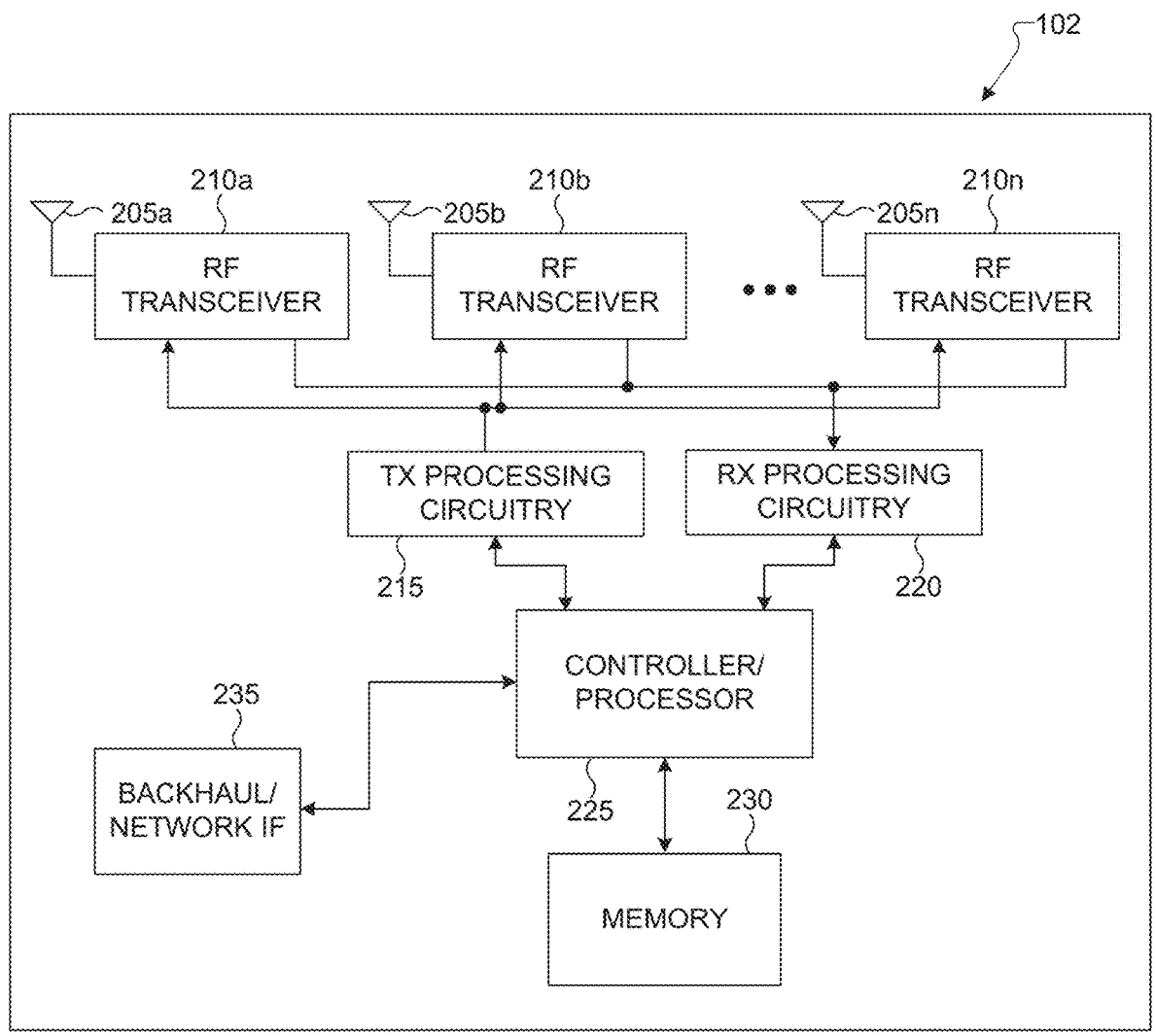
FIG. 2 illustrates an example of gNB according to embodiments of the present disclosure.
Figure 3:
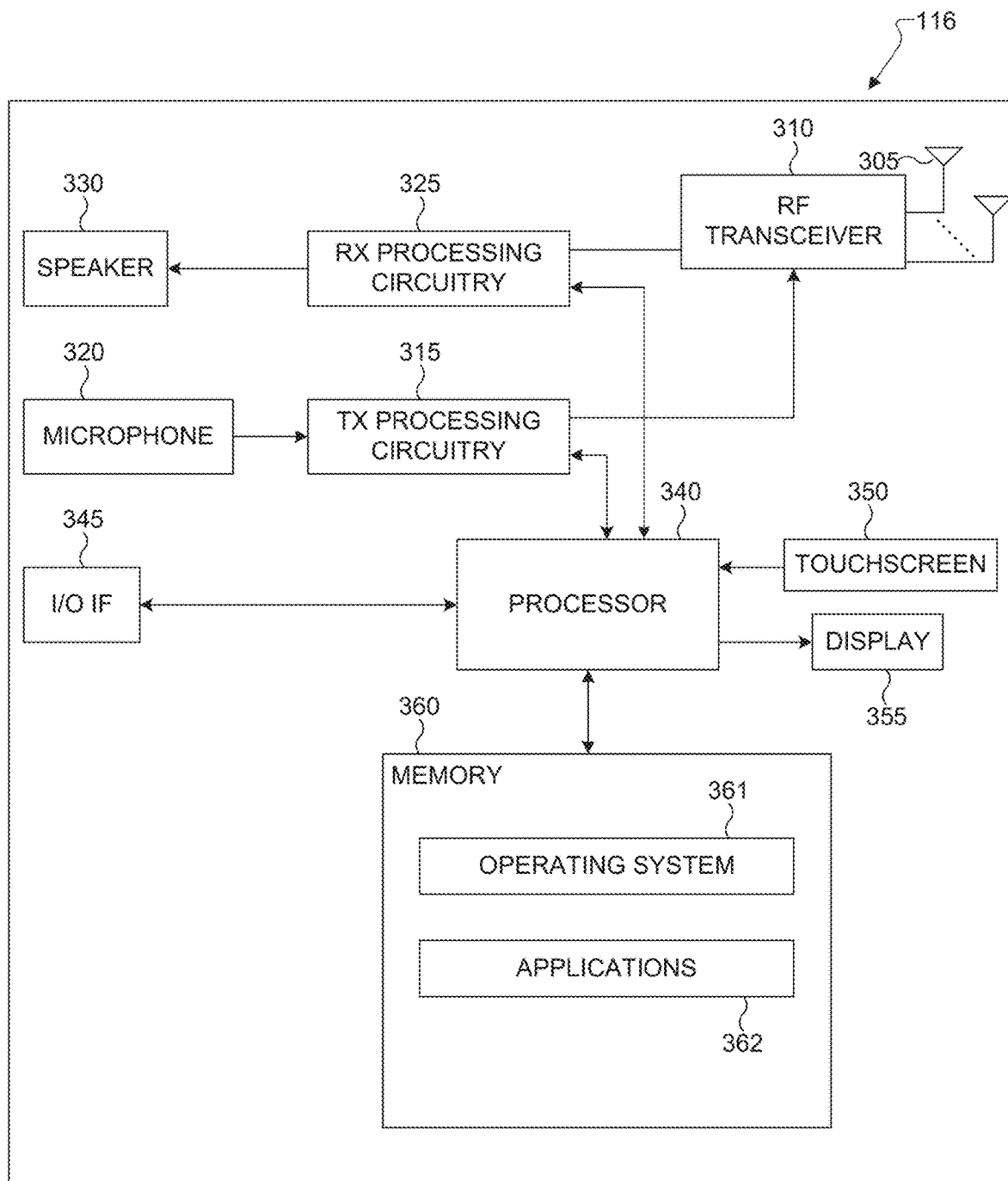
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for a beam failure recovery in a wireless communication system. In certain embodiments, and one or more of the gNBs 101-103 includes circuitry, programming, or a combination thereof, for a beam failure recovery in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a beam failure recovery in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a beam failure recovery in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
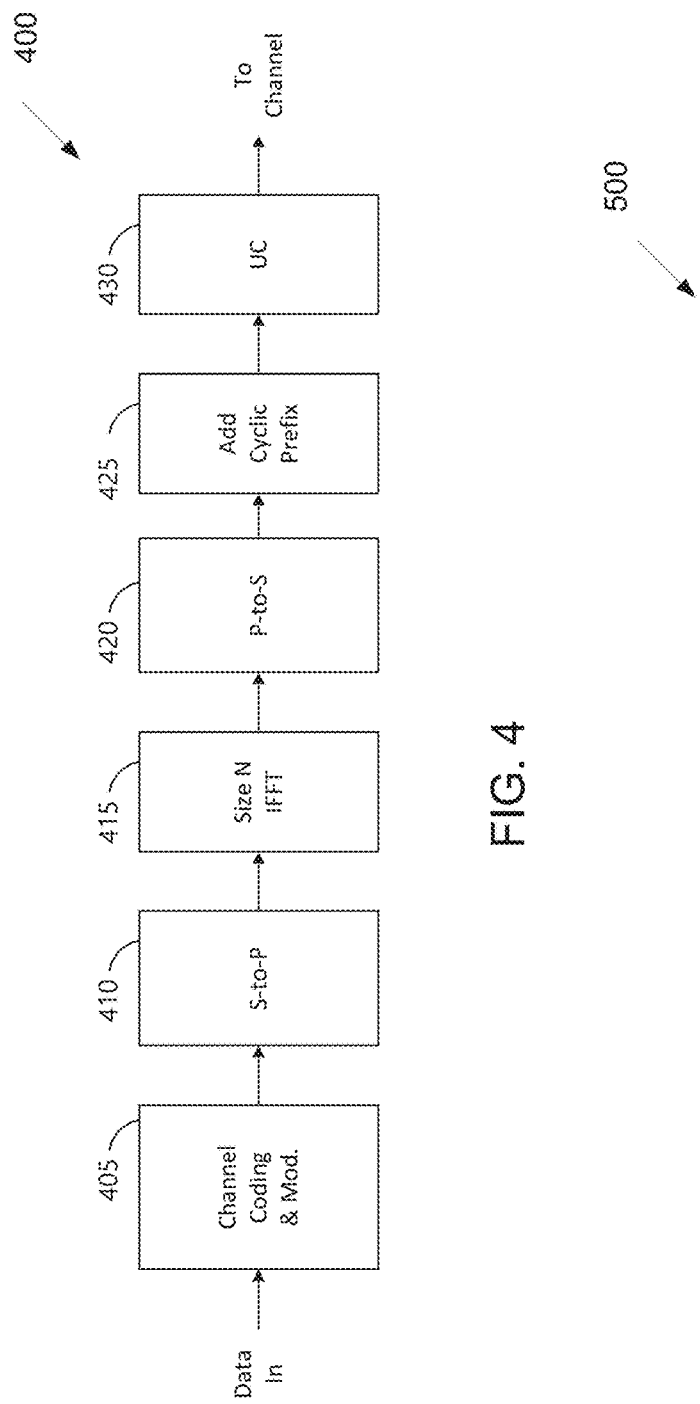
FIGS. 4 and 5 illustrate example of wireless transmit and receive paths according to this disclosure.
Figure 5:
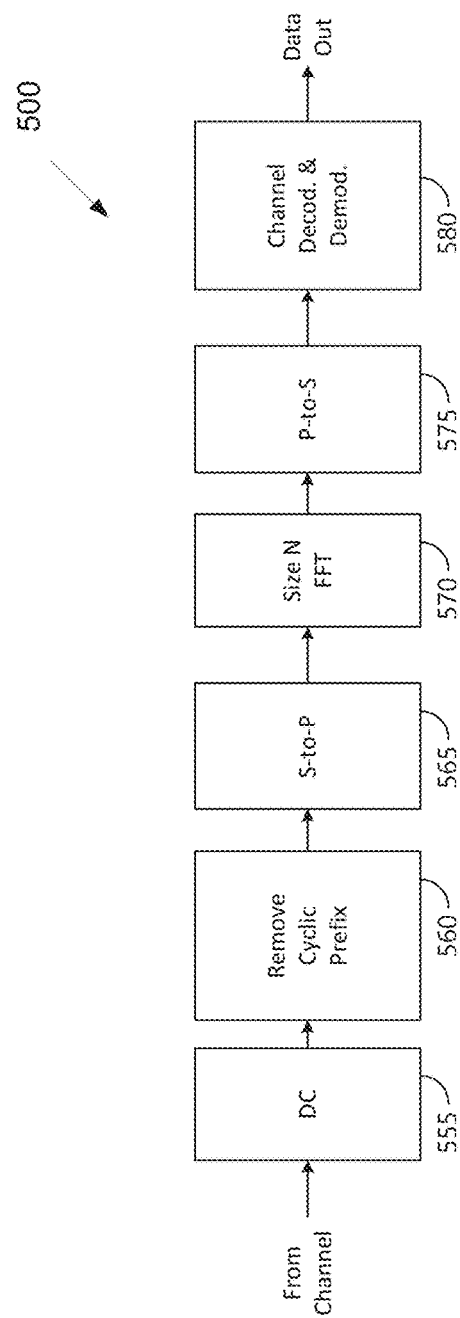

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol.

The gNB can configure the UE to transmit signals on a cell within an UL BWP of the cell UL BW.

UCI includes hybrid automatic repeat request acknowledgment (HARQ-ACK) information, indicating correct or incorrect detection of data transport blocks (TB s) in a PDSCH, scheduling request (SR) indicating whether a UE has data in its buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., SSB and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Figure 6A:
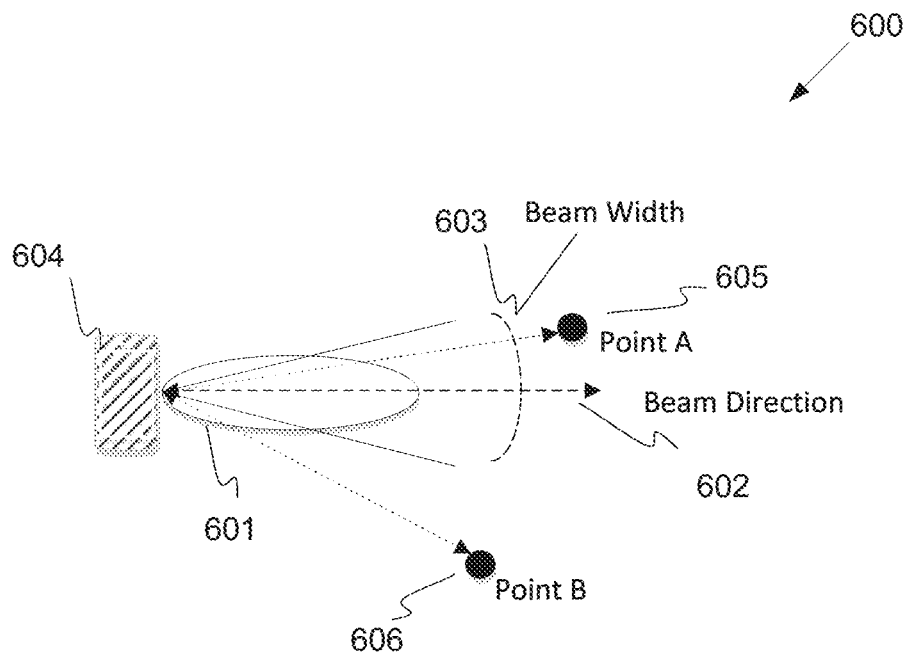
FIG. 6A illustrates an example of wireless system beam according to embodiments of the present disclosure.

FIG. 6A illustrates an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
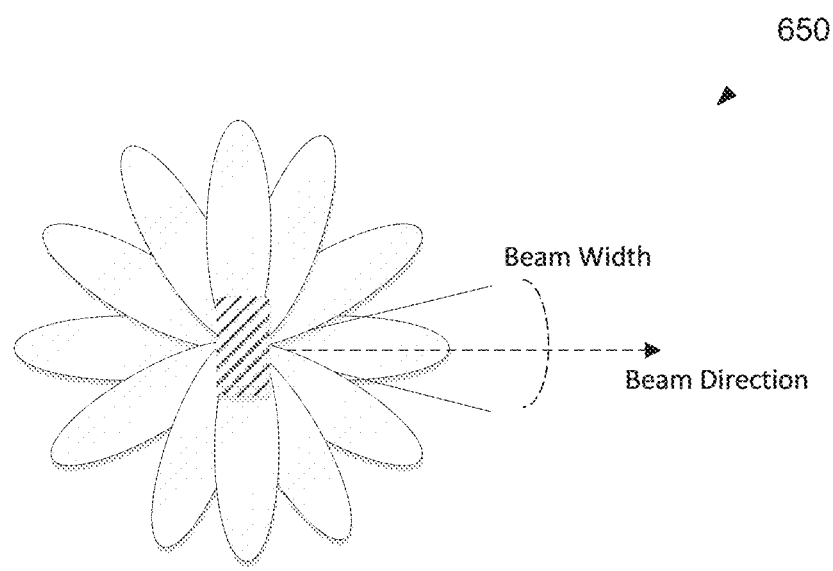
FIG. 6B illustrates an example of multi-beam operation according to embodiments of the present disclosure.

FIG. 6B illustrates an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
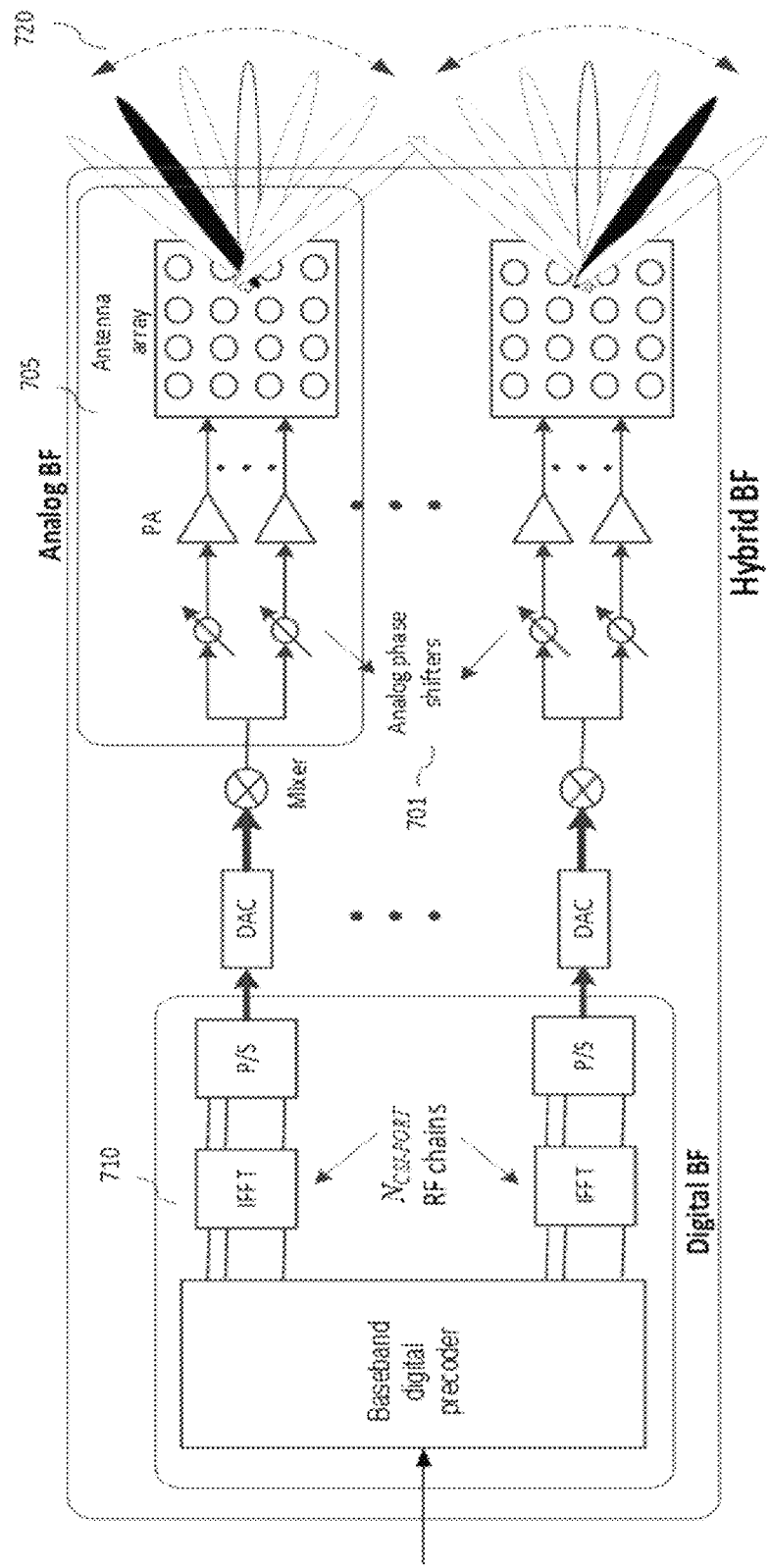
FIG. 7 illustrates an example of antenna structure according to embodiments of the present disclosure.

FIG. 7 illustrates an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

In a wireless communications system, a radio link failure (RLF) could occur if a significant/sudden link quality drop is observed at the UE side. If a RLF occurs, fast RLF recovery mechanisms, therefore, become essential to promptly re-establish the communication link(s) and avoid severe service interruption. At higher frequencies, e.g., millimeter-wave (mmWave) frequencies or FR2 in the 3GPP NR, both the transmitter and receiver could use directional (analog) beams to transmit and receive data/control signals. Hence, prior to declaring a full RLF, the UE could first detect and recover a potential beam failure if the signal qualities/strengths of certain beam pair links (BPLs) are below a certain threshold for a certain period of time.

Figure 8A:
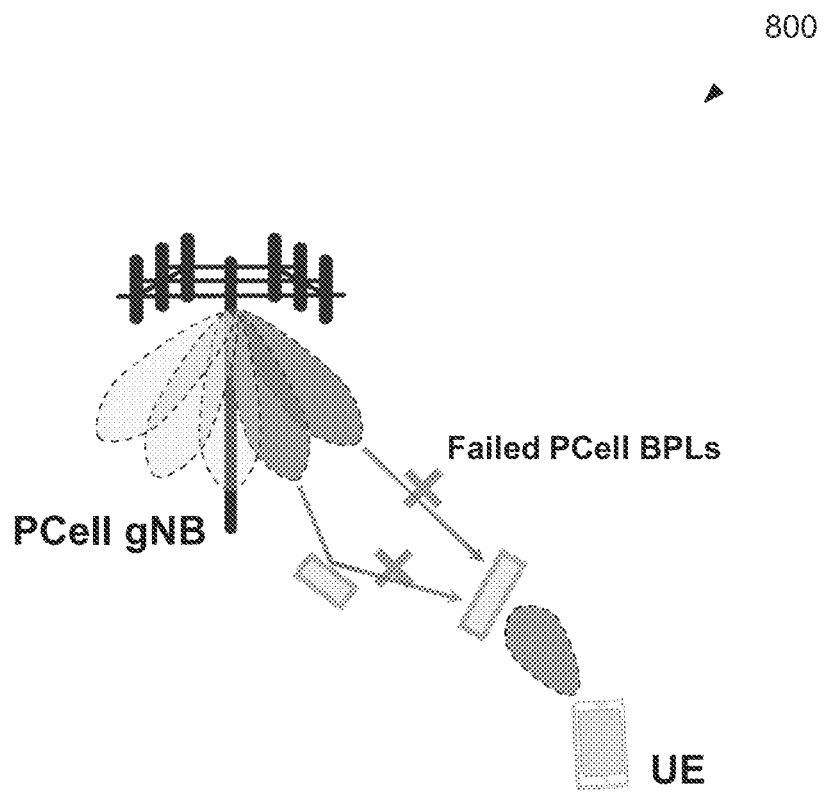
FIG. 8A illustrates an example of beam failure for a primary cell according to embodiments of the present disclosure.

FIG. 8A illustrates an example of beam failure 800 for a primary cell according to embodiments of the present disclosure. An embodiment of the beam failure 800 for the primary cell shown in FIG. 8A is for illustration only.

Figure 8B:
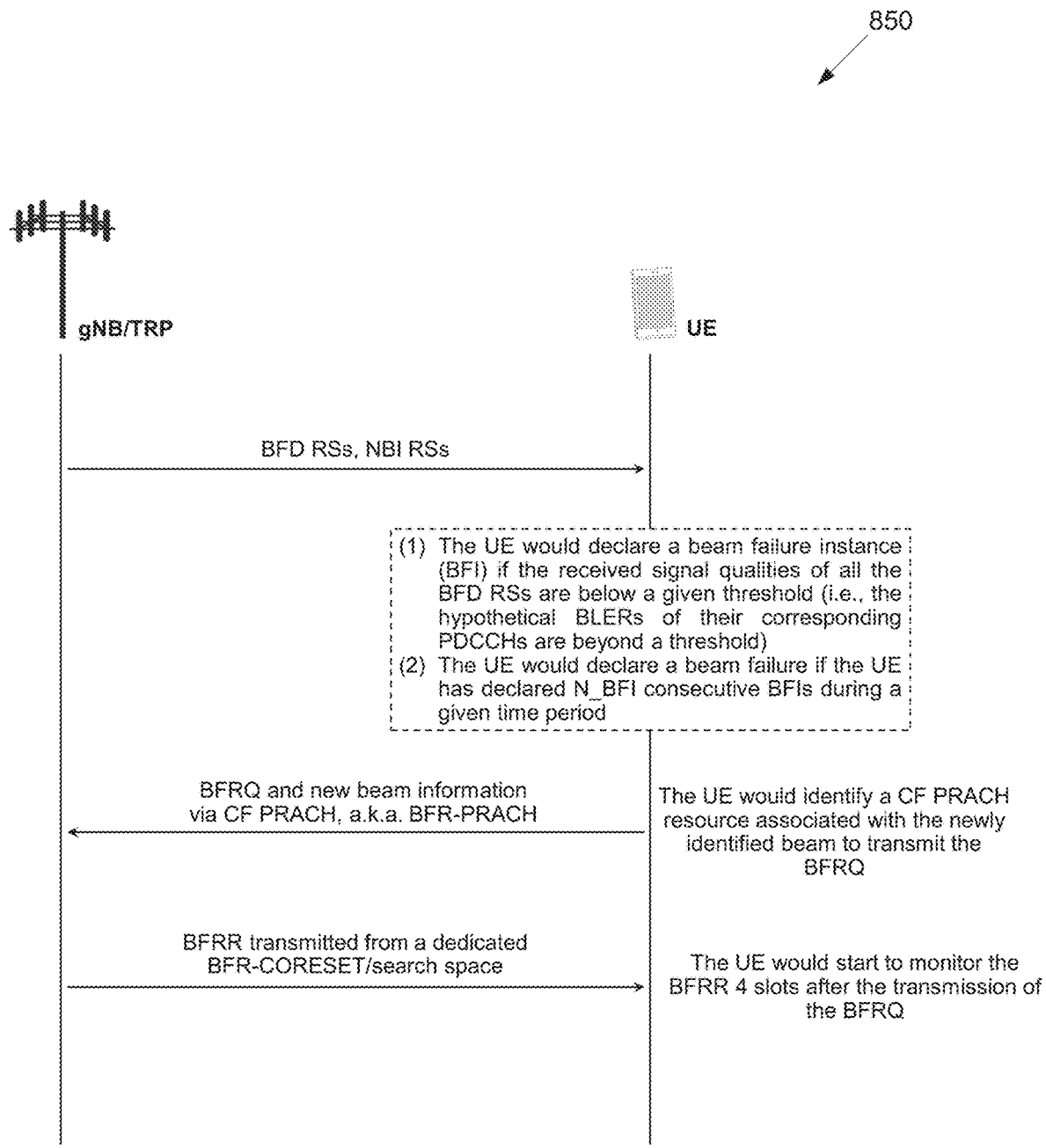
FIG. 8B illustrates a signaling flow of UE and gNB for a primary cell beam failure recovery according to embodiments of the present disclosure.

The 3GPP Rel. 15 beam failure recovery (BFR) procedure mainly targets for a primary cell (PCell or SpCell) under the carrier aggregation (CA) framework as illustrated in FIG. 8A. The BFR procedure in the 3GPP Rel. 15 includes the following key components, which are also depicted in FIG. 8B: (1) a beam failure detection (BFD); (2) a new beam identification (NBI); (3) a BFR request (BFRQ); and (4) BFRQ response (BFRR).

FIG. 8B illustrates a signaling flow of UE and gNB for a primary cell beam failure recovery 850 according to embodiments of the present disclosure. The signaling flow of UE and gNB for the primary cell beam failure recovery 850 as may be performed by a UE (e.g., 111-116 as illustrated in FIG. 1) and a BS (e.g., 101-103 as illustrated in FIG. 1). An embodiment of the signaling flow of UE and gNB for the primary cell beam failure recovery 850 shown in FIG. 8B is for illustration only. One or more of the components illustrated in FIG. 8B can be implemented in specialized circuitry configured to perform the noted functions or one or more of the components can be implemented by one or more processors executing instructions to perform the noted functions.

As can be seen from FIG. 8B, the UE is first configured by the gNB a set of BFD RS resources to monitor the link qualities between the gNB and the UE. For example, one BFD RS resource could correspond to one (periodic) CSI-RS/SSB resource configured as a QCL-typeD (spatial quasi-co-location) RS in a TCI state of a control resource set (CORESET). If the received signal qualities of all the BFD RS resources are below a given threshold (implying that the hypothetical BLERs of the corresponding CORESETs/PDCCHs are above a given threshold), the UE could declare a beam failure instance (BFI). If the UE has declared a predefined number of consecutive BFIs within a given time period, the UE may declare a beam failure.

After declaring/detecting the beam failure, the UE may transmit the BFRQ to the gNB via a contention-free (CF) PRACH (CF BFR-PRACH) resource, whose index is associated with a new beam identified by the UE. Specifically, to determine a potential new beam, the UE could be first configured by the network a set of SSB and/or CSI-RS resources (NBI RS resources), e.g., through the higher layer parameter candidateBeamRSList. The UE may then measure the NBI RSs and calculate their corresponding beam metrics such as L1-RSRPs. If at least one of the measured L1-RSRPs of the NBI RSs is beyond a given threshold, the UE may select the beam that corresponds to the NBI RS with the highest L1-RSRP as the new beam.

To determine a CF BFR-PRACH resource to carry the BFRQ, the UE could be first configured by the network a set of PRACH resources, each associated with/corresponding to a NBI RS resource. The UE could then select the PRACH resource that has the one-to-one correspondence to the selected NBI RS resource (the new beam) to send the BFRQ to the gNB. From the index of the selected CF PRACH resource, the gNB could know which beam is selected by the UE as the new beam.

Four slots after the UE has transmitted the BFRQ, the UE could start to monitor a dedicated CORESET/search space for BFRQ response. The dedicated CORESET is addressed to the UE-specific C-RNTI and may be transmitted by the gNB with the newly identified beam. If the UE detects a valid UE-specific DCI in the dedicated CORESET for BFRR, the UE may assume that the beam failure recovery request has been successfully received by the network, and the UE may complete the BFR process. Otherwise, if the UE does not receive the BFRR within a configured time window, the UE may initiate a contention based (CB) random access (RA) process to reconnect to the network.

Figure 9A:
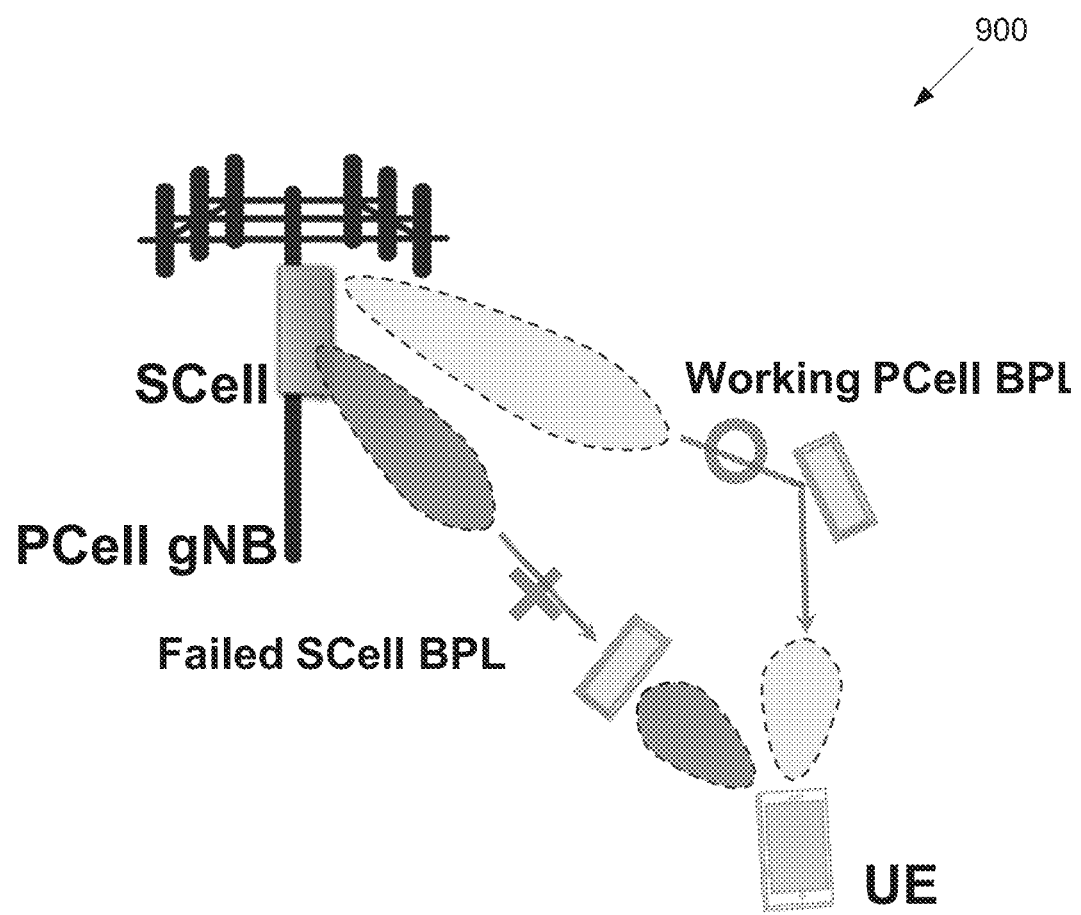
FIG. 9A illustrates an example of beam failure for a secondary cell according to embodiments of the present disclosure.

FIG. 9A illustrates an example of beam failure 900 for a secondary cell according to embodiments of the present disclosure. An embodiment of the beam failure 900 for the secondary cell shown in FIG. 9A is for illustration only.

Figure 9B:
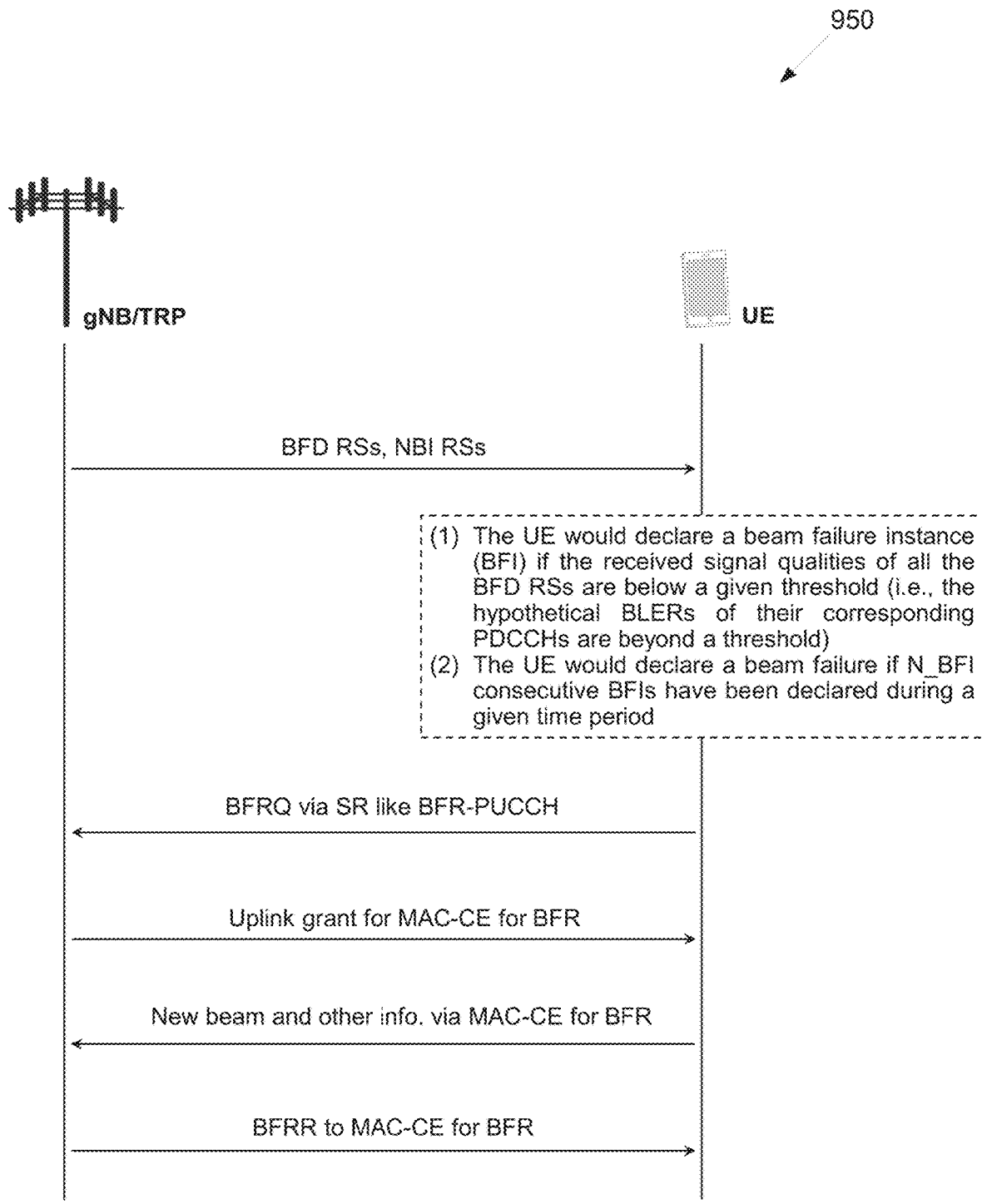
FIG. 9B illustrates a signaling flow of UE and gNB for a secondary cell beam failure recovery according to embodiments of the present disclosure.

In the 3GPP Rel. 16, the BFR procedures are customized for the secondary cell (SCell) under the CA framework, in which the BPL(s) between the PCell and the UE is assumed to be always working. An illustrative example of the SCell beam failure is given in FIG. 9A. In FIG. 9B, the key components of the Rel. 16 SCell BFR are presented. It is evident from FIG. 9B that prior to sending the BFRQ, the Rel. 15 and Rel. 16 BFR procedures have similar BFD designs.

FIG. 9B illustrates a signaling flow of UE and gNB for a secondary cell beam failure recovery 950 according to embodiments of the present disclosure. The signaling flow of UE and gNB for the secondary cell beam failure recovery 950 as may be performed by a UE (e.g., 111-116 as illustrated in FIG. 1) and a BS (e.g., 101-103 as illustrated in FIG. 1). An embodiment of the signaling flow of UE and gNB for the secondary cell beam failure recovery 950 shown in FIG. 9B is for illustration only. One or more of the components illustrated in FIG. 9B can be implemented in specialized circuitry configured to perform the noted functions or one or more of the components can be implemented by one or more processors executing instructions to perform the noted functions.

After declaring/detecting the beam failure for the SCell, the UE may transmit the BFRQ as a scheduling request (SR) over the PUCCH (or PUCCH-SR) towards the working PCell. Further, the UE may only transmit the BFRQ at this stage without any new beam index, failed SCell index or other information. This is different from the Rel. 15 procedure, in which the UE may indicate both the BFRQ and the new beam index to the network at the same time. Allowing the gNB to quickly know the beam failure status of the SCell without waiting for the UE to identify a new beam could be beneficial. For instance, the gNB could deactivate the failed SCell and allocate the resources to other working SCells.

The UE could be indicated by the network an uplink grant in response to the BFRQ PUCCH-SR, which may allocate necessary resources for the MAC CE to carry new beam index (if identified), failed SCell index and etc. over the PUSCH for the working PCell. After transmitting the MAC CE for BFR to the working PCell, the UE may start to monitor the BFRR. The BFRR could be a TCI state indication for a CORESET for the corresponding SCell. The BFRR to the MAC CE for BFR could also be a normal uplink grant for scheduling a new transmission for the same HARQ process as the PUSCH carrying the MAC CE for BFR.

If the UE could not receive the BFRR within a preconfigured time window, the UE could transmit BFR-PUCCH again, or fall back to the CBRA. The above described BFR procedures for PCell and SCell may not be suited well for a multi-TRP system, in which multiple TRPs could be geographically non-co-located. A TRP in the multi-TRP system can represent a collection of measurement antenna ports, measurement RS resources and/or control resource sets (CORESETs).

For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; or (5) a plurality of CORESETs associated with a TRP-specific index/indicator/identity.

In the present disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation considered in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex).

In the present disclosure, a non-serving cell PCI can also be referred to as an additional PCI, another PCI or a different PCI (with respect to the serving cell PCI).

Figure 10:
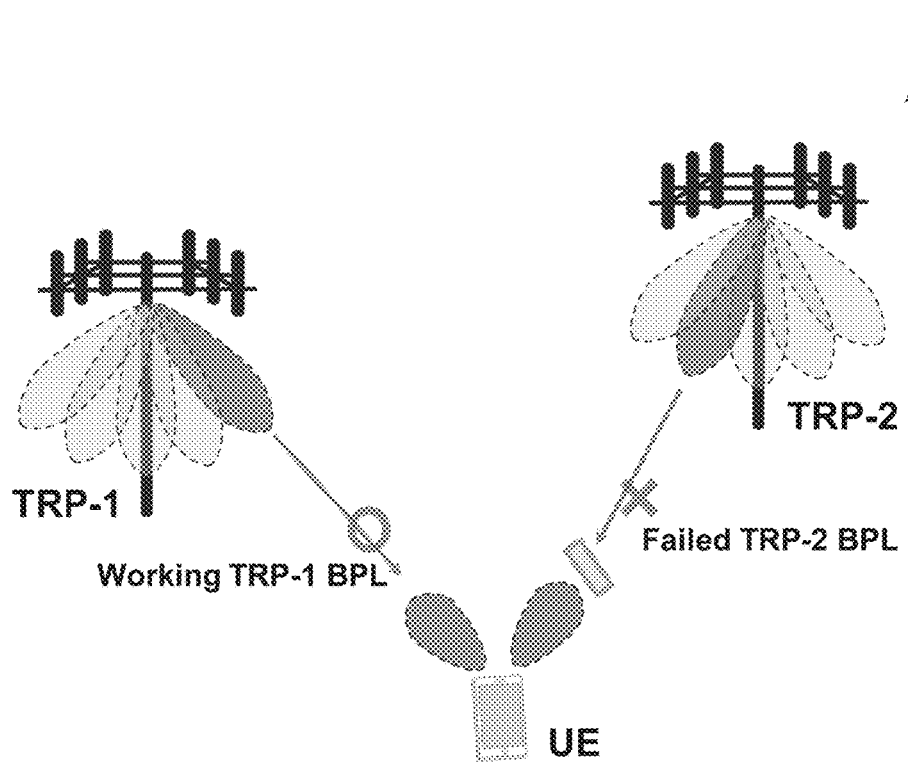
FIG. 10 illustrates an example of a beam failure in a multi-TRP system according to embodiments of the present disclosure.

FIG. 10 illustrates an example of a beam failure in a multi-TRP system 1000 according to embodiments of the present disclosure. An embodiment of the beam failure in a multi-TRP system 1000 shown in FIG. 10 is for illustration only.

As illustrated in FIG. 10, a conceptual example of BPL failure in a multi-TRP system is presented. As can be seen from FIG. 10, two TRPs, TRP-1 and TRP-2, are simultaneously/jointly performing DL transmissions to the UE in either a coherent or a non-coherent fashion. As the two TRPs are not physically co-located, their channel conditions between the UE could be largely different from each other. For instance, the BPL between one coordinating TRP (e.g., TRP-2 in FIG. 10) and the UE could fail due to blockage, while the BPL between the other coordinating TRP (e.g., TRP-1 in FIG. 10) and the UE could still work.

According to the BFR procedures defined in the 3GPP Rel. 15 and Rel. 16, however, the UE may trigger or initiate the BFR only when the received signal qualities of all the configured BFD RSs fall below a threshold for a certain period of time. Hence, there is a need to customize the BFR procedures for the multi-TRP system (TRP-specific BFR and/or partial BFR). For instance, the UE could initiate or trigger the BFR when the received signal qualities of the BFD RSs associated with/corresponding to at least one TRP fall below the threshold for a given period of time.

In a multi-TRP system, the same PDCCH/DCI corresponding to a single CORESET (e.g., with a single value of CORESET ID and/or CORESETPoolIndex) could be (simultaneously) transmitted from different coordinating TRPs to improve the robustness of the control channel transmission/reception. For a single frequency network (SFN), more than one TCI states (beams) could be activated for the CORESET, and each active TCI state for the CORESET could correspond to a TRP in the multi-TRP system. Under this setting, the BFD RS configuration, the NBI RS configuration, the beam failure declaration criteria, the BFRQ transmission and etc. need to be specified if one or more beams associated with the CORESET fail.

The present disclosure provides various design aspects/enhancements for the BFR procedure in a multi-TRP system, wherein the same PDCCH/DCI corresponding to the same CORESET (e.g., with a single value of CORESET ID and/or CORESETPoolIndex) is transmitted from different TRPs. Detailed configuration/indication methods for the BFD RS and NBI RS, and the corresponding beam failure declaration criteria along with the BFRQ transmission are discussed.

Repeatedly transmitting the same downlink control information (i.e., PDCCH/DCI repetition) can improve the reliability/robustness of the downlink control channel. This in turn, can enhance the downlink coverage. The PDCCH/DCI repetition can be realized in time, frequency, code and/or spatial domains. In a multi-TRP system comprising of multiple physically/geographically non-collocated TPRs, more than one TCI states (or equivalently, more than one transmit beams or spatial domain transmission filters) can be activated for a single CORESET (e.g., with a single value of CORESET ID and/or CORESETPoolIndex).

Figure 11:
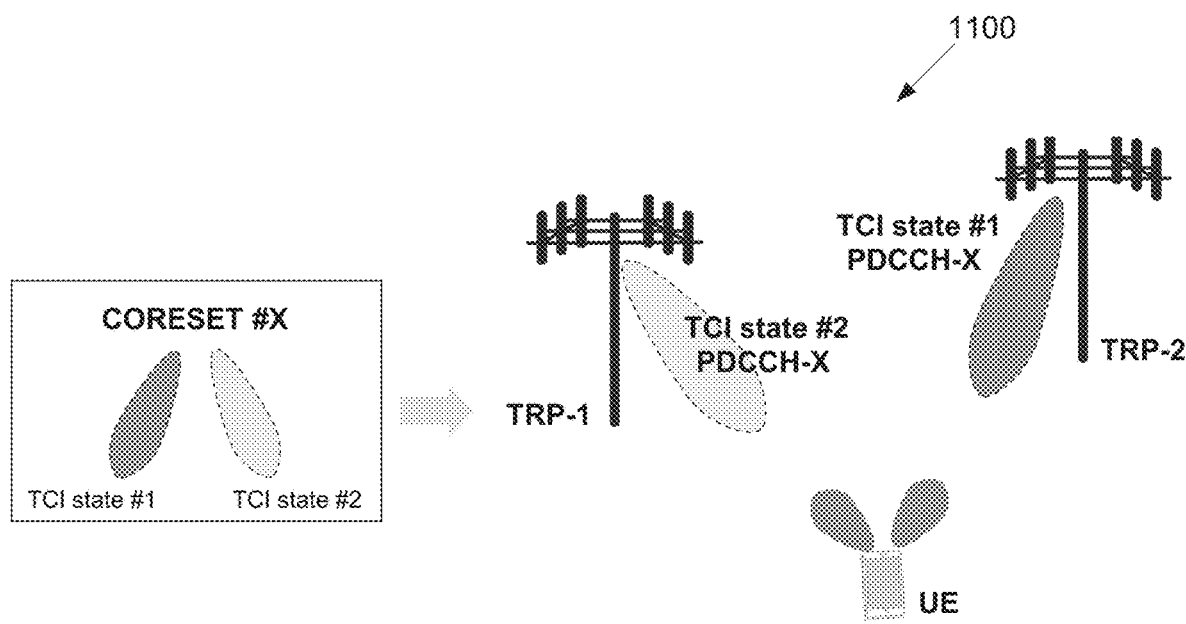
FIG. 11 illustrates an example of a control resource set including two TCI states according to embodiments of the present disclosure.

FIG. 11 illustrates an example of a control resource set including two TCI states 1100 according to embodiments of the present disclosure. An embodiment of the control resource set including the two TCI states 1100 shown in FIG. 11 is for illustration only.

A conceptual example of the spatial domain PDCCH repetition in a multi-TRP system including two TRPs, TRP-1 and TRP-2, is presented in FIG. 11. As shown in FIG. 11, two TCI states denoted by TCI state #1 and TCI state #2 are activated for the CORESET #X. The same DCI payload (PDCCH-X shown in FIG. 11) is (simultaneously) transmitted from TRP-1 and TRP-2 to the UE via two transmit beams/spatial domain transmission filters indicated in TCI state #2 and TCI state #1 activated for CORESET #X, respectively. If, e.g., the transmit beam from TRP-2 (indicated in TCI state #1) is blocked, the UE could initiate/trigger a (TRP-specific) BFR procedure for TRP-2 and try to resume receiving PDCCH-X from TRP-2 via a new transmit beam (if identified).

In one embodiment, a BFD RS configuration for spatial domain PDCCH repetition in a multi-TRP system is provided.

A QCL-typeD (spatial QCL) source RS in the active TCI state of a CORESET can be configured as a BFD RS. For spatial domain PDCCH repetition in a multi-TRP system (depicted in FIG. 11), as more than one (N_tci>1) TCI states could be activated for a CORESET, there could be various means to determine/configure the associated BFD RSs, which form a BFD RS beam set. Denote the BFD RS beam set by q0, and the total number of BFD RSs in q0 by $N\_q0 \geq 1$.

In one embodiment of Configuration-1, the BFD RS beam set q0 contains only one BFD RS, i.e., N_q0=1. The BFD RS corresponds to the QCL-typeD source RS in one active TCI state of the CORESET (out of the total N_tci>1 TCI states activated for the CORESET). The UE could be indicated by the network which TCI state out of the total N_tci TCI states activated for the CORESET the BFD RS is associated with (i.e., the QCL-typeD source RS indicated in the TCI state is the BFD RS); this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example (example-1.1), the UE could be indicated by the network, e.g., via higher layer RRC signaling and/or dynamic DCI signaling, TCI state-specific ID/index and/or TRP-specific ID/index associated with the selected active TCI state of the CORESET. For example, the UE could be indicated by the network the TCI state ID, e.g., the value of the higher layer parameter tci-StateId, of the selected active TCI state of the CORESET.

For another example, according to the U.S. patent application Ser. No. 17/581,714 filed on Jan. 21, 2022 as incorporated by reference herein, one or more TCI states could be grouped into a TCI state group with different TCI state groups having different/mutually exclusive TCI states; each TCI state group could be associated with a TCI state group ID, and the TCI state group ID could be indicated in the higher layer parameter TCI-State; hence, in this case, the UE could be indicated by the network the TCI state group ID of the selected active TCI state of the CORESET. Yet for another example, the UE could be indicated by the network the PCI value and/or other TRP-specific higher layer signaling index values associated with the selected active TCI state of the CORESET; the PCI value and/or other TRP-specific higher layer signaling index values could be indicated in the higher layer parameter TCI-State.

In another example (example-1.2), the UE could be first configured by the network (e.g., via higher layer RRC signaling) a list of TCI state-specific IDs/indices and/or a list of TRP-specific IDs/indices. The UE could then receive from the network a MAC CE command activating one TCI state-specific ID/index from the list of TCI state-specific IDs/indices and/or one TRP-specific ID/index from the list of TRP-specific IDs/indices. The activated TCI state-specific ID/index and/or the activated TRP-specific ID/index could indicate which active TCI state of the CORESET the BFD RS is associated with.

For example, the UE could be first higher layer configured by the network a list of TCI state IDs; the UE could then receive from the network a MAC CE command activating one TCI state ID from the list of TCI state IDs; the activated TCI state ID could indicate which active TCI state of the CORESET the BFD RS is associated with. For another example, the UE could be first higher layer configured by the network a list of TCI state group IDs; the UE could then receive from the network a MAC CE command activating one TCI state group ID from the list of TCI state group IDs; the activated TCI state group ID could indicate which active TCI state of the CORESET the BFD RS is associated with.

Yet in another example, the UE could be first higher layer configured by the network a list of PCI values/other TRP-specific higher layer signaling index values; the UE could then receive from the network a MAC CE command activating one PCI value/TRP-specific higher layer signaling index value from the list of PCI values/other TRP-specific higher layer signaling index values; the activated PCI value/TRP-specific higher layer signaling index value could indicate which active TCI state of the CORESET the BFD RS is associated with.

In yet another example (example-1.3), the UE could receive from the network a bitmap with each entry/bit in the bitmap corresponding to a TCI state-specific ID/index and/or a TRP-specific ID/index. For example, the UE could receive from the network a bitmap with each entry/bit in the bitmap corresponding to a TCI state ID; if a bit in the bitmap is set to "1," the corresponding TCI state ID, and therefore, the associated active TCI state of the CORESET is selected/indicated, with which the BFD RS is associated.

For another example, the UE could receive from the network a bitmap with each entry/bit in the bitmap corresponding to a TCI state group ID; if a bit in the bitmap is set to "1," the corresponding TCI state group ID, and therefore, the associated active TCI state of the CORESET is selected/indicated, with which the BFD RS is associated. For yet another example, the UE could receive from the network a bitmap with each entry/bit in the bitmap corresponding to a PCI value/TRP-specific higher layer signaling index value; if a bit in the bitmap is set to "1," the corresponding PCI value/TRP-specific higher layer signaling index value, and therefore, the associated active TCI state of the CORESET is selected/indicated, with which the BFD RS is associated.

In one embodiment of Configuration-2, the BFD RS beam set q0 contains more than one BFD RSs, i.e., $N\_q0>1$. The BFD RSs correspond to the QCL-typeD source RSs in more than one active TCI states of the CORESET (from the total $N\_tci>1$ TCI states activated for the CORESET). The UE could be indicated by the network which TCI states from the total N_tci TCI states activated for the CORESET the BFD RSs are associated with (i.e., the QCL-typeD source RSs indicated in the TCI states are the BFD RSs); this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example (example-1.4), the UE could be indicated by the network, e.g., via higher layer RRC signaling and/or dynamic DCI signaling, the TCI state-specific IDs/indices and/or TRP-specific IDs/indices associated with the selected active TCI states of the CORESET. For example, the UE could be indicated by the network the TCI state IDs, e.g., the values of tci-StateId's, of the selected active TCI states of the CORESET. For another example, the UE could be indicated by the network the TCI state group IDs of the selected active TCI states of the CORESET. Yet for another example, the UE could be indicated by the network the PCI values and/or other TRP-specific higher layer signaling index values associated with the selected active TCI states of the CORESET; the PCI value and/or other TRP-specific higher layer signaling index values could be indicated in the higher layer parameter TCI-State.

In another example (example-1.5), the UE could be first configured by the network (e.g., via higher layer RRC signaling) a list of TCI state-specific IDs/indices and/or a list of TRP-specific IDs/indices. The UE could then receive from the network a MAC CE command activating multiple (more than one) TCI state-specific IDs/indices from the list of TCI state-specific IDs/indices and/or multiple (more than one) TRP-specific IDs/indices from the list of TRP-specific IDs/indices. The activated TCI state-specific IDs/indices and/or the activated TRP-specific IDs/indices could indicate which active TCI states of the CORESET the BFD RSs are associated with.

For example, the UE could be first higher layer configured by the network a list of TCI state IDs; the UE could then receive from the network a MAC CE command activating multiple TCI state IDs from the list of TCI state IDs; the activated TCI state IDs could indicate which active TCI states of the CORESET the BFD RSs are associated with. For another example, the UE could be first higher layer configured by the network a list of TCI state group IDs; the UE could then receive from the network a MAC CE command activating multiple TCI state group IDs from the list of TCI state group IDs; the activated TCI state group IDs could indicate which active TCI states of the CORESET the BFD RSs are associated with.

Yet in another example, the UE could be first higher layer configured by the network a list of PCI values/other TRP-specific higher layer signaling index values; the UE could then receive from the network a MAC CE command activating multiple PCI values/TRP-specific higher layer signaling index values from the list of PCI values/other TRP-specific higher layer signaling index values; the activated PCI values/TRP-specific higher layer signaling index values could indicate which active TCI states of the CORESET the BFD RSs are associated with.

In yet another example (example-1.6), the UE could receive from the network a bitmap with each entry/bit in the bitmap corresponding to a TCI state-specific ID/index and/or a TRP-specific ID/index. For example, the UE could receive from the network a bitmap with each entry/bit in the bitmap corresponding to a TCI state ID; if a bit in the bitmap is set to "1," the corresponding TCI state ID, and therefore, the associated active TCI state of the CORESET is selected/indicated, with which a BFD RS is associated; the bitmap contains more than one entries/bits set to "1"s.

For another example, the UE could receive from the network a bitmap with each entry/bit in the bitmap corresponding to a TCI state group ID; if a bit in the bitmap is set to "1," the corresponding TCI state group ID, and therefore, the associated active TCI state of the CORESET is selected/indicated, with which a BFD RS is associated; the bitmap contains more than one entries/bits set to "1"s. For yet another example, the UE could receive from the network a bitmap with each entry/bit in the bitmap corresponding to a PCI value/TRP-specific higher layer signaling index value; if a bit in the bitmap is set to "1," the corresponding PCI value/TRP-specific higher layer signaling index value, and therefore, the associated active TCI state of the CORESET is selected/indicated, with which a BFD RS is associated; the bitmap contains more than one entries/bits set to "1"s.

Figure 12:
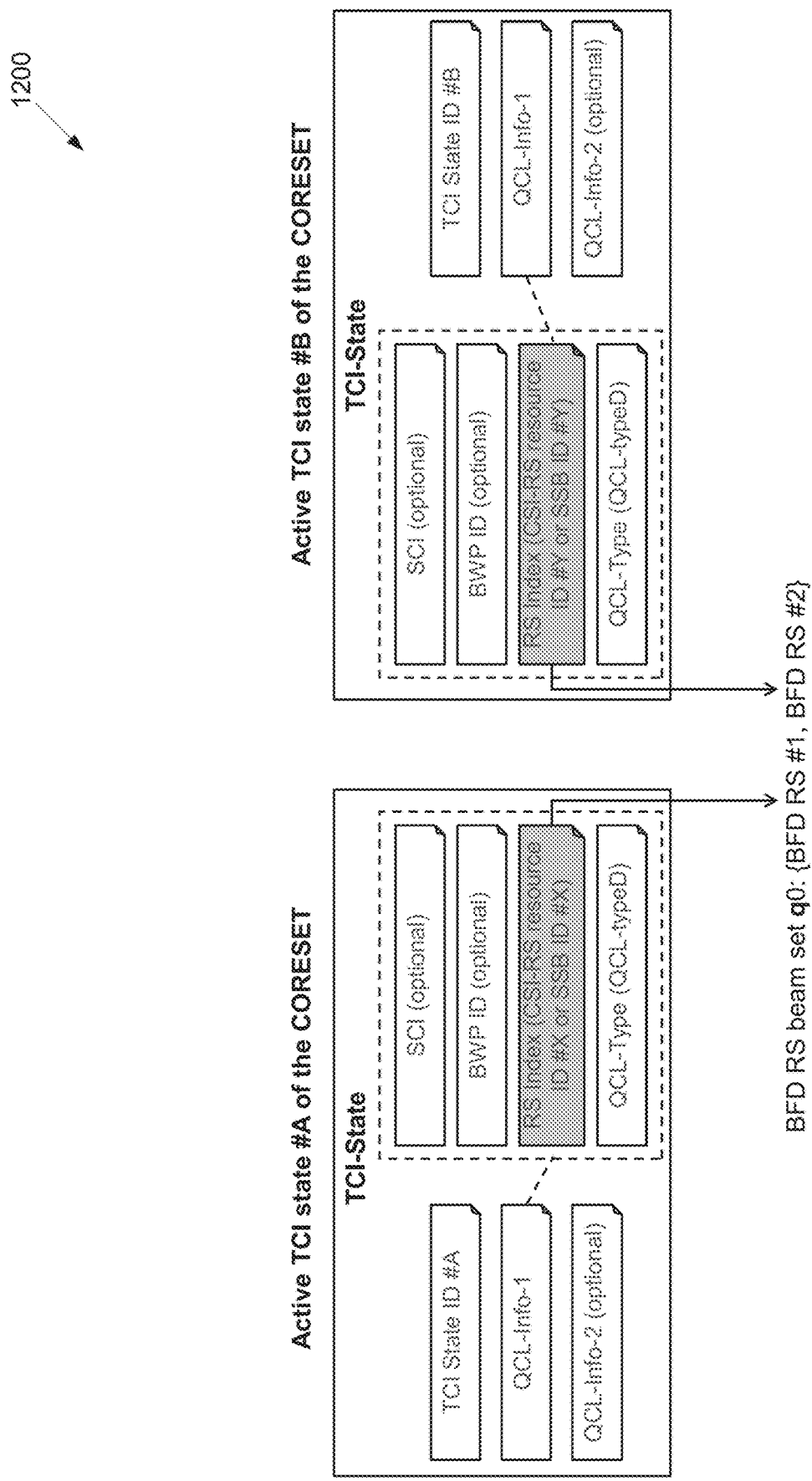
FIG. 12 illustrates an example of a BFD RS set including RS indexes in RS sets associated with two TCI states associated with a CORESET according to embodiments of the present disclosure.

FIG. 12 illustrates an example of a BFD RS set 1200 including RS indexes in RS sets associated with two TCI states associated with a CORESET according to embodiments of the present disclosure. An embodiment of the BFD RS set 1200 including RS indexes in RS sets associated with two TCI states associated with a CORESET shown in FIG. 12 is for illustration only.

In one embodiment of Configuration-3, the BFD RS beam set q0 contains more than one BFD RSs, i.e., $N\_q0>1$. The BFD RSs correspond to the QCL-typeD source RSs in all $N\_tci>1$ active TCI states of the CORESET. For instance, consider $N\_tci=2$ active TCI states of the CORESET, denoted by TCI state #A and TCI state #B, each indicating a QCL-typeD source RS. Hence, as shown in FIG. 12, the BFD RS beam set q0 may contain $N\_q0=2$ BFD RSs, corresponding to the QCL-typeD source RSs indicated in TCI state #A and TCI state #B. That is, if a CORESET, in which a UE receives or monitors one or more PDCCH candidates, is associated with two TCI states (e.g., TCI state #A and TCI state #B in FIG. 10), the BFD RS beam set q0 would include/contain/incorporate the (QCL-typeD) source RS indexes in the RS sets indicated in/associated with the two TCI states.

The UE could be indicated by the network which configuration(s) (Configuration-1, Configuration-2 and/or Configuration-3 in this disclosure) to follow to determine/configure the BFD RS(s) for the spatial domain PDCCH repetition in the multi-TRP system; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For example, the UE could receive from the network a 2-bit indicator, e.g., via higher layer RRC signaling, indicating one of the configurations (i.e., Configuration-1, Configuration-2 and Configuration-3 in this disclosure). Alternatively, the UE could autonomously determine which configuration(s) (Configuration-1, Configuration-2, and/or Configuration-3 in this disclosure) to follow to determine/configure the BFD RS(s) for the spatial domain PDCCH repetition in the multi-TRP system. The UE may need to indicate to the network their selection/preference of the configuration(s).

In the present disclosure, a UE can be provided in PDSCH-Config a first list/set/pool of up to $N\_tot\_tci$ (e.g., $N\_tot\_tci=128$) TCI states or TCI state IDs, wherein each TCI state (or TCI state corresponding to each TCI state ID) in the first list/set/pool can be provided by DLorJointTCIState or UL-TCIState configuration. Each of the $N\_tot\_tci$ TCI states could contain/include/indicate one or more reference signals (RSs) or RS indexes for the quasi co-location for DM-RS of PDSCH and DM-RS of PDCCH, for CSI-RS, and to provide a reference for determining UL transmit spatial filter for dynamic-grant and configured-grant based PUSCH and PUCCH resource, and SRS.

Furthermore, one or more of the RSs or RS indexes indicated/included/contained in the $N\_tot\_tci$ TCI states can be used to configure BFD RS(s) or NBI RS(s). For instance, the UE could be configured/provided by the network a second list/set/pool of $N\_tot\_rs$ (e.g., $1 \leq N\_tot\_rs \leq N\_tot\_tci$) TCI states or TCI state IDs, wherein each TCI state (or TCI state corresponding to each TCI state ID) in the second list/set/pool can be provided by DLorJointTCIState or UL-TCIState configuration, and can map to a TCI state or TCI state ID in the first list/set/pool.

In one example (example-1.A), the second list/set/pool of TCI states/TCI state IDs corresponds to or is the same as the first list/set/pool of TCI states/TCI state IDs. For this case, $N\_tot\_rs=N\_tot\_tci$.

In another example (example-1.B), the mapping between the $N\_tot\_rs$ TCI states/TCI state IDs in the second list/set/pool of $N\_tot\_rs$ TCI states/TCI state IDs and one or more (e.g., $N\_tot\_rs$) TCI states/TCI state IDs in the first list/set/pool of $N\_tot\_tci$ TCI states/TCI state IDs is fixed or higher layer configured (e.g., via RRC signaling).

In yet another example (example-1.C), the UE could receive from the network a MAC CE activation/subselection command to activate $N\_tot\_rs$ TCI states/TCI state IDs from the first list/set/pool of $N\_tot\_tci$ TCI states/TCI state IDs as the $N\_tot\_rs$ TCI states/TCI state IDs in the second list/set/pool. For instance, the MAC CE command could include/contain a bitmap of length $N\_tot\_tci$, with each bit position in the bitmap corresponding to a TCI state/TCI state ID in the first list/set/pool of TCI states/TCI state IDs. If a bit position in the bitmap is set to "1", the corresponding TCI state/TCI state ID in the first list/set/pool of TCI states/TCI state IDs is activated/selected as a TCI state/TCI state ID in the second list/set/pool of TCI states/TCI state IDs. The MAC CE command/bitmap could contain $N\_tot\_rs$ bit positions set to "1"s.

In yet another example (example-1.D), the second list/set/pool of TCI states/TCI state IDs could contain/include ($N\_tot\_rs$) TCI states/TCI state IDs, in the first list/set/pool of TCI states/TCI state IDs, that are reserved/configured/activated for receiving/monitoring PDCCH candidate(s) in CORESET(s).

The RSs or RS indexes, e.g., at least N_tot_rs (QCL-typeD) RSs or RS indexes, indicated/included/contained in the N_tot_rs TCI states in the second list/set/pool of TCI states/TCI state IDs can be used to configure one or more BFD RSs/NBI RSs. In the present disclosure, the at least N_tot_rs (QCL-typeD) RSs or RS indexes are denoted as a list/set/pool of at least N_tot_rs QCL source RS indexes. Furthermore, the first list/set/pool of TCI states/TCI state IDs, the second list/set/pool of TCI states/TCI state IDs, or the MAC CE activation/subselection command in the example-1.C could contain/include/indicate an entity ID, where the entity ID could correspond a PCI, a PCI index pointing/corresponding to an entry/PCI from a list/set/pool of PCIs that are higher layer configured to the UE, a value of CORESETPoolIndex, a value of CORESETGroupIndex, a one-bit flag indicator, a CORESET pool ID/index, a CORESET group ID/index, a CORESET ID/index, a TCI state ID/index, a TRP-specific index/ID value, a TRP-specific higher layer signaling index/ID value or a TRP-specific RS set index/ID value.

The UE could receive from the network one or more MAC CE commands or one or more MAC CE activation/subselection commands or one or more bitmaps to configure or update one or more BFD RSs (corresponding to one or more SSB indexes or one or more periodic 1-port CSI-RS resource configuration indexes) in a BFD RS beam set of BFD RSs corresponding to SSB indexes or periodic 1-port CSI-RS resource configuration indexes—e.g., the BFD RS beam set q0 configured according to those specified in Configuration-1, Configuration-2, or Configuration-3 (i.e., the design example-1.1, example-1.2, example-1.3, example-1.4, example-1.5, or example-1.6) in the present disclosure.

In one example (example-1.7), the UE could be first higher layer RRC configured by the network a list/set/pool of N_tot_rs RS resource indexes (e.g., corresponding to SSB indexes or CSI-RS resource configuration indexes). The UE could then receive from the network a MAC CE activation/subselection command to activate or select one or more RS indexes from the higher layer RRC configured pool of RS indexes or one or more RS indexes from the list/set/pool of at least N_tot_rs QCL source RS indexes as one or more BFD RSs for the set q0. For instance, the MAC CE activation/subselection command could contain a total of N_tot_rs bit positions with each bit position corresponding to a RS index in the higher layer RRC configured pool of RS indexes or a RS index in the list/set/pool of at least N_tot_rs QCL source RS indexes. If a bit position in the MAC CE activation/subselection command is set to "1", the corresponding RS index from the higher layer RRC configured pool of RS indexes or from the list/set/pool of at least N_tot_rs QCL source RS indexes is then activated/selected as one BFD RS in the set q0. The MAC CE activation/subselection command could contain more than one (e.g., N_q0>1) bit positions configured as "1"s.

For example, the UE could be first provided by the network, e.g., via higher layer parameter failureDetectionResourcesToAddModList or beamFailureDetectionResourceList, one or more first BFD RSs corresponding to SSB indexes or periodic 1-port CSI-RS resource configuration indexes in the BFD RS beam set q0. The UE could then receive from the network a MAC CE activation/subselection command as described above activating/selecting one or more RS indexes from the higher layer RRC configured pool of RS indexes or one or more RS indexes from the list/set/pool of at least N_tot_rs QCL source RS indexes as one or more second BFD RSs in the set q0. That is, for this case, the BFD RS beam set q0 could contain both higher layer RRC configured first BFD RSs and MAC CE activated second BFD RSs.

For another example, as discussed above, the BFD RS beam set q0 could contain N_q0 BFD RSs each corresponding to a SSB index or a periodic 1-port CSI-RS resource configuration index. The UE could receive from the network a MAC CE activation/subselection command as described above activating/selecting N_q0 RS indexes from the higher layer RRC configured pool of RS indexes or from the list/set/pool of at least N_tot_rs QCL source RS indexes as the N_q0 BFD RSs in the set q0. The MAC CE activation/subselection command could contain N_q0 bit positions configured as "1"s.

Yet for another example, the UE could be first provided by the network, e.g., via higher layer parameter failureDetectionResourcesToAddModList or beamFailureDetectionResourceList, N_q0 BFD RSs corresponding to SSB indexes or periodic 1-port CSI-RS resource configuration indexes in the BFD RS beam set q0. The UE could then receive from the network a first MAC CE activation/subselection command as described above activating/selecting N_q0' RS indexes from the higher layer RRC configured pool of RS indexes or from the list/set/pool of at least N_tot_rs QCL source RS indexes. The UE could also receive from the network a second MAC CE command/bitmap containing a total of N_q0 bit positions with each bit position corresponding to a BFD RS in the set q0. If a bit position in the second MAC CE command/bitmap is set to "1", the corresponding BFD RS in the BFD RS beam set q0 could be replaced/updated by a RS index—activated/selected by the first MAC CE activation/subselection command from the higher layer RRC configured pool of RS indexes or from the list/set/pool of at least N_tot_rs QCL source RS indexes—corresponding to the bit position in the second MAC CE command/bitmap.

For this example, the second MAC CE command/bitmap could contain N_q0' bit positions configured as "1"s, and the N_q0' bit positions configured as "1"s (e.g., ordered from the least significant bit to the most significant bit) are one-to-one mapped/associated to the N_q0' RS indexes (e.g., ordered from the lowest RS index/ID to the highest RS index/ID) activated/selected by the first MAC CE activation/subselection command from the higher layer RRC configured pool of RS indexes or from the list/set/pool of at least N_tot_rs QCL source RS indexes.

In another example (example-1.8), one or more BFD RSs (corresponding to one or more SSB indexes or periodic CSI-RS resource configuration indexes) in the BFD RS beam set q0 could be associated with an entity ID, and different BFD RSs in the set q0 could be associated with different entity IDs. In the present disclosure, the entity ID could correspond a PCI, a PCI index pointing/corresponding to an entry/PCI from a list/set/pool of PCIs that are higher layer configured to the UE, a value of CORESETPoolIndex, a value of CORESETGroupIndex, a one-bit flag indicator, a CORESET pool ID/index, a CORESET group ID/index, a CORESET ID/index, a TCI state ID/index, a TRP-specific index/ID value, a TRP-specific higher layer signaling index/ID value or a TRP-specific RS set index/ID value. The UE could be first higher layer RRC configured by the network a list/set/pool of N_tot_rs RS resource indexes (e.g., corresponding to SSB indexes or CSI-RS resource configuration indexes).

The UE could then receive from the network one or more MAC CE activation/subselection commands to activate or select one or more RS indexes from the higher layer RRC configured pool of RS indexes or one or more RS indexes from the list/set/pool of at least N_tot_rs QCL source RS indexes as one or more BFD RSs associated with one or more entity IDs for the set q0. For instance, a MAC CE activation/subselection command could contain a total of N_tot_rs bit positions with each bit position corresponding to a RS index in the higher layer RRC configured pool of RS indexes or a RS index in the list/set/pool of at least N_tot_rs QCL source RS indexes.

Furthermore, the MAC CE activation/subselection command could also contain/indicate an entity ID. If a bit position in the MAC CE activation/subselection command indicating/configuring an entity ID is set to "1", the corresponding RS index from the higher layer RRC configured pool of RS indexes or from the list/set/pool of at least N_tot_rs QCL source RS indexes is then activated/selected as one BFD RS associated with the entity ID in the set q0. A MAC CE activation/subselection command indicating/configuring an entity ID could contain more than one (e.g., N_q0>1) bit positions configured as "1"s.

For example, the UE could be first provided by the network, e.g., via higher layer parameter failureDetectionResourcesToAddModList or beamFailureDetectionResourceList, one or more first BFD RSs corresponding to SSB indexes or periodic 1-port CSI-RS resource configuration indexes in the BFD RS beam set q0, wherein one or more first BFD RSs could be associated with a same entity ID and different first BFD RSs could be associated with different entity IDs. The UE could then receive from the network one or more MAC CE activation/subselection commands as described above with each MAC CE activation/subselection command indicating/configuring an entity ID and activating/selecting one or more RS indexes from the higher layer RRC configured pool of RS indexes or from the list/set/pool of at least N_tot_rs QCL source RS indexes as one or more second BFD RSs associated with the indicated entity ID in the set q0. That is, for this case, the BFD RS beam set q0 could contain both higher layer RRC configured first BFD RSs associated with one or more entity IDs and MAC CE activated second BFD RSs associated with one or more entity IDs.

For another example, as discussed above, the BFD RS beam set q0 of size N_q0 could contain/comprise/include M_q0 (M_q0≤N_q0) BFD RSs—each corresponding to a SSB index or a periodic 1-port CSI-RS resource configuration index—associated with a same entity ID. The UE could receive from the network a MAC CE activation/subselection command as described above indicating/configuring the entity ID and activating/selecting M_q0 RS indexes from the higher layer RRC configured pool of RS indexes or from the list/set/pool of at least N_tot_rs QCL source RS indexes as the M_q0 BFD RSs associated with the entity ID in the set q0. As discussed above, the MAC CE activation/subselection command could indicate/configure the entity ID and contain M_q0 bit positions configured as "1"s.

Yet for another example, the UE could be first provided by the network, e.g., via higher layer parameter failureDetectionResourcesToAddModList or beamFailureDetectionResourceList, a BFD RS beam set q0 of size N_q0 containing/comprising/including M_q0 (M_q0≤N_q0) BFD RSs—each corresponding to a SSB index or a periodic 1-port CSI-RS resource configuration index—associated with a same entity ID. The UE could then receive from the network a first MAC CE activation/subselection command as described above indicating/configuring the entity ID and activating/selecting M_q0' RS indexes from the higher layer RRC configured pool of RS indexes or from the list/set/pool of at least N_tot_rs QCL source RS indexes. The UE could also receive from the network a second MAC CE command/bitmap containing a total of M_q0 bit positions with each bit position corresponding to a BFD RS among the M_q0 BFD RSs associated with the entity ID in the set q0. If a bit position in the second MAC CE command/bitmap is set to "1", the corresponding BFD RS among the M_q0 BFD RSs associated with the entity ID in the BFD RS beam set q0 could be replaced/updated by a RS index—activated/selected by the first MAC CE activation/subselection command from the higher layer RRC configured pool of RS indexes or from the list/set/pool of at least N_tot_rs QCL source RS indexes—corresponding to the bit position in the second MAC CE command/bitmap.

For this example, the second MAC CE command/bitmap could contain M_q0' bit positions configured as "1"s, and the M_q0' bit positions configured as "1"s (e.g., ordered from the least significant bit to the most significant bit) are one-to-one mapped/associated to the M_q0' RS indexes (e.g., ordered from the lowest RS index/ID to the highest RS index/ID) activated/selected by the first MAC CE activation/subselection command from the higher layer RRC configured pool of RS indexes or from the list/set/pool of at least N_tot_rs QCL source RS indexes.

In yet another example (example-1.9), the UE could be first higher layer RRC configured by the network a list/set/pool of N_tot_rs RS resource indexes (e.g., corresponding to SSB indexes or CSI-RS resource configuration indexes). The UE could then receive from the network a MAC CE command to configure/select one or more RS indexes from the higher layer RRC configured pool of RS indexes or one or more RS indexes from the list/set/pool of at least N_tot_rs QCL source RS indexes as one or more BFD RSs for the set q0. For instance, the MAC CE command could contain a total of N_q0 entries with each entry corresponding to a BFD RS in the set q0. If an entry in the MAC CE command is set to a RS index from the higher layer RRC configured pool of RS indexes or a RS index from the list/set/pool of at least N_tot_rs QCL source RS indexes, the RS index is then configured/selected as the corresponding BFD RS in the set q0.

For example, as discussed above, the BFD RS beam set q0 could contain N_q0 BFD RSs each corresponding to a SSB index or a periodic 1-port CSI-RS resource configuration index. The UE could receive from the network a MAC CE command as described above configuring/selecting N_q0 RS indexes from the higher layer RRC configured pool of RS indexes or from the list/set/pool of at least N_tot_rs QCL source RS indexes as the N_q0 BFD RSs in the set q0. The MAC CE command could contain N_q0 entries with each entry configuring/selecting a RS index from the higher layer RRC configured pool of RS indexes or from the list/set/pool of at least N_tot_rs QCL source RS indexes as the corresponding BFD RS in the set q0.

For another example, the UE could be first provided by the network, e.g., via higher layer parameter failureDetectionResourcesToAddModList or beamFailureDetectionResourceList, N_q0 BFD RSs corresponding to SSB indexes or periodic 1-port CSI-RS resource configuration indexes in the BFD RS beam set q0. The UE could then receive from the network a MAC CE command as described above configuring/selecting N_q0' RS indexes from the higher layer RRC configured pool of RS indexes or from the list/set/pool of at least N_tot_rs QCL source RS indexes as one or more of the BFD RSs for the set q0.

For instance, in the MAC CE command having a total of N_q0 entries, only N_q0' entries (out of the total N_q0 entries) are set to valid RS indexes from the higher layer RRC configured pool of RS indexes or from the list/set/pool of at least N_tot_rs QCL source RS indexes, and the remaining (N_q0-N_q0') entries are not configured or absent; for this case, the N_q0' RS indexes are configured/selected/updated as the corresponding N_q0' BFD RSs (out of the total N_q0 BFD RSs) for the set q0.

Alternatively, in the MAC CE command having a total of N_q0 entries, only N_q0' entries (out of the total N_q0 entries) are set to RS indexes (from the higher layer RRC configured pool of RS indexes or from the list/set/pool of at least N_tot_rs QCL source RS indexes) different from their corresponding BFD RSs in the BFD RS beam set q0; for this case, the N_q0' RS indexes are configured/selected/updated as the corresponding N_q0' BFD RSs (out of the total N_q0 BFD RSs) for the set q0.

In yet another example (example-1.10), one or more BFD RS s (corresponding to one or more SSB indexes or periodic CSI-RS resource configuration indexes) in the BFD RS beam set q0 could be associated with an entity ID, and different BFD RSs in the set q0 could be associated with different entity IDs. In the present disclosure, the entity ID could correspond a PCI, a PCI index pointing/corresponding to an entry/PCI from a list/set/pool of PCIs that are higher layer configured to the UE, a value of CORESETPoolIndex, a value of CORESETGroupIndex, a one-bit flag indicator, a CORESET pool ID/index, a CORESET group ID/index, a CORESET ID/index, a TCI state ID/index, a TRP-specific index/ID value, a TRP-specific higher layer signaling index/ID value or a TRP-specific RS set index/ID value. The UE could be first higher layer RRC configured by the network a list/set/pool of N_tot_rs RS resource indexes (e.g., corresponding to SSB indexes or CSI-RS resource configuration indexes).

The UE could then receive from the network one or more MAC CE commands to configure/select one or more RS indexes from the higher layer RRC configured pool of RS indexes or one or more RS indexes from the list/set/pool of at least N_tot_rs QCL source RS indexes as one or more BFD RSs associated with one or more entity IDs for the set q0. For instance, a MAC CE command could contain a total of N_q0 entries with each entry corresponding to a BFD RS in the set q0.

Furthermore, the MAC CE command could also contain/indicate an entity ID. If an entry in the MAC CE command configuring/indicating an entity ID is set to a RS index from the higher layer RRC configured pool of RS indexes or a RS index from the list/set/pool of at least N_tot_rs QCL source RS indexes, the RS index is then configured/selected as the corresponding BFD RS associated with the entity ID in the set q0.

For example, as discussed above, the BFD RS beam set q0 of size N_q0 could contain/comprise/include M_q0 (M_q0≤N_q0) BFD RSs—each corresponding to a SSB index or a periodic 1-port CSI-RS resource configuration index—associated with a same entity ID. The UE could receive from the network a MAC CE command as described above indicating/configuring the entity ID and configuring/selecting M_q0 RS indexes from the higher layer RRC configured pool of RS indexes or from the list/set/pool of at least N_tot_rs QCL source RS indexes as the M_q0 BFD RSs associated with the entity ID in the set q0. As discussed above, the MAC CE command could indicate/configure the entity ID and contain M_q0 entries with each entry configured/set to a RS index from the higher layer RRC configured pool of RS indexes or from the list/set/pool of at least N_tot_rs QCL source RS indexes and corresponding to a BFD RS among the M_q0 BFD RSs associated with the entity ID in the set q0.

For another example, the UE could be first provided by the network, e.g., via higher layer parameter failureDetectionResourcesToAddModList or beamFailureDetectionResourceList, a BFD RS beam set q0 of size N_q0 containing/comprising/including M_q0 (M_q0≤N_q0) BFD RSs—each corresponding to a SSB index or a periodic 1-port CSI-RS resource configuration index—associated with a same entity ID. The UE could then receive from the network a MAC CE command as described above indicating/configuring the entity ID and configuring/selecting M_q0' RS indexes from the higher layer RRC configured pool of RS indexes or from the list/set/pool of at least N_tot_rs QCL source RS indexes as one or more of the BFD RSs associated with the entity ID for the set q0.

As discussed above, the MAC CE command could indicate/configure the entity ID and contain M_q0 entries with each entry corresponding to a BFD RS among the M_q0 BFD RSs associated with the entity ID in the set q0. For instance, in the MAC CE command having a total of M_q0 entries and configuring/indicating the entity ID, only M_q0' entries (out of the total M_q0 entries) are set to valid RS indexes from the higher layer RRC configured pool of RS indexes or from the list/set/pool of at least N_tot_rs QCL source RS indexes, and the remaining (M_q0-M_q0') entries are not configured or absent; for this case, the M_q0' RS indexes are configured/selected/updated as the corresponding M_q0' BFD RSs associated with the entity ID (out of the total M_q0 BFD RSs associated with the entity ID) for the set q0.

Alternatively, in the MAC CE command having a total of M_q0 entries and configuring/indicating the entity ID, only M_q0' entries (out of the total M_q0 entries) are set to RS indexes (from the higher layer RRC configured pool of RS indexes or from the list/set/pool of at least N_tot_rs QCL source RS indexes) different from their corresponding BFD RSs in the BFD RS beam set q0; for this case, the M_q0' RS indexes are configured/selected/updated as the corresponding M_q0' BFD RSs associated with the entity ID (out of the total M_q0 BFD RSs associated with the entity ID) for the set q0.

In the above discussed design examples, the higher layer RRC configured list/set/pool of N_tot_rs RS resource indexes (e.g., corresponding to SSB indexes or CSI-RS resource configuration indexes) could also contain/include/indicate an entity ID, where the entity ID could correspond a PCI, a PCI index pointing/corresponding to an entry/PCI from a list/set/pool of PCIs that are higher layer configured to the UE, a value of CORESETPoolIndex, a value of CORESETGroupIndex, a one-bit flag indicator, a CORESET pool ID/index, a CORESET group ID/index, a CORESET ID/index, a TCI state ID/index, a TRP-specific index/ID value, a TRP-specific higher layer signaling index/ID value or a TRP-specific RS set index/ID value.

In one embodiment, a beam failure detection/declaration procedure for spatial domain PDCCH repetition in a multi-TRP system is provided.

The UE could be higher layer configured by the network one or more BFD RS monitoring occasions for the BFD RSs in the BFD RS beam set q0. The UE could also be higher layer configured by the network one or more BFD thresholds/timers for detecting potential beam failure(s). A set of conditions to declare beam failure(s) for spatial domain PDCCH repetition in the multi-TRP system are defined/specified as well.

The UE could be higher layer configured by the network a single (N_period=1) BFD RS monitoring occasion for one or more of the BFD RS(s) in the BFD RS beam set q0.

For Configuration-1, the BFD RS monitoring occasion (denoted by BFD-RS-monitoring-occasion-x) could be for the only BFD RS in the BFD RS beam set q0. Hence, BFD-RS-monitoring-occasion-x=max {periodicity of the BFD RS in q0, x ms}, where x could be a fixed/deterministic value (e.g., x=2) per RRC configuration and higher layer configured to the UE by the network. Here, the periodicity of the BFD RS in q0 equals to the periodicity of the QCL-typeD source RS (CSI-RS or SSB) indicated in the selected active TCI state of the CORESET.

For Configuration-2 and Configuration-3, the BFD RS monitoring occasion (denoted by BFD-RS-monitoring-occasion-y) could be for all the N_q0>1 BFD RSs in the BFD RS beam set q0. Hence, BFD-RS-monitoring-occasion-y=max {minimal periodicities of the BFD RSs in the BFD RS beam set q0, y ms}, where y could be a fixed/deterministic value (e.g., y=2) per RRC configuration and higher layer configured to the UE by the network. Here, the periodicity of a BFD RS in q0 equals to the periodicity of the corresponding QCL-typeD source RS (CSI-RS or SSB) indicated in an (selected) active TCI state of the CORESET.

For Configuration-2 and Configuration-3, the BFD RS monitoring occasion (denoted by BFD-RS-monitoring-occasion-z) could be for a subset of all the N_q0>1 BFD RSs in the BFD RS beam set q0. Hence, BFD-RS-monitoring-occasion-z=max {minimal periodicities of the BFD RSs in the subset of all the BFD RSs in BFD RS beam set q0, z ms}, where z could be a fixed/deterministic value (e.g., z=2) per RRC configuration and higher layer configured to the UE by the network. Here, the periodicity of a BFD RS in the BFD RS beam subset or q0 equals to the periodicity of the corresponding QCL-typeD source RS (CSI-RS or SSB) indicated in an (selected) active TCI state of the CORESET. The UE could be indicated by the network the subset of BFD RSs; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be indicated by the network, e.g., via higher layer RRC signaling and/or dynamic DCI signaling, the BFD RS IDs/indices of the BFD RSs in the subset. In another example, the UE could be first higher layer configured by the network a list of BFD RS IDs/indices of all the BFD RSs in the BFD RS beam set; the UE could then receive from the network a MAC CE command activating the BFD RS IDs/indices corresponding to the BFD RSs in the subset. In yet another example, the UE could receive from the network a bitmap of length N_q0 with each entry/bit in the bitmap corresponding to a BFD RS (or equivalently, a BFD RS ID/index) in the BFD RS beam set q0; each entry/bit in the bitmap indicates whether the corresponding BFD RS is in the subset of BFD RSs or not.

The UE could be higher layer configured by the network more than one (N_period>1) BFD RS monitoring occasions, and each configured BFD RS monitoring occasion is for one or more BFD RSs in the BFD RS beam set q0. As in this case, more than one BFD RSs are in the BFD RS beam set, Configuration-2 and Configuration-3 are assumed. A BFD RS monitoring occasion (denoted by BFD-RS-monitoring-occasion-m) could be for a subset of all the N_q0>1 BFD RSs in the BFD RS beam set q0. Hence, BFD-RS-monitoring-occasion-p=max {minimal periodicities of the BFD RSs in the subset of all the BFD RSs in BFD RS beam set q0, p ms}, where p could be a fixed/deterministic value (e.g., p=2) per RRC configuration and higher layer configured to the UE by the network, and p could be the same or different for different BFD RS monitoring occasions. The subset could contain a single BFD RS or more than one BFD RSs.

If the subset contains a single BFD RS, BFD-RS-monitoring-occasion-p=max {periodicity of the BFD RS in the subset of all the BFD RSs in BFD RS beam set q0, p ms}. Here, the periodicity of a BFD RS in the BFD RS beam subset or q0 equals to the periodicity of the corresponding QCL-typeD source RS (CSI-RS or SSB) indicated in an (selected) active TCI state of the CORESET. All the N_period>1 BFD RS monitoring occasions could be for all the N_q0>1 BFD RSs in the BFD RS beam set q0.

In one example, the UE could be indicated by the network the subset of BFD RSs along with the configuration/indication of the corresponding/associated BFD RS monitoring occasion; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be indicated by the network, e.g., via higher layer RRC signaling and/or dynamic DCI signaling, the BFD RS IDs/indices of the BFD RSs in the subset for the corresponding/associated BFD RS monitoring occasion.

For another example, the UE could be first higher layer configured by the network a list of BFD RS IDs/indices of all the BFD RSs in the BFD RS beam set; the UE could then receive from the network a MAC CE command activating the BFD RS IDs/indices corresponding to the BFD RSs in the subset for the corresponding/associated BFD RS monitoring occasion. Yet for another example, the UE could receive from the network a bitmap of length N_q0 with each entry/bit in the bitmap corresponding to a BFD RS (or equivalently, a BFD RS ID/index) in the BFD RS beam set q0; each entry/bit in the bitmap indicates whether the corresponding BFD RS is in the subset of BFD RSs or not for the corresponding/associated BFD RS monitoring occasion.

In another example, if each BFD RS monitoring occasion is configured for a single BFD RS in the BFD RS beam set q0, the association rule(s)/mapping relationship(s) between the BFD RS monitoring occasions and the BFD RSs in the BFD RS beam set could be predefined and known to both the UE and the network. For example, the first BFD RS monitoring occasion or the BFD RS monitoring occasion with the lowest monitoring occasion ID/index could correspond to the first BFD RS or the BFD RS with the lowest resource ID/index in the BFD RS beam set, the second BFD RS monitoring occasion or the BFD RS monitoring occasion with the second lowest monitoring occasion ID/index could correspond to the second BFD RS or the BFD RS with the second lowest resource ID/index in the BFD RS beam set, and so on, and the last BFD RS monitoring occasion or the BFD RS monitoring occasion with the highest monitoring occasion ID/index could correspond to the last BFD RS or the BFD RS with the highest resource ID/index in the BFD RS beam set. Other association rules/mapping relationships between the BFD RS monitoring occasions and the BFD RSs in the BFD RS beam set are also possible and may be known to the UE and the network a prior.

In yet another example, a BFD RS monitoring occasion could be linked to/associated with one or more active TCI states of the CORESET (e.g., via their TCI state IDs and/or TCI state group IDs) and/or one or more TRP-specific IDs/indices such as PCI values.

The UE could be higher layer configured by the network one or more BFD thresholds for assessing the radio link qualities of the beam pair link(s) between the network and the UE. The UE could first measure the radio link qualities, e.g., in form of L1-RSRPs, of the BFD RSs in the BFD RS beam set q0. The UE could then derive the hypothetical BLER(s) for the PDCCH based on the beam metric(s) such as L1-RSRP(s) measured on the BFD RSs in the BFD RS beam set q0. The UE could compare the derived hypothetical PDCCH BLER(s) with the configured BFD threshold(s) and declare a beam failure instance (BFI) if the derived hypothetical PDCCH BLER(s) is beyond the configured BFD threshold(s). The UE may declare a beam failure if a predefined number of BFIs have been detected/declared by the UE within a given time period or before the BFD timer(s) expires.

For the configuration of BFD threshold(s), the UE could be higher layer configured by the network (e.g., via higher layer RRC signaling) a single BFD threshold for all the BFD RS(s) in the BFD RS beam set q0. For Configuration-1, the BFD threshold could be for the only BFD RS in the BFD RS beam set q0. For Configuration-2 and Configuration-3, the BFD threshold could be for all the N_q0>1 BFD RSs in the BFD RS beam set q0.

For the configuration of BFD threshold(s), alternatively, the UE could be higher layer configured by the network (e.g., via higher layer RRC signaling) more than one BFD thresholds for all the BFD RSs in the BFD RS beam set q0. Each configured BFD threshold is for one or more BFD RSs in the BFD RS beam set q0. As in this case, more than one BFD RSs are in the BFD RS beam set, Configuration-2 and Configuration-3 are assumed. A BFD threshold could be for a subset of all the N_q0>1 BFD RSs in the BFD RS beam set q0, and a subset could contain a single BFD RS or more than one BFD RSs.

In one example, the UE could be indicated by the network the subset of BFD RSs along with the configuration/indication of the corresponding/associated BFD threshold; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be indicated by the network, e.g., via higher layer RRC signaling and/or dynamic DCI signaling, the BFD RS IDs/indices of the BFD RSs in the subset for the corresponding/associated BFD threshold.

For another example, the UE could be first higher layer configured by the network a list of BFD RS IDs/indices of all the BFD RSs in the BFD RS beam set; the UE could then receive from the network a MAC CE command activating the BFD RS IDs/indices corresponding to the BFD RSs in the subset for the corresponding/associated BFD threshold. Yet for another example, the UE could receive from the network a bitmap of length N_q0 with each entry/bit in the bitmap corresponding to a BFD RS (or equivalently, a BFD RS ID/index) in the BFD RS beam set q0; each entry/bit in the bitmap indicates whether the corresponding BFD RS is in the subset of BFD RSs or not for the corresponding/associated BFD threshold.

In another example, if each BFD threshold is configured for a single BFD RS in the BFD RS beam set q0, the association rule(s)/mapping relationship(s) between the BFD thresholds and the BFD RSs in the BFD RS beam set could be predefined and known to both the UE and the network. For example, the first BFD threshold (e.g., in a list of BFD thresholds configured to the UE) could correspond to the first BFD RS or the BFD RS with the lowest resource ID/index in the BFD RS beam set, the second BFD threshold (e.g., in a list of BFD thresholds configured to the UE) could correspond to the second BFD RS or the BFD RS with the second lowest resource ID/index in the BFD RS beam set, and so on, and the last BFD threshold (e.g., in a list of BFD thresholds configured to the UE) could correspond to the last BFD RS or the BFD RS with the highest resource ID/index in the BFD RS beam set. Other association rules/mapping relationships between the BFD thresholds and the BFD RSs in the BFD RS beam set are also possible and may be known to the UE and the network a prior.

In yet another example, a BFD threshold could be linked to/associated with one or more active TCI states of the CORESET (e.g., via their TCI state IDs and/or TCI state group IDs) and/or one or more TRP-specific IDs/indices such as PCI values.

For the configuration of BFD timer(s), the UE could be higher layer configured by the network (e.g., via higher layer RRC signaling) a single BFD timer for all the BFD RS(s) in the BFD RS beam set q0. For Configuration-1, the BFD timer could be for the only BFD RS in the BFD RS beam set q0. For Configuration-2 and Configuration-3, the BFD timer could be for all the N_q0>1 BFD RSs in the BFD RS beam set q0.

For the configuration of BFD timer(s), alternatively, the UE could be higher layer configured by the network (e.g., via higher layer RRC signaling) more than one BFD timers for all the BFD RSs in the BFD RS beam set q0. Each configured BFD timer is for one or more BFD RSs in the BFD RS beam set q0. As in this case, more than one BFD RSs are in the BFD RS beam set, Configuration-2 and Configuration-3 are assumed. A BFD timer could be for a subset of all the N_q0>1 BFD RSs in the BFD RS beam set q0, and a subset could contain a single BFD RS or more than one BFD RSs.

In one example, the UE could be indicated by the network the subset of BFD RSs along with the configuration/indication of the corresponding/associated BFD timer; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. For example, the UE could be indicated by the network, e.g., via higher layer RRC signaling and/or dynamic DCI signaling, the BFD RS IDs/indices of the BFD RSs in the subset for the corresponding/associated BFD timer.

For another example, the UE could be first higher layer configured by the network a list of BFD RS IDs/indices of all the BFD RSs in the BFD RS beam set; the UE could then receive from the network a MAC CE command activating the BFD RS IDs/indices corresponding to the BFD RSs in the subset for the corresponding/associated BFD timer. Yet for another example, the UE could receive from the network a bitmap of length N_q0 with each entry/bit in the bitmap corresponding to a BFD RS (or equivalently, a BFD RS ID/index) in the BFD RS beam set q0; each entry/bit in the bitmap indicates whether the corresponding BFD RS is in the subset of BFD RSs or not for the corresponding/associated BFD timer.

In another example, if each BFD timer is configured for a single BFD RS in the BFD RS beam set q0, the association rule(s)/mapping relationship(s) between the BFD timers and the BFD RSs in the BFD RS beam set could be predefined and known to both the UE and the network. For example, the first BFD timer (e.g., in a list of BFD timers configured to the UE) could correspond to the first BFD RS or the BFD RS with the lowest resource ID/index in the BFD RS beam set, the second BFD timer (e.g., in a list of BFD timers configured to the UE) could correspond to the second BFD RS or the BFD RS with the second lowest resource ID/index in the BFD RS beam set, and so on, and the last BFD timer (e.g., in a list of BFD timers configured to the UE) could correspond to the last BFD RS or the BFD RS with the highest resource ID/index in the BFD RS beam set. Other association rules/mapping relationships between the BFD timers and the BFD RSs in the BFD RS beam set are also possible and may be known to the UE and the network a prior.

In yet another example, a BFD timer could be linked to/associated with one or more active TCI states of the CORESET (e.g., via their TCI state IDs and/or TCI state group IDs) and/or one or more TRP-specific IDs/indices such as PCI values.

The BFD threshold(s) and the BFD timer(s) could have one-to-one correspondence(s) if they are configured for the same BFD RS(s) in the BFD RS beam set q0.

Depending on the number of BFD RSs in the BFD RS beam set and how they are associated with different coordinating TRPs in the multi-TRP system, the UE could declare a beam failure if one or more BFD RSs in the BFD RS beam set, and therefore, one or more beams associated with the CORESET, fail. In addition, other necessary conditions/criteria to declare a beam failure for spatial domain PDCCH repetition may be specified given that there could still be working/alive beam(s) to transmit the PDCCH, though one or more beams associated with the CORESET could have failed.

For BFD RS Configuration-1, the UE could measure the radio link quality of the BFD RS in the BFD RS beam set q0 every X ms, where X is the BFD RS monitoring occasion associated with the BFD RS, and declare a beam failure (e.g., by sending to the network a BFRQ) if the hypothetical BLER of the PDCCH/CORESET derived from the measured radio link quality of the BFD RS is above the BFD threshold associated with the BFD RS a predefined number of times (e.g., a predefined number of BFIs are achieved) before the BFD timer associated with the BFD RS expires.

For BFD RS Configuration-2 and Configuration-3, the UE could measure the radio link qualities of one or more BFD RSs in the BFD RS beam set q0 (denoted as a first subset of BFD RSs in the BFD RS beam set q0) every Y ms, where Y is the BFD RS monitoring occasion associated with the first subset of BFD RSs.

In one example (Example-2.3.1), the UE may declare a beam failure for the first subset of BFD RSs (e.g., by sending to the network a BFRQ) if the hypothetical BLER of the PDCCH/CORESET derived from the measured radio link qualities of the first subset of BFD RSs are above the BFD threshold associated with the first subset of BFD RSs a predefined number of times (e.g., a predefined number of BFIs are achieved) before the BFD timer associated with the first subset of BFD RSs expires.

In another example (Example-2.3.2), the UE could be higher layer configured by the network (e.g., via higher layer RRC signaling) a BFR triggering timer. The UE could start the BFR triggering timer if the hypothetical BLER of the PDCCH/CORESET derived from the measured radio link qualities of the first subset of BFD RSs are above the BFD threshold associated with the first subset of BFD RSs a predefined number of times (e.g., a predefined number of BFIs are achieved) before the BFD timer associated with the first subset of BFD RSs expires.

Before the BFR triggering timer expires, if the UE could detect beam failure(s) from measuring at least a second subset of BFD RSs (different from the first subset of BFD RSs) in the BFD RS beam set q0, e.g., the hypothetical BLER of the PDCCH/CORESET derived from the measured radio link qualities of the second subset of BFD RSs are beyond the BFD threshold associated with the second subset of BFD RSs a predefined number of times (e.g., a predefined number of BFIs are achieved) before the BFD timer associated with the second subset of BFD RSs expires, the UE could declare separate (TRP-specific) beam failures for separate subsets of BFD RSs (e.g., by sending to the network separate BFRQs) or a cell-specific beam failure; otherwise, the UE could declare a beam failure only for the first subset of BFD RSs.

In yet another example (Example-2.3.3), the UE could be higher layer configured by the network (e.g., via higher layer RRC signaling) a BFR triggering threshold. The UE could start monitoring the radio link qualities of at least a second subset of BFD RSs (different from the first subset of BFD RSs) in the BFD RS beam set q0 if the hypothetical BLER of the PDCCH/CORESET derived from the measured radio link qualities of the first subset of BFD RSs are above the BFD threshold associated with the first subset of BFD RSs a predefined number of times (e.g., a predefined number of BFIs are achieved) before the BFD timer associated with the first subset of BFD RSs expires. If the hypothetical BLER of the PDCCH/CORESET derived from the measured radio link qualities of at least the second subset of BFD RSs are below the BFR triggering threshold, the UE may not declare a beam failure.

In yet another example (Example-2.3.4), the UE could be higher layer configured by the network (e.g., via higher layer RRC signaling) both the BFR triggering timer and the BFR triggering threshold. If the conditions/criteria described in Example-2.3.2 and Example-2.3.3 are satisfied at the same time, the UE could autonomously decide to follow either the beam failure declaration procedure in Example-2.3.2 or that in Example-2.3.3. Alternatively, if the conditions/criteria described in Example-2.3.2 and Example-2.3.3 are satisfied at the same time, the UE could follow either the beam failure declaration procedure in Example-2.3.2 or that in Example-2.3.3 based on network's indication(s).

Figure 13:
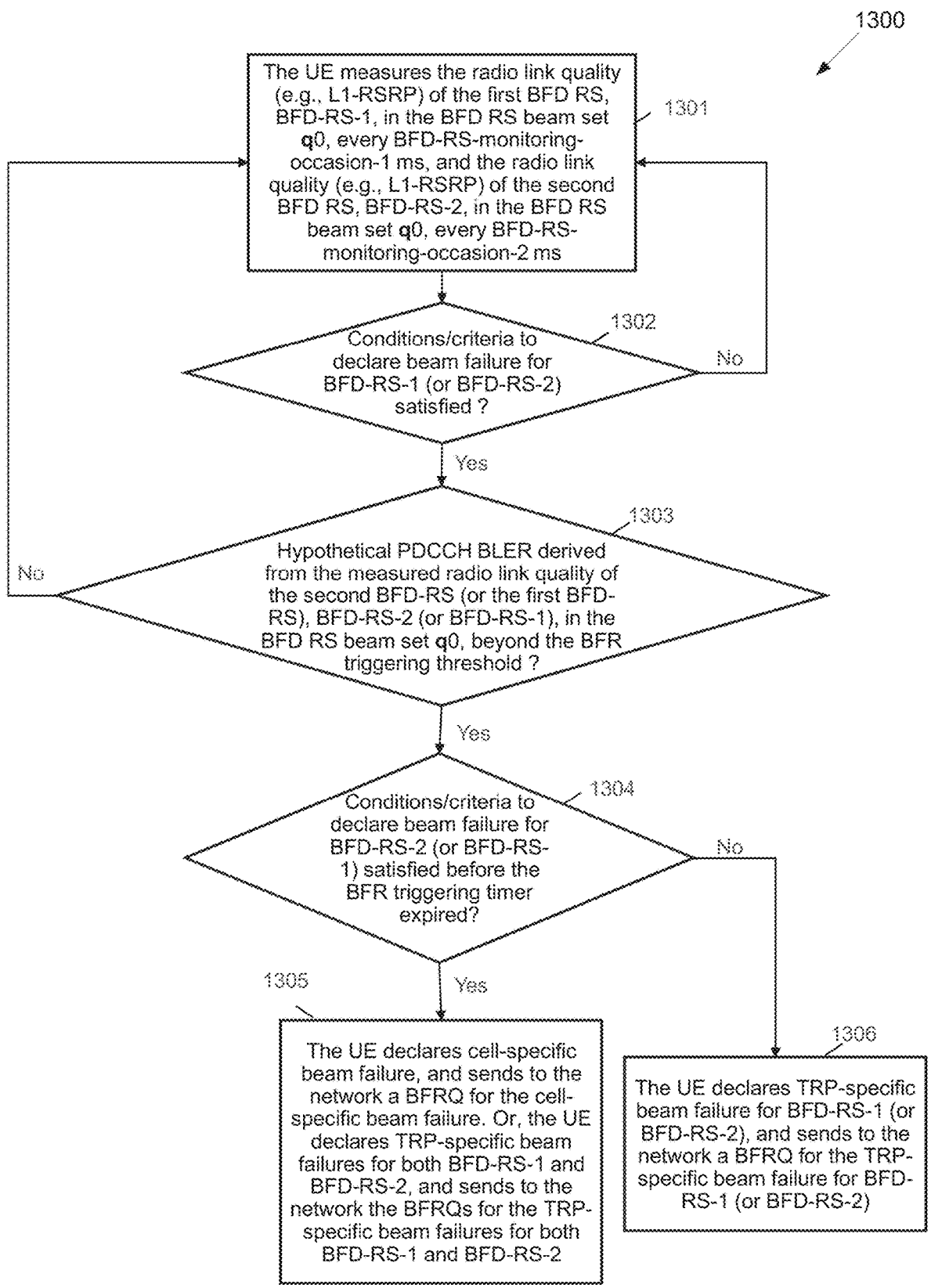
FIG. 13 illustrates a flowchart of UE method for declaring a beam failure according to embodiments of the present disclosure.

FIG. 13 illustrates a flowchart of UE method 1300 for declaring a beam failure according to embodiments of the present disclosure. The UE method 1300 for declaring a beam failure as may be performed by a UE (e.g., 111-116 as illustrated in FIG. 1). An embodiment of the UE method 1300 for declaring a beam failure shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

As illustrated in FIG. 13, an algorithm flowchart illustrating the above-described beam failure declaration criteria for a BFD RS beam set q0 containing two BFD RSs (BFD-RS-1 and BFD-RS-2) is presented. Both BFD-RS-1 and BFD-RS-2 are QCL-typeD source RSs indicated in two separate TCI states activated for the same CORESET. Two BFD RS monitoring occasions, BFD-RS-monitoring-occasion-1 and BFD-RS-monitoring-occasion-2, are configured for BFD-RS-1 and BFD-RS-2, respectively. A single BFD threshold and a single BFD timer are configured for both BFD-RS-1 and BFD-RS-2.

As illustrated in FIG. 13, in 1301, the UE monitors/measures the radio link quality (e.g., L1-RSRP) of BFD-RS-1 every BFD-RS-monitoring-occasion-1 ms, and the radio link quality (e.g., L1-RSRP) of BFD-RS-2 every BFD-RS-monitoring-occasion-2 ms.

In 1302, the UE derives the hypothetical BLER of the PDCCH from the measured radio link quality of BFD-RS-1 (or BFD-RS-2). The UE compares the derived hypothetical PDCCH BLER with the configured BFD threshold. If the derived hypothetical PDCCH BLER in 1302 is beyond the BFD threshold a predefined number of times (e.g., a predefined number of BFIs are achieved) before the BFD timer expires, the algorithm proceeds to 1303. Otherwise, the algorithm goes back to 1301, i.e., the UE may not declare any beam failure event at the moment.

In 1303, the UE derives the hypothetical BLER of the PDCCH from the measured radio link quality of BFD-RS-2 (or BFD-RS-1). The UE compares the derived hypothetical PDCCH BLER with the configured BFR triggering threshold. If the derived hypothetical PDCCH BLER in 1303 is beyond the BFR triggering threshold, the algorithm proceeds to 1304. Otherwise, the algorithm goes back to 1301, i.e., the UE may not declare any beam failure event at the moment.

In 1304, the UE derives the hypothetical BLER of the PDCCH from the measured radio link quality of BFD-RS-2 (or BFD-RS-1). The UE compares the derived hypothetical PDCCH BLER with the configured BFD threshold. If the derived hypothetical PDCCH BLER in 1304 is beyond the BFD threshold a predefined number of times (e.g., a predefined number of BFIs are achieved) before the BFD timer expires, the algorithm proceeds to 1305. Otherwise, the algorithm proceeds to 1306.

In 1305, the UE could declare a cell-specific beam failure and send to the network a BFRQ for the cell-specific beam failure. Alternatively, the UE could send to the network two separate BFRQs (e.g., via two separate PUCCH resources) for two separate TRP-specific beam failure events for BFD-RS-1 and BFD-RS-2.

In 1306, the UE declares TRP-specific beam failure for BFD-RS-1 (or BFD-RS-2) and sends to the network a BFRQ for the TRP-specific beam failure for BFD-RS-1 (or BFD-RS-2).

In one embodiment, an NBI RS configuration for spatial domain PDCCH repetition in a multi-TRP system is provided.

The UE could be higher layer configured by the network (e.g., via higher layer RRC signaling) one or more NBI RSs to measure for identifying one or more potential new transmit beams to recover the failed beam pair link(s) in a multi-TRP system with spatial domain PDCCH repetition.

In one example, one or more NBI RSs are configured for/associated with an active TCI state of the CORESET (and therefore, the QCL source RS(s) indicated therein), and each active TCI state of the CORESET could be associated with one or more NBI RSs. For example, a TCI state-specific ID/index such as a TCI state ID or a TCI state group ID can be incorporated into the higher layer parameter, e.g., NZP-CSI-RS-Resource, for configuring a NBI RS resource.

For another example, the mapping/association between the NBI RSs and the active TCI states of the CORESET (and therefore, the QCL source RSs indicated therein) are fixed per RRC configuration and known to both the UE and the network a prior; for instance, the first NBI RS or the NBI RS with the lowest NBI RS ID/index in a list of NBI RSs configured to the UE could be associated with the first TCI state (e.g., with the lowest TCI state ID and/or TCI state group ID), the second NBI RS or the NBI RS with the second lowest NBI RS ID/index in the list of NBI RSs configured to the UE could be associated with the second TCI state (e.g., with the second lowest TCI state ID and/or TCI state group ID), and so on, and the last NBI RS or the NBI RS with the highest NBI RS ID/index in the list of NBI RSs configured to the UE could be associated with the last TCI state (e.g., with the highest TCI state ID and/or TCI state group ID). Other mapping relationships/association rules between the NBI RSs and the active TCI states of the CORESET and their corresponding configuration/indication methods are also possible.

In another example, one or more NBI RSs are configured for/associated with a TRP-specific ID/index, and each TRP-specific ID/index could be associated with one or more NBI RSs. For example, a TRP-specific ID/index such as a PCI value can be incorporated into the higher layer parameter, e.g., NZP-CSI-RS-Resource, for configuring a NBI RS resource. For another example, the mapping/association between the NBI RSs and the TRP-specific ID/index (such as PCI value) are fixed per RRC configuration and known to both the UE and the network a prior; for instance, the first NBI RS or the NBI RS with the lowest NBI RS ID/index in a list of NBI RSs configured to the UE could be associated with the first TRP-specific ID/index (e.g., with the lowest PCI value), the second NBI RS or the NBI RS with the second lowest NBI RS ID/index in the list of NBI RSs configured to the UE could be associated with the second TRP-specific ID/index (e.g., with the second lowest PCI value), and so on, and the last NBI RS or the NBI RS with the highest NBI RS ID/index in the list of NBI RSs configured to the UE could be associated with the last TRP-specific ID/index (e.g., with the highest PCI value). Other mapping relationships/association rules between the NBI RSs and the TRP-specific ID/index such as PCI and their corresponding configuration/indication methods are also possible.

In yet another example, one or more NBI RSs are configured for/associated with a BFD RS in the BFD RS beam set, and each BFD RS in the BFD RS beam set could be associated with one or more NBI RSs. For example, a BFD RS ID/index value can be incorporated into the higher layer parameter, e.g., NZP-CSI-RS-Resource, for configuring a NBI RS resource.

For another example, the mapping/association between the NBI RSs and the BFD RSs in the BFD RS beam set are fixed per RRC configuration and known to both the UE and the network a prior; for instance, the first NBI RS or the NBI RS with the lowest NBI RS ID/index in a list of NBI RSs configured to the UE could be associated with the first BFD RS or the BFD RS with the lowest BFD RS ID/index in the BFD RS beam set, the second NBI RS or the NBI RS with the second lowest NBI RS ID/index in the list of NBI RSs configured to the UE could be associated with the second BFD RS or the BFD RS with the second lowest BFD RS ID/index in the BFD RS beam set, and so on, and the last NBI RS or the NBI RS with the highest NBI RS ID/index in the list of NBI RSs configured to the UE could be associated with the last BFD RS or the BFD RS with the highest BFD RS ID/index in the BFD RS beam set. Other mapping relationships/association rules between the NBI RSs and the BFD RSs in the BFD RS beam set, and their corresponding configuration/indication methods are also possible.

The UE could be higher layer indicated/configured by the network whether the new beam(s) identified from the NBI RS(s) and the working/alive beam(s) (e.g., the corresponding PDCCH hypothetical BLER is still below the threshold) may be simultaneously received by the UE; for instance, this indication could be a 1-bit flag indicator configured in the higher layer parameter BeamFailureRecoveryConfig. The UE could be higher layer indicated/configured by the network whether the new beam(s) identified from one or more NBI RS s associated with an active TCI state of the CORESET/a TRP-specific ID/a BFD RS in the BFD RS beam set and the new beam(s) identified from one or more NBI RSs associated with a different active TCI state of the CORESET/a different TRP-specific ID/a different BFD RS in the BFD RS beam set may be simultaneously received by the UE; for instance, this indication could also be a 1-bit flag indicator configured in the higher layer parameter BeamFailureRecoveryConfig.

The UE could also be higher layer configured by the network a metric to determine the simultaneous reception of different transmit beams/spatial domain transmission filters. For example, this metric could be a L1-RSRP threshold, a L1-SINR threshold, a throughput threshold and etc., and can be indicated in the higher layer parameter BeamFailureRecoveryConfig. If the UE can identify one or more new beams from the configured NBI RSs, the UE could send to the network the identified new beam index(s) (or equivalently, the corresponding NBI RS ID(s)/index(s)) via MAC CE (PUSCH). The UE could also send to the network the failed BFD RS ID(s)/index(s) in the BFD RS beam set, and/or the TCI state-specific ID(s)/index(s) such as TCI state ID(s)/TCI state group ID(s) associated with the failed BFD RS(s), and/or the TRP-specific ID(s)/index(s) such as PCI(s) associated with the failed BFD RS(s) via MAC CE (PUSCH).

Alternatively, the UE could be indicated by the network one or more groups/pairs of NBI RSs. Each NBI RS in the group/pair of NBI RSs is configured for/associated with a different active TCI state of the CORESET/a different TRP-specific ID such as PCI/a different BFD RS in the BFD RS beam set. The UE could expect to simultaneously receive the beams corresponding to the NBI RSs in a group/pair of NBI RSs. This configuration/indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be higher layer configured by the network (e.g., via higher layer RRC signaling) N_g≥1 groups/pairs of NBI RSs. Each NBI RS in a given group/pair of NBI RSs is configured for/associated with a different active TCI state of the CORESET/a different TRP-specific ID such as PCI/a different BFD RS in the BFD RS beam set.

In another example, the UE could be first higher layer configured by the network (e.g., via higher layer RRC signaling) N_G≥1 groups/pairs of NBI RSs. Each NBI RS in a given group/pair of NBI RSs is configured for/associated with a different active TCI state of the CORESET/a different TRP-specific ID such as PCI/a different BFD RS in the BFD RS beam set. The UE could then receive from the network a MAC CE command activating N_g≥1 groups/pairs of NBI RSs for potential new beam(s) identification.

In yet another example, the UE could be first higher layer configured by the network (e.g., via higher layer RRC signaling) N_G≥1 groups/pairs of NBI RSs. Each NBI RS in a given group/pair of NBI RSs is configured for/associated with a different active TCI state of the CORESET/a different TRP-specific ID such as PCI/a different BFD RS in the BFD RS beam set. The UE could then receive from the network a bitmap with length N_G. Each entry/bit in the bitmap corresponds to a different group/pair of NBI RSs. The bitmap could contain N_g≥1 "1"s indicating that the corresponding groups/pairs of NBI RSs are activated/selected for potential new beam(s) identification.

If the UE can identify new beams from the configured groups/pairs of NBI RSs, the UE could send to the network the identified new beam indices (or equivalently, the corresponding NBI RS IDs/indices) via MAC CE (PUSCH). Alternatively, the UE could send to the network the ID(s)/index(s) of the group(s)/pair(s) of NBI RSs corresponding to the new beams. The UE could also send to the network the failed BFD RS ID(s)/index(s) in the BFD RS beam set, and/or the TCI state-specific ID(s)/index(s) such as TCI state ID(s)/TCI state group ID(s) associated with the failed BFD RS(s), and/or the TRP-specific ID(s)/index(s) such as PCI(s) associated with the failed BFD RS(s) via MAC CE (PUSCH).

In one embodiment, beam failure recovery procedure in an inter-cell system is provided.

An inter-cell system could comprise a serving cell (or serving cell PCI) and at least one non-serving cell associated with non-serving cell PCI. The non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation considered in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI).

As in an inter-cell system, the UE could receive signals/channels such as UE-dedicated PDCCH(s)/PDSCH(s) from a non-serving cell PCI, the UE may be able to detect, declare and recover beam failure(s) from the non-serving cell(s). The BFR procedure for the non-serving cell(s) includes: measuring the BFD RSs from/associated with the non-serving cell(s) and assess the corresponding radio link quality(s), measuring the NBI RSs from/associated with the non-serving cell(s) and identify one or more new beams (if any), transmitting to the network beam failure recovery request and necessary information for the (failed) non-serving cell(s), and receiving from the network beam failure recovery response for the (failed) non-serving cell(s).

The UE could be explicitly configured/indicated by the network (e.g., via higher layer RRC signaling) a single list/set of BFD RS resources, e.g., via higher layer parameter failureDetectionResourcesToAddModList or beamFailureDetectionResourceList. In the present disclosure, the list/set of the BFD RS resources can also be referred to as a BFD RS beam set denoted by q0. The BFD RS resources in the BFD RS beam set q0 could be periodic 1-port CSI-RS resource configuration indexes or SSB indexes or other types of SSB s/CSI-RS resources.

The UE may keep monitoring the radio link qualities of the BFD RS s in q0, and as long as their radio link qualities, e.g., in terms of their corresponding/associated beam metrics such as measured L1-RSPRs, drop below a given threshold (e.g., a configured BFD threshold) for a certain period of time (e.g., before a configured BFD timer expires), the UE could declare beam failure for the TRP/cell. As discussed above, one or more of the BFD RS resources corresponding to either SSB resources/SSB resource indexes or periodic 1-port CSI-RS resources/CSI-RS resource configuration indexes in the BFD RS beam set q0 could be from/associated with one or more PCIs/PCI indexes, e.g., one or more non-serving cell PCIs/PCI indexes different from the serving cell PCI/PCI index or the serving cell PCI/PCI index.

For example, a BFD RS resource configured in the BFD RS beam set q0 provided by the higher layer parameter failureDetectionResourcesToAddModList or beamFailureDetectionResourceList is for or associated with a PCI (e.g., corresponding to a non-serving cell PCI) if the PCI information/value is indicated/included in the BFD RS beam set q0. For another example, the BFD RS beam set q0 (e.g., provided by the higher layer parameter failureDetectionResourcesToAddModList or beamFailureDetectionResourceList) could contain one or more BFD RS resources corresponding to either SSB resources/SSB resource indexes or periodic 1-port CSI-RS resources/CSI-RS resource configuration indexes associated with the serving cell PCI/PCI index, and one or more BFD RS resources corresponding to either SSB resources/SSB resource indexes or periodic 1-port CSI-RS resources/CSI-RS resource configuration indexes associated with one or more PCIs/PCI indexes different from the serving cell PCI/PCI index.

In the present disclosure, a PCI index could correspond/point to the corresponding PCI (value) in a list/set/pool of PCIs that are higher layer configured to the UE, wherein the list/set/pool of PCIs could comprise one or more PCIs different from the serving cell PCI or the serving cell PCI. Yet for another example, if the UE is provided by the network in PDCCH-Config different values of CORESETPoolIndex for CORESETs, the BFD RS beam set q0 (e.g., provided by the higher layer parameter failureDetectionResourcesToAddModList or beamFailureDetectionResourceList) could contain one or more BFD RS resources corresponding to either SSB resources/SSB resource indexes or periodic 1-port CSI-RS resources/CSI-RS resource configuration indexes associated with value 0 of CORESETPoolIndex, and one or more BFD RS resources corresponding to either SSB resources/SSB resource indexes or periodic 1-port CSI-RS resources/CSI-RS resource configuration indexes associated with value 1 of CORESETPoolIndex.

The UE could be explicitly configured/indicated by the network (e.g., via RRC or/and MAC CE or/and DCI based signaling) at least two BFD RS beam sets (S_q0≥2) each containing at least one (N_q0≥1) BFD RS resource corresponding to a SSB resource/SSB index or a periodic 1-port CSI-RS resource/CSI-RS resource configuration index. For instance, the UE could be configured by the network two BFD RS beam sets (S_q0=2) q00 and q01, e.g., via higher layer parameters failureDetectionResourcesToAddModList0/beamFailureDetectionResourceList0 and failureDetectionResourcesToAddModList1/beamFailureDetectionResourceList1, respectively. Each BFD RS beam set, i.e., q00, or q01 for S_q0=2, could contain/comprise/include one or more BFD RS resources (N_q0≥1) corresponding to one or more periodic 1-port CSI-RS resources/CSI-RS resource configuration indexes or SSB resources/SSB indexes.

Various means of indicating the association between one or more of the BFD RS resources configured in the BFD RS beam set q0, q00, or q01 and one or more PCIs (corresponding to either the serving cell PCI or non-serving cell PCI(s)) are presented as follows.

In one example (example-4.1.1), the BFD RS beam set q0, q00, or q01, and therefore the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, could include/indicate a PCI value, e.g., corresponding to either a serving cell PCI or a non-serving cell PCI. A BFD RS resource configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) corresponding to either a SSB resource/SSB index or a periodic 1-port CSI-RS resource/CSI-RS resource configuration index is for or associated with the PCI indicated/configured therein.

If the configured BFD RS beam set q0, q00, or q01 (and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) does not indicate/include any PCI value(s) or the PCI is absent in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1), the UE could expect that a BFD RS resource configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the serving cell PCI.

In another example (example-4.1.2), the BFD RS beam set q0, q00, or q01, and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, could include/indicate a one-bit indicator/flag indicating either the serving cell PCI or a non-serving cell PCI.

For instance, a BFD RS resource corresponding to either a SSB resource/SSB index or a periodic 1-port CSI-RS resource/CSI-RS resource configuration index configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) with the one-bit indicator/flag set to "1"/"ON"/"enabled" could be for or associated with the serving cell PCI (or the non-serving cell PCI), and a BFD RS resource corresponding to either a SSB resource/SSB index or a periodic 1-port CSI-RS resource/CSI-RS resource configuration index configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) with the one-bit indicator/flag set to "0"/"OFF"/"disabled" could be for or associated with the non-serving cell PCI (or the serving cell PCI). If the configured BFD RS beam set q0, q00, or q01 (and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) does not indicate/include the one-bit flag/indicator or the one-bit flag/indication is absent in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1), the UE could expect that a BFD RS resource configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the serving cell PCI.

In yet another example (example-4.1.3), the BFD RS beam set q0, q00, or q01, and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, could include/indicate a multi-bit indicator with each state of the multi-bit indicator corresponding to a PCI (e.g., either a serving cell PCI or a non-serving cell PCI). A BFD RS resource corresponding to a SSB resource/SSB index or a periodic 1-port CSI-RS resource/CSI-RS resource configuration index configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the PCI associated with/corresponding to the multi-bit indicator indicated/configured therein. If the configured BFD RS beam set q0, q00, or q01 (and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) does not indicate/include the multi-bit indicator or the multi-bit indicator is absent in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1), the UE could expect that a BFD RS resource configured/indicated in the BFD RS beam set q0, q00, or q01 (and therefore, in the corresponding higher layer parameter higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the serving cell PCI.

In yet another example (example-4.1.4), the BFD RS beam set q0, q00, or q01, and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, could include/indicate an index to an entry in a set/list/pool of PCIs (e.g., including both the serving cell PCI and non-serving cell PCIs higher layer configured to the UE). A BFD RS resource corresponding to a SSB resource/SSB index or a periodic 1-port CSI-RS resource/CSI-RS resource configuration index configured/indicated in the BFD RS beam set q0, q00, or q01 (and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the indicated entry (and therefore, the corresponding PCI) in the set/list/pool of PCIs. If the configured BFD RS beam set q0, q00, or q01 (and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) does not indicate/include any index to an entry in the set/list/pool of PCIs or the index to an entry in the set/list/pool of PCIs is absent in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1), the UE could expect that a BFD RS resource configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the serving cell PCI.

In yet another example (example-4.1.5), the BFD RS beam set q0, q00, or q01, and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, could include/indicate an index/ID of another higher layer RRC parameter, wherein one or more PCIs or PCI information could be indicated/included.

A BFD RS resource corresponding to a SSB resource/SSB index or a periodic 1-port CSI-RS resource/CSI-RS resource configuration index configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the indicated RRC parameter (and therefore, the corresponding PCI(s) or PCI information indicated/included therein). If the configured BFD RS beam set q0, q00, or q01 (and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) does not indicate/include any index/ID of any other RRC parameters indicating/including one or more PCIs or PCI information or the index/ID of another higher layer RRC parameter indicating/including one or more PCIs or PCI information is absent in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1), the UE could expect that a BFD RS resource configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the serving cell PCI.

In yet another example (example-4.1.6), the BFD RS beam set q0, q00, or q01, and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, could include/indicate an entity ID. In the present disclosure, an entity ID could correspond to a PCI value, a CORESETPoolIndex value, a TRP-specific index/ID value, a TRP-specific higher layer signaling index/ID value, or a TRP-specific RS set index/ID value.

A BFD RS resource corresponding to a SSB resource/SSB index or a periodic 1-port CSI-RS resource/CSI-RS resource configuration index configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the indicated entity ID (and therefore, the corresponding PCI value, CORESETPoolIndex value, TRP-specific index/ID value, TRP-specific higher layer signaling index/ID value or TRP-specific RS set index/ID value). If the configured BFD RS beam set q0, q00, or q01 (and therefore, the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) does not indicate/include any entity ID or the entity ID is absent in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1), the UE could expect that a BFD RS resource configured/indicated in the BFD RS beam set q0, q00, or q01 (and therefore, in the corresponding higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) is for or associated with the serving cell PCI.

In yet another example (example-4.1.7), when configured by the network to perform inter-cell BFR operation, e.g., when the UE is provided/configured by the network a higher layer parameter InterCellBFR set to "enabled," the (first) BFD RS beam set q00 (e.g., provided by failureDetectionResourcesToAddModList0/beamFailureDetectionResourceList0) could be configured for/associated with the serving cell PCI/PCI index (or a PCI/PCI index different from the serving cell PCI/PCI index), and the (second) BFD RS beam set q01 (e.g., provided by failureDetectionResourcesToAddModList1/beamFailureDetectionResourceList1) could be configured for/associated with the PCI/PCI index different from the serving cell PCI/PCI index (or the serving cell PCI/PCI index), wherein a PCI index corresponds/points to the corresponding PCI in a first/second list/set/pool of PCIs comprising PCI(s) different from the serving cell PCI or the serving cell PCI.

Alternatively, when the UE is provided/configured by the network the higher layer parameter InterCellBFR set to "enabled," the (first) BFD RS beam set q00 (e.g., provided by failureDetectionResourcesToAddModList0/beamFailureDetectionResourceList0) could be configured for/associated with the first (or second/last) PCI in the first/second list/set/pool of PCIs or the lowest (or highest) PCI in the first/second list/set/pool of PCIs or the PCI index corresponding/pointing to the lowest (or highest) PCI in the first/second list/set/pool of PCIs, and the (second) BFD RS beam set q01 (e.g., provided by failureDetectionResourcesToAddModList1/beamFailureDetectionResourceList1) could be configured for/associated with the second/last (or first) PCI in the first/second list/set/pool of PCIs or the highest (or lowest) PCI in the first/second list/set/pool of PCIs or the PCI index corresponding/pointing to the highest (or lowest) PCI in the first/second list/set/pool of PCIs.

Optionally, when the UE is provided/configured by the network the higher layer parameter InterCellBFR set to "enabled" and two different CORESETPoolIndex values 0 and 1 in PDCCH-Config for CORESETs, the (first) BFD RS beam set q00 (e.g., provided by failureDetectionResourcesToAddModList0/beamFailureDetectionResourceList0) could be configured for/associated with value 0 (or 1) of CORESETPoolIndex, and the (second) BFD RS beam set q01 (e.g., provided by failureDetectionResourcesToAddModList1/beamFailureDetectionResourceList1) could be configured for/associated with value 1 (or 0) of CORESETPoolIndex.

Furthermore, the first list/set/pool of PCIs could be determined/configured according to: (1), in one example, the UE could be higher layer configured by the network (e.g., via higher layer RRC signaling) the first list/set/pool of PCIs (e.g., including both the serving cell PCI and non-serving cell PCIs); and (2), in one another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.1.8), a set of at least one (e.g., M>1) entity IDs could be included/indicated/configured in the BFD RS beam set q0, q00, or q01 including/indicating/configuring a set of at least one (e.g., M>1) BFD RS resources such as SSB resources/SSB indexes or periodic 1-port CSI-RS resources/CSI-RS resource configuration indexes.

In the present disclosure, an entity ID could correspond to a PCI value (corresponding to either a serving cell PCI or a non-serving cell PCI), an index to an entry in a list of PCIs configured to the UE, a CORESETPoolIndex value, a TRP-specific index/ID value, a TRP-specific higher layer signaling index/ID value, a TRP-specific RS set index/ID value, a one-bit flag/indicator indicating either the serving cell PCI or a non-serving cell PCI or a multi-bit indicator with each state of the multi-bit indicator corresponding to a different PCI.

Each entity ID in the set of M entity IDs included/indicated/configured in the BFD RS beam set q0, q00, or q01 (provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) could correspond to one or more BFD RS resources such as SSB resources/SSB indexes or periodic 1-port CSI-RS resources/CSI-RS resource indexes configured/indicated/included in the BFD RS beam set q0, q00, or q01. For example, a set of M>1 PCI values could be included/indicated/configured in the BFD RS beam set q0, q00, or q01 (e.g., provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) including/indicating/configuring a set of M BFD RS resources such as SSB resources/SSB indexes or periodic 1-port CSI-RS resources/CSI-RS resource configuration indexes. Each of the M>1 indicated PCIs could correspond to a different BFD RS resource such as SSB resource/SSB index or periodic 1-port CSI-RS resource/CSI-RS resource index included/indicated/configured in the BFD RS beam set q0, q00, or q01.

For instance, in the BFD RS beam set q0, q00, or q01 provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, the m-th PCI or the m-th lowest (or the m-th highest) PCI value in the set of M>1 PCIs could correspond to the m-th BFD RS resource such as SSB resource/SSB index or periodic 1-port CSI-RS resource/CSI-RS resource configuration index in the BFD RS beam set q0, q00, or q01, where m=1, 2, . . . , M.

For another example, a set of M>1 indexes each pointing to an entry in a first list/set/pool of PCIs could be included/indicated/configured in the BFD RS beam set q0, q00, or q01 (e.g., provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) including/indicating/configuring a set of M BFD RS resources such as SSB resources/SSB indexes or periodic 1-port CSI-RS resources/CSI-RS resource indexes.

Each of the M>1 indicated indexes, and therefore, the corresponding entry/PCI in the first list/set/pool of PCIs could correspond to a different BFD RS resource such as SSB resource/SSB index or periodic 1-port CSI-RS resource/CSI-RS resource configuration index included/indicated/configured in the BFD RS beam set q0, q00, or q01.

For instance, in the BFD RS beam set q0, q00, or q01 provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, the m-th index in the set of M>1 indexes, and therefore, the corresponding entry/PCI in the first list/set/pool of PCIs, could correspond to the m-th BFD RS resource such as SSB resource/SSB index or periodic 1-port CSI-RS resource/CSI-RS resource configuration index in the BFD RS beam set q0, q00, or q01, where m=1, 2, . . . , M.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.1.9), a set of at least one (e.g., M1>1) entity IDs could be included/indicated/configured in the BFD RS beam set q0, q00, or q01 including/indicating/configuring a set of at least one (e.g., M>1) BFD RS resources such as SSB resources/SSB indexes or periodic 1-port CSI-RS resources/CSI-RS resource configuration indexes. In the present disclosure, an entity ID could correspond to a PCI value (corresponding to either a serving cell PCI or a non-serving cell PCI), an index to an entry in a list of PCIs configured to the UE, a CORESETPoolIndex value, a TRP-specific index/ID value, a TRP-specific higher layer signaling index/ID value, a TRP-specific RS set index/ID value, a one-bit flag/indicator indicating either the serving cell PCI or a non-serving cell PCI or a multi-bit indicator with each state of the multi-bit indicator corresponding to a different PCI.

Each entity ID in the set of M1 entity IDs included/indicated/configured in the BFD RS beam set q0, q00, or q01 (provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) could correspond to one or more BFD RS resources such as SSB resources/SSB indexes or periodic 1-port CSI-RS resources/CSI-RS resource configuration indexes configured/indicated/included in the BFD RS beam set q0, q00, or q01.

For example, a set of M1>1 PCI values could be included/indicated/configured in the BFD RS beam set q0, q00, or q01 (e.g., provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) including/indicating/configuring a first set of M BFD RS resources such as SSB resources/SSB indexes or periodic 1-port CSI-RS resources/CSI-RS resource configuration indexes.

Each of the M1>1 indicated PCIs could be associated with/linked to a second set of BFD RS resources such as SSB resources/SSB indexes or periodic 1-port CSI-RS resources/CSI-RS resource indexes out of the first set of BFD RS resources included/indicated/configured in the BFD RS beam set q0, q00, or q01.

For instance, the UE could be provided by the network in the BFD RS beam set q0, q00, or q01 provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1 (e.g., M1) PCI-BFDRS association parameters each indicating a PCI value and a second set of BFD RS resources such as SSB resources/SSB indexes or periodic 1-port CSI-RS resources/CSI-RS resource configuration indexes out of the first set of M BFD RS resources included/configured/indicated in the BFD RS beam set q0, q00, or q01. The second set of BFD RS resources and the PCI value indicated in the same PCI-BFDRS association parameter are associated, i.e., the second set of BFD RS resources are configured for the PCI if they are indicated in the same PCI-BFDRS association parameter.

For another example, a set of M1>1 indexes pointing to M1>1 entries in a first list/set/pool of PCIs could be included/indicated/configured in the BFD RS beam set q0, q00, or q01 (e.g., provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) including/indicating/configuring a set of M BFD RS resources such as SSB resources/SSB indexes or periodic 1-port CSI-RS resources/CSI-RS resource configuration indexes.

Each of the M1>1 indicated indexes, and therefore, the corresponding entry/PCI in the first list/set/pool of PCIs could be associated with/linked to a second set of BFD RS resources such as SSB resources/SSB indexes or periodic 1-port CSI-RS resources/CSI-RS resource configuration indexes out of the first set of M BFD RS resources included/indicated/configured in the BFD RS beam set q0, q00, or q01.

For instance, the UE could be provided by the network in the BFD RS beam set q0, q00, or q01 provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1 (e.g., M1) PCIidx-BFDRS association parameters each indicating an index pointing to an entry/PCI in the first set/list/pool of PCIs and a second set of BFD RS resources such as SSB resources/SSB indexes or periodic 1-port CSI-RS resources/CSI-RS resource configuration indexes out of the first set of M BFD RS resources included/configured/indicated in the BFD RS beam set q0, q00, or q01.

The second set of BFD RS resources and the index, and therefore the corresponding entry/PCI in the first set/pool/list of PCIs indicated in the same PCIidx-BFDRS association parameter are associated, i.e., the second set of BFD RS resources are configured for the index, and therefore the corresponding entry/PCI in the first set/pool/list of PCIs if they are indicated in the same PCIidx-BFDRS parameter.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.1.10), a set of at least one (e.g., M1>1) entity IDs could be included/indicated/configured in the BFD RS beam set q0, q00, or q01 including/indicating/configuring a set of at least one (e.g., M>1) BFD RS resources such as SSB resources/SSB indexes or periodic 1-port CSI-RS resources/CSI-RS resource configuration indexes.

In the present disclosure, an entity ID could correspond to a PCI value (corresponding to either a serving cell PCI or a non-serving cell PCI), an index to an entry in a list of PCIs configured to the UE, a CORESETPoolIndex value, a TRP-specific index/ID value, a TRP-specific higher layer signaling index/ID value, a TRP-specific RS set index/ID value, a one-bit flag/indicator indicating either the serving cell PCI or a non-serving cell PCI or a multi-bit indicator with each state of the multi-bit indicator corresponding to a different PCI.

Each entity ID in the set of M1 entity IDs included/indicated/configured in the BFD RS beam set q0, q00, or q01 (provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) could correspond to one or more BFD RS resources such as SSB resources/SSB indexes or periodic 1-port CSI-RS resources/CSI-RS resource configuration indexes configured/indicated/included in the BFD RS beam set q0, q00, or q01. The set of M BFD RS resources could be partitioned/divided into M1 groups of BFD RS resources each including/indicating/configuring one or more BFD RS resources. Here, a group of BFD RS resources could be referred to as a BFD RS resource group.

For instance, the r-th BFD RS resource group (e.g., the r-th BFD RS resource group) among the M1 BFD RS resource groups (r=1, . . . , M1) could comprise/include $k_r$ BFD RS resources such as SSB resources/SSB indexes or periodic 1-port CSI-RS resources/CSI-RS resource configuration indexes out of the total M BFD RS resources; hence, $M = \sum_{r=1}^{M1} k_r$.

In this case, each entity ID in the set of M1 entity IDs included/indicated/configured in the BFD RS beam set q0, q00, or q01 (provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) could correspond to one or more BFD RS resource groups included/indicated/configured in the BFD RS beam set q0, q00, or q01.

For example, a set of M1>1 PCI values could be included/indicated/configured in the BFD RS beam set q0, q00, or q01 (e.g., provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) including/indicating/configuring a set of M BFD RS resources such as SSB resources/SSB indexes or periodic 1-port CSI-RS resources/CSI-RS resource configuration indexes, which are further divided/partitioned into M1 BFD RS resource groups as discussed above.

Each of the M1>1 indicated PCIs could correspond to a different BFD RS resource group including/indicating/configuring one or more SSB resources/SSB indexes or one or more periodic 1-port CSI-RS resources/CSI-RS resource configuration indexes included/indicated/configured in the BFD RS beam set q0, q00, or q01. For instance, in the BFD RS beam set q0, q00, or q01 provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, the r-th PCI or the r-th lowest (or the r-th highest) PCI value in the set of M1>1 PCIs could correspond to the r-th BFD RS resource group including/indicating/configuring one or more SSB resources/SSB indexes or one or more periodic 1-port CSI-RS resources/CSI-RS resource configuration indexes among the M1 BFD RS resource groups partitioned/divided from the set of M>1 BFD RS resources; that is, the r-th BFD RS resource group, and therefore the corresponding SSB resources/SSB indexes or periodic 1-port CSI-RS resources/CSI-RS resource configuration indexes configured therein, is configured for the r-th PCI, where r=1, 2, . . . , M1.

Optionally, the serving cell PCI could correspond to the s-th BFD RS resource group including/indicating/configuring one or more SSB resources/SSB indexes or one or more periodic 1-port CSI-RS resources/CSI-RS resource configuration indexes among the M1 BFD RS resource groups partitioned/divided from the set of M>1 BFD RS resources; that is, the s-th BFD RS resource group, and therefore the corresponding SSB resources/SSB indexes or periodic 1-port CSI-RS resources/CSI-RS resource configuration indexes configured therein, is configured for the serving cell PCI, where s could be determined according to: (1) fixed in the system specifications or deterministic per RRC configuration, e.g., 1 (i.e., the $1^{st}$ BFD RS resource group), (2) configured/indicated by the network, or (3) autonomously determined by the UE.

For another example, a set of M1>1 indexes pointing to M1>1 entries in a first list/set/pool of PCIs could be included/indicated/configured in the BFD RS beam set q0, q00, or q01 (e.g., provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) including/indicating/configuring a set of M BFD RS resources such as SSB resources/SSB indexes or periodic 1-port CSI-RS resources/CSI-RS resource configuration indexes, which are further partitioned/divided into M1 BFD RS resource groups as discussed above.

Each of the M1>1 indicated indexes, and therefore, the corresponding entry/PCI in the first list/set/pool of PCIs could correspond to a different BFD RS resource group including/indicating/configuring one or more SSB resources/SSB indexes or one or more periodic 1-port CSI-RS resources/CSI-RS resource configuration indexes.

For instance, in the BFD RS beam set q0, q00, or q01 provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, the r-th index in the set of M1>1 indexes, and therefore, the corresponding entry/PCI in the first list/set/pool of PCIs, could correspond to the r-th BFD RS resource group including/indicating/configuring one or more SSB resources/SSB indexes or one or more periodic 1-port CSI-RS resources/CSI-RS resource configuration indexes among the M1 BFD RS resource groups partitioned/divided from the set of M>1 BFD RS resources; that is, the r-th BFD RS resource group, and therefore the corresponding SSB resources/SSB indexes or periodic 1-port CSI-RS resources/CSI-RS resource configuration indexes configured therein, is configured for the r-th index, and therefore the corresponding entry/PCI in the first set/list/pool of PCIs, where r=1, 2, . . . , M1.

Optionally, the index corresponding to the serving cell PCI in the first set/list/pool of PCIs could correspond to the s-th BFD RS resource group including/indicating/configuring one or more SSB resources/SSB indexes or one or more periodic 1-port CSI-RS resources/CSI-RS resource configuration indexes among the M1 BFD RS resource groups partitioned/divided from the set of M>1 BFD RS resources; that is, the s-th BFD RS resource group, and therefore the corresponding SSB resources/SSB indexes or periodic 1-port CSI-RS resources/CSI-RS resource configuration indexes configured therein, is configured for the index pointing to the serving cell PCI in the first set/list/pool of PCIs, and therefore the serving cell PCI, where s could be determined according to: (1) fixed in the system specifications or deterministic per RRC configuration, e.g., 1 (i.e., the $1^{st}$ BFD RS resource group), (2) configured/indicated by the network, or (3) autonomously determined by the UE.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.1.11), a set of at least one (e.g., M1>1) entity IDs could be included/indicated/configured in the BFD RS beam set q0, q00, or q01 including/indicating/configuring a set of at least one (e.g., M>1) BFD RS resources such as SSB resources/SSB indexes or periodic 1-port CSI-RS resources/CSI-RS resource configuration indexes.

In the present disclosure, an entity ID could correspond to a PCI value (corresponding to either a serving cell PCI or a non-serving cell PCI), an index to an entry in a list of PCIs configured to the UE, a CORESETPoolIndex value, a TRP-specific index/ID value, a TRP-specific higher layer signaling index/ID value, a TRP-specific RS set index/ID value, a one-bit flag/indicator indicating either the serving cell PCI or a non-serving cell PCI or a multi-bit indicator with each state of the multi-bit indicator corresponding to a different PCI.

Each entity ID in the set of M1 entity IDs included/indicated/configured in the BFD RS beam set q0, q00, or q01 (provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1) could correspond to one or more BFD RS resources such as SSB resources/SSB indexes or periodic 1-port CSI-RS resources/CSI-RS resource configuration indexes configured/indicated/included in the BFD RS beam set q0, q00, or q01.

The UE could be provided by the network in the BFD RS beam set q0, q00, or q01 provided by the higher layer parameter failureDetectionResourcesToAddModList/beamFailureDetectionResourceList or failureDetectionResourcesToAddModList0/beamFailureDetectionResourceList0 or failureDetectionResourcesToAddModList1/beamFailureDetectionResourceList1, M1 groups of BFD RS resources each including/indicating/configuring one or more BFD RS resources obtained/configured from the set of M BFD RS resources, i.e., the BFD RS beam set q0, q00, or q01.

Here, a group of BFD RS resources could be referred to as a BFD RS resource group. For instance, the r-th configured BFD RS resource group among the M1 configured BFD RS resource groups could comprise/include $k_r$ BFD RS resources such as SSB resources/SSB resource indexes or periodic 1-port CSI-RS resources/CSI-RS resource configuration indexes out of the total M BFD RS resources; hence, $M=\Sigma_{r=1}^{M1}k_r$. Each configured BFD RS resource group could include/indicate/configure an entity ID (e.g., one of M1 entity IDs).

For example, each configured BFD RS resource group could include/indicate/configure a PCI value. The BFD RS resources (SSB resources/SSB indexes or periodic 1-port CSI-RS resources/CSI-RS resource configuration indexes) in a BFD RS resource group are configured for the PCI indicated in the same BFD RS resource group.

Optionally, the s-th configured BFD RS resource group among the M1 configured BFD RS resource groups could include/indicate/configure the serving cell PCI; that is, the SSB resources/SSB indexes or periodic 1-port CSI-RS resources/CSI-RS resource configuration indexes in the s-th BFD RS resource group are configured for the serving cell PCI, where s could be determined according to: (1) fixed in the system specifications or deterministic per RRC configuration, e.g., 1 (i.e., the $1^{st}$ BFD RS resource group), (2) configured/indicated by the network, or (3) autonomously determined by the UE.

For another example, each configured BFD RS resource group could include/indicate/configure an index pointing to an entry/PCI in a first list/set/pool of PCIs. The BFD RS resources (SSB resources/SSB indexes or periodic 1-port CSI-RS resources/CSI-RS resource configuration indexes) in a BFD RS resource group are configured for the index indicated in the same BFD RS resource group, and therefore the corresponding entry/PCI in the first list/set/pool of PCIs.

Optionally, the s-th configured BFD RS resource group among the M1 configured BFD RS resource groups could include/indicate/configure the index corresponding to the serving cell PCI in the first set/list/pool of PCIs; that is, the SSB resources/SSB indexes or periodic 1-port CSI-RS resources/CSI-RS resource configuration indexes in the s-th BFD RS resource group are configured for the index pointing to the serving cell PCI in the first set/list/pool of PCIs, and therefore the serving cell PCI, where s could be determined according to: (1) fixed in the system specifications or deterministic per RRC configuration, e.g., 1 (i.e., the $1^{st}$ BFD RS resource group), (2) configured/indicated by the network, or (3) autonomously determined by the UE.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

As discussed above, a BFD RS resource in the BFD RS beam set q0, q00, or q01 could correspond to a periodic 1-port CSI-RS resource/CSI-RS resource configuration index, e.g., provided by the higher layer parameter NZP-CSI-RS-Resource. A periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, could be for or associated with a PCI (e.g., corresponding to a non-serving cell PCI) if the PCI information/value is indicated/included in the corresponding parameter configuring the periodic 1-port CSI-RS resource/CSI-RS resource configuration index, e.g., in the higher layer parameter NZP-CSI-RS-Resource.

In one example (example-4.1.12), the parameter configuring a periodic 1-port CSI-RS resource/CSI-RS resource configuration index, e.g., the higher layer parameter NZP-CSI-RS-Resource, could include/indicate a PCI value, e.g., corresponding to either a serving cell PCI or a non-serving cell PCI. The periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the PCI indicated/configured in the same NZP-CSI-RS-Resource.

If the higher layer parameter, e.g., NZP-CSI-RS-Resource, configuring the periodic 1-port CSI-RS resource/CSI-RS resource configuration index does not indicate/include any PCI value(s) or the PCI is absent in the higher layer parameter, e.g., NZP-CSI-RS-Resource, configuring the periodic 1-port CSI-RS resource/CSI-RS resource configuration index, the UE could expect that the periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the serving cell PCI.

In another example (example-4.1.13), the parameter configuring a periodic 1-port CSI-RS resource/CSI-RS resource configuration index, e.g., the higher layer parameter NZP-CSI-RS-Resource could include/indicate a one-bit indicator/flag indicating either the serving cell PCI or a non-serving cell PCI. For instance, the periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, with the one-bit indicator/flag set to "1"/"ON"/"enabled" could be for or associated with the serving cell PCI (or the non-serving cell PCI), and the periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, with the one-bit indicator/flag set to "0"/"OFF"/"disabled" could be for or associated with the non-serving cell PCI (or the serving cell PCI).

If the higher layer parameter NZP-CSI-RS-Resource configuring the periodic 1-port CSI-RS resource/CSI-RS resource configuration index does not indicate/include the one-bit flag/indicator or the one-bit flag/indication is absent in the higher layer parameter NZP-CSI-RS-Resource configuring the periodic 1-port CSI-RS resource/CSI-RS resource configuration index, the UE could expect that the periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the serving cell PCI.

In yet another example (example-4.1.14), the parameter configuring a periodic 1-port CSI-RS resource/CSI-RS resource configuration index, e.g., the higher layer parameter NZP-CSI-RS-Resource could include/indicate a multi-bit indicator with each state of the multi-bit indicator corresponding to a PCI (e.g., either a serving cell PCI or a non-serving cell PCI). The periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the PCI associated with/corresponding to the multi-bit indicator indicated/configured in the same NZP-CSI-RS-Resource.

If the higher layer parameter NZP-CSI-RS-Resource configuring the periodic 1-port CSI-RS resource/CSI-RS resource configuration index does not indicate/include the multi-bit indicator or the multi-bit indicator is absent in the higher layer parameter NZP-CSI-RS-Resource configuring the periodic 1-port CSI-RS resource/CSI-RS resource configuration index, the UE could expect that the periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the serving cell PCI.

In yet another example (example-4.1.15), the parameter configuring a periodic 1-port CSI-RS resource/CSI-RS resource configuration index, e.g., the higher layer parameter NZP-CSI-RS-Resource could include/indicate an index pointing to an entry in a first set/list/pool of PCIs (e.g., including both the serving cell PCI and non-serving cell PCIs configured to the UE). The periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the index, and therefore the corresponding entry/PCI in the first set/list/pool of PCIs, indicated in the same NZP-CSI-RS-Resource.

If the higher layer parameter NZP-CSI-RS-Resource configuring the periodic 1-port CSI-RS resource/CSI-RS resource configuration index does not indicate/include any index to an entry in the first set/list/pool of PCIs or the index to an entry in the first set/list/pool of PCIs is absent in the higher layer parameter NZP-CSI-RS-Resource configuring the periodic 1-port CSI-RS resource/CSI-RS resource configuration index, the UE could expect that the periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the serving cell PCI.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.1.16), the parameter configuring a periodic 1-port CSI-RS resource/CSI-RS resource configuration index, e.g., the higher layer parameter NZP-CSI-RS-Resource could include/indicate an index/ID of another higher layer RRC parameter, wherein one or more PCIs or PCI information could be indicated/included. The periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the RRC parameter (and therefore, the corresponding PCI(s) or PCI information indicated/included therein) indicated in the same NZP-CSI-RS-Resource.

If the higher layer parameter NZP-CSI-RS-Resource configuring the periodic 1-port CSI-RS resource/CSI-RS resource configuration index does not indicate/include any index/ID of any other RRC parameters indicating/including one or more PCIs or PCI information or the index/ID of another higher layer RRC parameter indicating/including one or more PCIs or PCI information is absent in the higher layer parameter NZP-CSI-RS-Resource configuring the periodic 1-port CSI-RS resource/CSI-RS resource configuration index, the UE could expect that the periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the serving cell PCI.

In yet another example (example-4.1.17), the parameter configuring a periodic 1-port CSI-RS resource/CSI-RS resource configuration index, e.g., the higher layer parameter NZP-CSI-RS-Resource could include/indicate an entity ID. In the present disclosure, an entity ID could correspond to a PCI value, a CORESETPoolIndex value, a TRP-specific index/ID value, a TRP-specific higher layer signaling index/ID value, or a TRP-specific RS set index/ID value. The periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the entity ID (and therefore, the corresponding PCI value, CORESETPoolIndex value, TRP-specific index/ID value, TRP-specific higher layer signaling index/ID value or TRP-specific RS set index/ID value) indicated in the same NZP-CSI-RS-Resource.

If the higher layer parameter NZP-CSI-RS-Resource configuring the periodic 1-port CSI-RS resource/CSI-RS resource configuration index does not indicate/include any entity ID or the entity ID is absent in the higher layer parameter NZP-CSI-RS-Resource configuring the periodic 1-port CSI-RS resource/CSI-RS resource configuration index, the UE could expect that the periodic 1-port CSI-RS resource/CSI-RS resource configuration index provided by the higher layer parameter NZP-CSI-RS-Resource, and therefore, the corresponding BFD RS resource in the BFD RS beam set q0, q00, or q01, is for or associated with the serving cell PCI.

In yet another example (example-4.1.18), a periodic 1-port CSI-RS resource/CSI-RS resource configuration index could be quasi co-located (QCL'ed) with a SSB resource/SSB resource index associated with an entity ID. In the present disclosure, an entity ID could correspond to a PCI value, a PCI index pointing/corresponding to an entry/PCI in a list of PCIs that are higher layer configured to the UE, a CORESETPoolIndex value, a TRP-specific index/ID value, a TRP-specific higher layer signaling index/ID value, or a TRP-specific RS set index/ID value.

For instance, a SSB resource/SSB resource index could be configured as a QCL source RS in a TCI state, and the corresponding TCI state ID/index could be indicated in the parameter, e.g., the higher layer parameter NZP-CSI-RS-Resource, configuring a periodic 1-port CSI-RS resource/CSI-RS resource configuration index. For this case, the periodic 1-port CSI-RS resource/CSI-RS resource configuration index is said to be quasi co-located (QCL'ed) with the SSB resource/SSB resource index and associated with the same entity ID as that associated with the SSB resource/SSB resource index.

Hence, if the periodic 1-port CSI-RS resource/CSI-RS resource configuration index is configured as a BFD RS resource in the BFD RS beam set q0, q00, or q01, the BFD RS resource is for or associated with the entity ID (and therefore, the corresponding PCI value, PCI index pointing/corresponding to an entry/PCI in a list of PCIs that are higher layer configured to the UE, CORESETPoolIndex value, TRP-specific index/ID value, TRP-specific higher layer signaling index/ID value or TRP-specific RS set index/ID value).

As discussed above, a BFD RS resource in the BFD RS beam set q0, q00, or q01 could correspond to a SSB resource/SSB index, e.g., provided by the higher layer parameter SSB-Index. A SSB resource/SSB index provided by the higher layer parameter SSB-Index, and therefore, the corresponding BFD RS resource in the BFD RS beam set q0, q00, or q01, could be for or associated with a PCI (e.g., corresponding to a non-serving cell PCI) if the PCI information/value is indicated/included in the corresponding parameter configuring the SSB resource/SSB index, e.g., in the higher layer parameter SSB-Index.

In one example (example-4.1.19), the parameter configuring a SSB resource/SSB index, e.g., the higher layer parameter SSB-Index, could include/indicate a PCI value, e.g., corresponding to either a serving cell PCI or a non-serving cell PCI. The SSB resource/SSB index provided by the higher layer parameter SSB-Index, and therefore, the corresponding BFD RS resource in the BFD RS beam set q0, q00, or q01, is for or associated with the PCI indicated/configured in the same SSB-Index.

If the higher layer parameter, e.g., SSB-Index, configuring the SSB resource/SSB index does not indicate/include any PCI value(s) or the PCI is absent in the higher layer parameter, e.g., SSB-Index, configuring the SSB resource/SSB index, the UE could expect that the SSB resource/SSB index provided by the higher layer parameter SSB-Index, and therefore, the corresponding BFD RS resource in the BFD RS beam set q0, q00, or q01, is for or associated with the serving cell PCI.

In another example (example-4.1.20), the parameter configuring a SSB resource/SSB index, e.g., the higher layer parameter SSB-Index could include/indicate a one-bit indicator/flag indicating either the serving cell PCI or a non-serving cell PCI. For instance, the SSB resource/SSB index provided by the higher layer parameter SSB-Index, and therefore, the corresponding BFD RS resource in the BFD RS beam set q0, q00, or q01, with the one-bit indicator/flag set to "1"/"ON"/"enabled" could be for or associated with the serving cell PCI (or the non-serving cell PCI), and the SSB resource/SSB index provided by the higher layer parameter SSB-Index, and therefore, the corresponding BFD RS resource in the BFD RS beam set q0, q00, or q01, with the one-bit indicator/flag set to "0"/"OFF"/"disabled" could be for or associated with the non-serving cell PCI (or the serving cell PCI).

If the higher layer parameter SSB-Index configuring the SSB resource/SSB index does not indicate/include the one-bit flag/indicator or the one-bit flag/indication is absent in the higher layer parameter SSB-Index configuring the SSB resource/SSB index, the UE could expect that the SSB resource/SSB index provided by the higher layer parameter SSB-Index, and therefore, the corresponding BFD RS resource in the BFD RS beam set q0, q00, or q01, is for or associated with the serving cell PCI.

In yet another example (example-4.1.21), the parameter configuring a SSB resource/SSB index, e.g., the higher layer parameter SSB-Index could include/indicate a multi-bit indicator with each state of the multi-bit indicator corresponding to a PCI (e.g., either a serving cell PCI or a non-serving cell PCI). The SSB resource/SSB index provided by the higher layer parameter SSB-Index, and therefore, the corresponding BFD RS resource in the BFD RS beam set q0, q00, or q01, is for or associated with the PCI associated with/corresponding to the multi-bit indicator indicated/configured in the same SSB-Index.

If the higher layer parameter SSB-Index configuring the SSB resource/SSB index does not indicate/include the multi-bit indicator or the multi-bit indicator is absent in the higher layer parameter SSB-Index configuring the SSB resource/SSB index, the UE could expect that the SSB resource/SSB index provided by the higher layer parameter SSB-Index, and therefore, the corresponding BFD RS resource in the BFD RS beam set q0, q00, or q01, is for or associated with the serving cell PCI.

In yet another example (example-4.1.22), the parameter configuring a SSB resource/SSB index, e.g., the higher layer parameter SSB-Index could include/indicate an index pointing to an entry in a first set/list/pool of PCIs (e.g., including both the serving cell PCI and non-serving cell PCIs configured to the UE). The SSB resource/SSB index provided by the higher layer parameter SSB-Index, and therefore, the corresponding BFD RS resource in the BFD RS beam set q0, q00, or q01, is for or associated with the index, and therefore the corresponding entry/PCI in the first set/list/pool of PCIs, indicated in the same SSB-Index.

If the higher layer parameter SSB-Index configuring the SSB resource/SSB index does not indicate/include any index to an entry in the first set/list/pool of PCIs or the index to an entry in the first set/list/pool of PCIs is absent in the higher layer parameter SSB-Index configuring the SSB resource/SSB index, the UE could expect that the SSB resource/SSB index provided by the higher layer parameter SSB-Index, and therefore, the corresponding BFD RS resource in the BFD RS beam set q0, q00, or q01, is for or associated with the serving cell PCI.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.1.23), the parameter configuring a SSB resource/SSB index, e.g., the higher layer parameter SSB-Index could include/indicate an index/ID of another higher layer RRC parameter, wherein one or more PCIs or PCI information could be indicated/included. The SSB resource/SSB index provided by the higher layer parameter SSB-Index, and therefore, the corresponding BFD RS resource in the BFD RS beam set q0, q00, or q01, is for or associated with the RRC parameter (and therefore, the corresponding PCI(s) or PCI information indicated/included therein) indicated in the same SSB-Index.

If the higher layer parameter SSB-Index configuring the SSB resource/SSB index does not indicate/include any index/ID of any other RRC parameters indicating/including one or more PCIs or PCI information or the index/ID of another higher layer RRC parameter indicating/including one or more PCIs or PCI information is absent in the higher layer parameter SSB-Index configuring the SSB resource/SSB index, the UE could expect that the SSB resource/SSB index provided by the higher layer parameter SSB-Index, and therefore, the corresponding BFD RS resource in the BFD RS beam set q0, q00, or q01, is for or associated with the serving cell PCI.

In yet another example (example-4.1.24), the parameter configuring a SSB resource/SSB index, e.g., the higher layer parameter SSB-Index could include/indicate an entity ID. In the present disclosure, an entity ID could correspond to a PCI value, a CORESETPoolIndex value, a TRP-specific index/ID value, a TRP-specific higher layer signaling index/ID value, or a TRP-specific RS set index/ID value. The SSB resource/SSB index provided by the higher layer parameter SSB-Index, and therefore, the corresponding BFD RS resource in the BFD RS beam set q0, q00, or q01, is for or associated with the entity ID (and therefore, the corresponding PCI value, CORESETPoolIndex value, TRP-specific index/ID value, TRP-specific higher layer signaling index/ID value or TRP-specific RS set index/ID value) indicated in the same SSB-Index.

If the higher layer parameter SSB-Index configuring the SSB resource/SSB index does not indicate/include any entity ID or the entity ID is absent in the higher layer parameter SSB-Index configuring the SSB resource/SSB index, the UE could expect that the SSB resource/SSB index provided by the higher layer parameter SSB-Index, and therefore, the corresponding BFD RS resource in the BFD RS beam set q0, q00, or q01, is for or associated with the serving cell PCI.

If the UE is not configured by the network any BFD RS resource(s) via the above discussed explicit BFD RS resource configuration method(s)/option(s), the UE could determine a periodic 1-port CSI-RS resource/CSI-RS resource configuration index or SSB resource/SSB index indicated/configured as a QCL-TypeD (i.e., spatial quasi-co-location) source RS in an active TCI state for respective PDCCH reception in a CORESET as a BFD RS in a BFD RS beam set, e.g., q0, wherein the active TCI state for PDCCH reception or the CORESET could be associated with/linked to a PCI (e.g., corresponding to either the serving cell PCI or a non-serving cell PCI).

Optionally, the UE could determine $S\_q0$ ($S\_q0 \geq 2$) BFD RS beam sets (q00 and q01 for $S\_q0=2$) each containing $N\_q0$ ($N\_q0 \geq 1$) BFD RS resources; the BFD RS resources in each BFD RS beam (q00 or q01 for $S\_q0=2$) could correspond to periodic 1-port CSI-RS resources/CSI-RS resource configuration indexes or SSB resources/SSB indexes with same values as the QCL-TypeD source RS indexes indicated in active TCI states for PDCCH reception in respective CORESETs that the UE uses for monitoring the PDCCH(s), wherein one or more of the active TCI states for PDCCH reception or one or more of the respective CORESETs could be associated with/linked to a PCI (e.g., corresponding to either the serving cell PCI or a non-serving cell PCI).

Various means of determining a BFD RS resource in the BFD RS beam set q0, q00, or q01 for a PCI (e.g., corresponding to either the serving cell PCI or a non-serving cell PCI) are presented as following examples.

In one example (example-4.1.25), a BFD RS resource in the BFD RS beam set q0, q00, or q01 could correspond to a periodic 1-port CSI-RS resource/CSI-RS resource configuration index or SSB resource/SSB index having the same value as the QCL-TypeD source RS index indicated in an active TCI state for PDCCH reception in a CORESET, where the CORESET is configured with a CORESETPoolIndex (e.g., either 0 or 1) associated with a PCI. For instance, CORESETPoolIndex value 0 is associated with the serving cell PCI, and CORESETPoolIndex value 1 is associated with a non-serving cell PCI. In this case, a BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in an active TCI state for PDCCH reception in a CORESET configured with a CORESETPoolIndex is for the PCI associated with the CORESETPoolIndex.

In another example (example-4.1.26), a BFD RS resource in the BFD RS beam set q0, q00, or q01 could correspond to a periodic 1-port CSI-RS resource/CSI-RS resource configuration index or SSB resource/SSB index having the same value as the QCL-TypeD source RS index indicated in an active TCI state for PDCCH reception in a CORESET, where the active TCI state for PDCCH reception could be associated with a PCI (corresponding to either the serving cell PCI or a non-serving cell PCI), and therefore, the BFD RS resource is for the PCI.

For example, the parameter (e.g., the higher layer parameter TCI-State/QCL-Info) configuring the active TCI state for PDCCH reception in a CORESET could include/indicate a PCI value. In this case, a BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in an active TCI state for PDCCH reception in a CORESET is for the PCI indicated/configured in the parameter configuring the active TCI state for PDCCH reception. If the parameter (e.g., the higher layer parameter TCI-State/QCL-Info) configuring the active TCI state for PDCCH reception in a CORESET does not include/indicate any PCI value, or a PCI value is absent in the parameter (e.g., the higher layer parameter TCI-State/QCL-Info) configuring the active TCI state for PDCCH reception in a CORESET, the BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in the active TCI state for PDCCH reception in a CORESET is for the serving cell PCI.

For another example, the parameter (e.g., the higher layer parameter TCI-State/QCL-Info) configuring the active TCI state for PDCCH reception in a CORESET could include/indicate a one-bit flag/indicator indicating either the serving cell PCI or a non-serving cell PCI. For instance, the serving cell PCI is indicated by setting the one-bit flag/indicator to "0," while a non-serving cell PCI is indicated by setting the one-bit flag/indicator to "1." In this case, a BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in an active TCI state for PDCCH reception in a CORESET is for the PCI indicated by the one-bit flag/indicator indicated/configured in the parameter configuring the active TCI state for PDCCH reception.

If the parameter (e.g., the higher layer parameter TCI-State/QCL-Info) configuring the active TCI state for PDCCH reception in a CORESET does not include/indicate the one-bit flag/indicator, or the one-bit flag/indicator is absent in the parameter (e.g., the higher layer parameter TCI-State/QCL-Info) configuring the active TCI state for PDCCH reception in a CORESET, the BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in the active TCI state for PDCCH reception in a CORESET is for the serving cell PCI.

Yet for another example, the parameter (e.g., the higher layer parameter TCI-State/QCL-Info) configuring the active TCI state for PDCCH reception in a CORESET could include/indicate a multi-bit indicator with each state of the multi-bit indicator indicating a PCI (e.g., corresponding to either the serving cell PCI or a non-serving cell PCI). In this case, a BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in an active TCI state for PDCCH reception in a CORESET is for the PCI indicated by the multi-bit indicator indicated/configured in the parameter configuring the active TCI state for PDCCH reception.

If the parameter (e.g., the higher layer parameter TCI-State/QCL-Info) configuring the active TCI state for PDCCH reception in a CORESET does not include/indicate the multi-bit indicator, or the multi-bit indicator is absent in the parameter (e.g., the higher layer parameter TCI-State/QCL-Info) configuring the active TCI state for PDCCH reception in a CORESET, the BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in the active TCI state for PDCCH reception in a CORESET is for the serving cell PCI.

Yet for another example, the parameter (e.g., the higher layer parameter TCI-State/QCL-Info) configuring the active TCI state for PDCCH reception in a CORESET could include/indicate an index pointing to an entry in a first set/list/pool of PCIs (e.g., including both the serving cell PCI and non-serving cell PCI(s)). In this case, a BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in an active TCI state for PDCCH reception in a CORESET is for the entry/PCI in the first set/list/pool of PCIs indicated by the index indicated/configured in the parameter configuring the active TCI state for PDCCH reception.

If the parameter (e.g., the higher layer parameter TCI-State/QCL-Info) configuring the active TCI state for PDCCH reception in a CORESET does not include/indicate the index pointing to an entry in the first set/list/pool of PCIs, or the index pointing to an entry in the first set/list/pool of PCIs is absent in the parameter (e.g., the higher layer parameter TCI-State/QCL-Info) configuring the active TCI state for PDCCH reception in a CORESET, the BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in the active TCI state for PDCCH reception in a CORESET is for the serving cell PCI.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

Yet for another example, the parameter (e.g., the higher layer parameter TCI-State/QCL-Info) configuring the active TCI state for PDCCH reception in a CORESET could include/indicate an entity ID. In the present disclosure, an entity ID could correspond to a PCI value, a CORESET-PoolIndex value, a TRP-specific index/ID value, a TRP-specific higher layer signaling index/ID value, or a TRP-specific RS set index/ID value. In this case, a BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in an active TCI state for PDCCH reception in a CORESET is for the entity ID indicated/configured in the parameter configuring the active TCI state for PDCCH reception.

If the parameter (e.g., the higher layer parameter TCI-State/QCL-Info) configuring the active TCI state for PDCCH reception in a CORESET does not include/indicate the entity ID, or the entity ID is absent in the parameter (e.g., the higher layer parameter TCI-State/QCL-Info) configuring the active TCI state for PDCCH reception in a CORESET, the BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in the active TCI state for PDCCH reception in a CORESET is for the serving cell PCI.

Yet for another example, the parameter (e.g., the higher layer parameter TCI-State/QCL-Info) configuring the active TCI state for PDCCH reception in a CORESET could include/indicate an index/ID of another higher layer RRC parameter configuring the non-serving cell information including but not limited to one or more PCIs, non-serving cell SSB information such as SSB time-domain position, SSB frequency, SSB transmit power and etc. In this case, a BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in an active TCI state for PDCCH reception in a CORESET is for the non-serving cell(s) indicated in the RRC parameter configuring the non-serving cell information indicated by the index/ID of the RRC parameter indicated/configured in the parameter configuring the active TCI state for PDCCH reception.

If the parameter (e.g., the higher layer parameter TCI-State/QCL-Info) configuring the active TCI state for PDCCH reception in a CORESET does not include/indicate the index/ID of the RRC parameter configuring the non-serving cell information, or the index/ID of the RRC parameter configuring the non-serving cell information is absent in the parameter (e.g., the higher layer parameter TCI-State/QCL-Info) configuring the active TCI state for PDCCH reception in a CORESET, the BFD RS resource in the BFD RS beam set q0, q00, or q01 corresponding to a periodic 1-port CSI-RS resource/CSI-RS resource configuration index or SSB resource/SSB index having the same value as the QCL-TypeD source RS index indicated in the active TCI state for PDCCH reception in a CORESET is for the serving cell PCI.

In the present disclosure, a UE can be provided in PDSCH-Config a first list/set/pool of up to N_tot_tci (e.g., N_tot_tci=128) TCI states or TCI state IDs, wherein each TCI state (or TCI state corresponding to each TCI state ID) in the first list/set/pool can be provided by DLorJointT-CIState or UL-TCIState configuration. Each of the N_tot_tci TCI states could contain/include/indicate one or more reference signals (RSs) or RS indexes for the quasi co-location for DM-RS of PDSCH and DM-RS of PDCCH, for CSI-RS, and to provide a reference for determining UL transmit spatial filter for dynamic-grant and configured-grant based PUSCH and PUCCH resource, and SRS. Furthermore, one or more of the RSs or RS indexes indicated/included/contained in the N_tot_tci TCI states can be used to configure BFD RS(s) or NBI RS(s). For instance, the UE could be configured/provided by the network a second list/set/pool of N_tot_rs (e.g., 1≤N_tot_rs≤N_tot_tci) TCI states or TCI state IDs, wherein each TCI state (or TCI state corresponding to each TCI state ID) in the second list/set/pool can be provided by DLorJointTCIState or UL-TCIState configuration, and can map to a TCI state or TCI state ID in the first list/set/pool.

In one example (example-4.A), the second list/set/pool of TCI states/TCI state IDs corresponds to or is the same as the first list/set/pool of TCI states/TCI state IDs. For this case, N_tot_rs=N_tot_tci.

In another example (example-4.B), the mapping between the N_tot_rs TCI states/TCI state IDs in the second list/set/pool of N_tot_rs TCI states/TCI state IDs and one or more (e.g., N_tot_rs) TCI states/TCI state IDs in the first list/set/pool of N_tot_tci TCI states/TCI state IDs is fixed or higher layer configured (e.g., via RRC signaling).

In yet another example (example-4.C), the UE could receive from the network a MAC CE activation/subselection command to activate N_tot_rs TCI states/TCI state IDs from the first list/set/pool of N_tot_tci TCI states/TCI state IDs as the N_tot_rs TCI states/TCI state IDs in the second list/set/pool. For instance, the MAC CE command could include/contain a bitmap of length N_tot_tci, with each bit position in the bitmap corresponding to a TCI state/TCI state ID in the first list/set/pool of TCI states/TCI state IDs. If a bit position in the bitmap is set to "1", the corresponding TCI state/TCI state ID in the first list/set/pool of TCI states/TCI state IDs is activated/selected as a TCI state/TCI state ID in the second list/set/pool of TCI states/TCI state IDs. The MAC CE command/bitmap could contain N_tot_rs bit positions set to "1"s.

In yet another example (example-4.D), the second list/set/pool of TCI states/TCI state IDs could contain/include (N_tot_rs) TCI states/TCI state IDs, in the first list/set/pool of TCI states/TCI state IDs, that are reserved/configured/activated for receiving/monitoring PDCCH candidate(s) in CORESET(s).

The RSs or RS indexes, e.g., at least N_tot_rs (QCL-typeD) RSs or RS indexes, indicated/included/contained in the N_tot_rs TCI states in the second list/set/pool of TCI states/TCI state IDs can be used to configure one or more BFD RS s/NBI RSs. In the present disclosure, the at least N_tot_rs (QCL-typeD) RSs or RS indexes are denoted as a list/set/pool of at least N_tot_rs QCL source RS indexes. Furthermore, the first list/set/pool of TCI states/TCI state IDs, the second list/set/pool of TCI states/TCI state IDs, or the MAC CE activation/subselection command in the example-4.C could contain/include/indicate an entity ID, where the entity ID could correspond a PCI, a PCI index pointing/corresponding to an entry/PCI from a list/set/pool of PCIs that are higher layer configured to the UE, a value of CORESETPoolIndex, a value of CORESETGroupIndex, a one-bit flag indicator, a CORESET pool ID/index, a CORESET group ID/index, a CORESET ID/index, a TCI state ID/index, a TRP-specific index/ID value, a TRP-specific higher layer signaling index/ID value or a TRP-specific RS set index/ID value.

The UE could receive from the network one or more MAC CE commands or one or more MAC CE activation/subselection commands or one or more bitmaps to configure or update one or more BFD RSs (corresponding to one or more SSB indexes or one or more periodic 1-port CSI-RS resource configuration indexes) in a BFD RS beam set of BFD RSs corresponding to SSB indexes or periodic 1-port CSI-RS resource configuration indexes—e.g., the BFD RS beam set q0 configured according to the design examples example-4.1.1 to example-4.1.26 in the present disclosure. For this case, the one or more MAC CE commands or the one or more MAC CE activation/subselection commands or the one or more bitmaps and the corresponding configuration methods could follow those specified in the example-1.7, example-1.8, example-1.9 or example-1.10 in the present disclosure.

When the UE is provided by the network two BFD RS beam sets q00 and q01 configured according to the design examples example-4.1.1 to example-4.1.26 in the present disclosure, the UE could receive from the network one or more MAC CE commands or one or more MAC CE activation/subselection commands or one or more bitmaps to configure or update one or more BFD RSs (corresponding to one or more SSB indexes or one or more periodic 1-port CSI-RS resource configuration indexes) in the set q00 or q01.

In one example (example-4.a.1), the UE could be first higher layer RRC configured by the network a list/set/pool of $N\_tot\_rs$ RS resource indexes (e.g., corresponding to SSB indexes or CSI-RS resource configuration indexes). The UE could then receive from the network a MAC CE activation/subselection command to activate or select one or more RS indexes from the higher layer RRC configured pool of RS indexes or one or more RS indexes from the list/set/pool of at least $N\_tot\_rs$ QCL source RS indexes as one or more BFD RSs for the set q00 or q01.

The MAC CE activation/subselection command could also contain/indicate an entity ID. In the present disclosure, the entity ID could correspond a BFD RS beam set ID/index, a NBI RS beam set ID/index, a PCI, a PCI index pointing/corresponding to an entry/PCI from a list/set/pool of PCIs that are higher layer configured to the UE, a value of CORESETPoolIndex, a value of CORESETGroupIndex, a one-bit flag indicator, a CORESET pool ID/index, a CORESET group ID/index, a CORESET ID/index, a TCI state ID/index, a TRP-specific index/ID value, a TRP-specific higher layer signaling index/ID value or a TRP-specific RS set index/ID value.

For instance, the MAC CE activation/subselection command could contain an entity ID (e.g., a BFD RS beam set index/ID) and a total of $N\_tot\_rs$ bit positions with each bit position corresponding to a RS index in the higher layer RRC configured pool of RS indexes or a RS index in the list/set/pool of at least $N\_tot\_rs$ QCL source RS indexes. If a bit position in the MAC CE activation/subselection command indicating/configuring the entity ID is set to "1", the corresponding RS index from the higher layer RRC configured pool of RS indexes or from the list/set/pool of at least $N\_tot\_rs$ QCL source RS indexes is then activated/selected as one BFD RS in the set q00 or q01 associated with the indicated entity ID. The MAC CE activation/subselection command could contain more than one (e.g., $N\_q0>1$) bit positions configured as "1"s.

For example, the UE could be first provided by the network, e.g., via higher layer parameter failureDetectionResourcesToAddModList0/beamFailureDetectionResourceList0 or failureDetectionResourcesToAddModList1/beamFailureDetectionResourceList1, one or more first BFD RSs corresponding to SSB indexes or periodic 1-port CSI-RS resource configuration indexes in the BFD RS beam set q00 or q01. The UE could then receive from the network a MAC CE activation/subselection command as described above indicating/configuring an entity ID (e.g., a BFD RS beam set index/ID) and activating/selecting one or more RS indexes from the higher layer RRC configured pool of RS indexes or from the list/set/pool of at least $N\_tot\_rs$ QCL source RS indexes as one or more second BFD RSs in the set q00 or q01 associated with the indicated entity ID. That is, for this case, the BFD RS beam set q00 or q01 could contain both higher layer RRC configured first BFD RSs and MAC CE activated second BFD RSs.

For another example, as discussed above, the BFD RS beam set q00 or q01 could contain $N\_q0$ BFD RSs each corresponding to a SSB index or a periodic 1-port CSI-RS resource configuration index. The UE could receive from the network a MAC CE activation/subselection command as described above indicating/configuring an entity ID (e.g., a BFD RS beam set index/ID) and activating/selecting $N\_q0$ RS indexes from the higher layer RRC configured pool of RS indexes or from the list/set/pool of at least $N\_tot\_rs$ QCL source RS indexes as the $N\_q0$ BFD RSs in the set q00 or q01 associated with the indicated entity ID. The MAC CE activation/subselection command could contain an entity ID (e.g., a BFD RS beam set index/ID) and $N\_q0$ bit positions configured as "1"s.

Yet for another example, the UE could be first provided by the network, e.g., via higher layer parameter failureDetectionResourcesToAddModList0/beamFailureDetectionResourceList0 or failureDetectionResourcesToAddModList1/beamFailureDetectionResourceList1, $N\_q0$ BFD RSs corresponding to SSB indexes or periodic 1-port CSI-RS resource configuration indexes in the BFD RS beam set q00 or q01. The UE could then receive from the network a first MAC CE activation/subselection command as described above configuring/indicating an entity ID (e.g., a BFD RS beam set index/ID) and activating/selecting $N\_q0'$ RS indexes from the higher layer RRC configured pool of RS indexes or from the list/set/pool of at least $N\_tot\_rs$ QCL source RS indexes.

The UE could also receive from the network a second MAC CE command/bitmap configuring/indicating an entity ID (e.g., a BFD RS beam set index/ID) containing a total of $N\_q0$ bit positions with each bit position corresponding to a BFD RS in the set q00 or q01. The entity ID configured/indicated in the first MAC CE activation/subselection command could be the same as the entity ID configured/indicated in the second MAC CE command/bitmap. If a bit position in the second MAC CE command/bitmap configuring/indicating the entity ID is set to "1", the corresponding BFD RS in the BFD RS beam set q00 or q01 associated with the indicated entity ID could be replaced/updated by a RS index—activated/selected by the first MAC CE activation/subselection command configuring/indicating the entity ID from the higher layer RRC configured pool of RS indexes or from the list/set/pool of at least $N\_tot\_rs$ QCL source RS indexes—corresponding to the bit position in the second MAC CE command/bitmap configuring/indicating the entity ID.

For this example, the second MAC CE command/bitmap configuring/indicating the entity ID could contain $N\_q0'$ bit positions configured as "1"s, and the $N\_q0'$ bit positions configured as "1"s (e.g., ordered from the least significant bit to the most significant bit) are one-to-one mapped/associated to the $N\_q0'$ RS indexes (e.g., ordered from the lowest RS index/ID to the highest RS index/ID) activated/selected by the first MAC CE activation/subselection command configuring/indicating the entity ID from the higher layer RRC configured pool of RS indexes or from the list/set/pool of at least $N\_tot\_rs$ QCL source RS indexes.

In another example (example-4.a.2), the UE could be first higher layer RRC configured by the network a list/set/pool of $N\_tot\_rs$ RS resource indexes (e.g., corresponding to SSB indexes or CSI-RS resource configuration indexes). The UE could then receive from the network a MAC CE command to configure/select one or more RS indexes from the higher layer RRC configured pool of RS indexes or one or more RS indexes from the list/set/pool of at least $N\_tot\_rs$ QCL source RS indexes as one or more BFD RSs for the set q00 or q01.

The MAC CE command could also contain/indicate an entity ID. In the present disclosure, the entity ID could correspond a BFD RS beam set ID/index, a NBI RS beam set ID/index, a PCI, a PCI index pointing/corresponding to an entry/PCI from a list/set/pool of PCIs that are higher layer configured to the UE, a value of CORESETPoolIndex, a value of CORESETGroupIndex, a one-bit flag indicator, a CORESET pool ID/index, a CORESET group ID/index, a CORESET ID/index, a TCI state ID/index, a TRP-specific index/ID value, a TRP-specific higher layer signaling index/ID value or a TRP-specific RS set index/ID value.

For instance, the MAC CE command could contain an entity ID (e.g., a BFD RS beam set index/ID) and a total of N_q0 entries with each entry corresponding to a BFD RS in the set q00 or q01 associated with the indicated entity ID. If an entry in the MAC CE command configuring/indicating the entity ID is set to a RS index from the higher layer RRC configured pool of RS indexes or a RS index from the list/set/pool of at least N_tot_rs QCL source RS indexes, the RS index is then configured/selected as the corresponding BFD RS in the set q00 or q01 associated with the indicated entity ID.

For example, as discussed above, the BFD RS beam set q00 or q01 could contain N_q0 BFD RSs each corresponding to a SSB index or a periodic 1-port CSI-RS resource configuration index. The UE could receive from the network a MAC CE command as described above configuring/indicating an entity ID (e.g., a BFD RS beam set index/ID) and configuring/selecting N_q0 RS indexes from the higher layer RRC configured pool of RS indexes or from the list/set/pool of at least N_tot_rs QCL source RS indexes as the N_q0 BFD RSs in the set q00 or q01 associated with the indicated entity ID. The MAC CE command configuring/indicating the entity ID could contain N_q0 entries with each entry configuring/selecting a RS index from the higher layer RRC configured pool of RS indexes or from the list/set/pool of at least N_tot_rs QCL source RS indexes as the corresponding BFD RS in the set q00 or q01 associated with the indicated entity ID.

For another example, the UE could be first provided by the network, e.g., via higher layer parameter failureDetectionResourcesToAddModList0/beamFailureDetectionResourceList0 or failureDetectionResourcesToAddModList1/beamFailureDetectionResourceList1, N_q0 BFD RSs corresponding to SSB indexes or periodic 1-port CSI-RS resource configuration indexes in the BFD RS beam set q00 or q01. The UE could then receive from the network a MAC CE command as described above configuring/indicating an entity ID (e.g., a BFD RS beam set index/ID) configuring/selecting N_q0' RS indexes from the higher layer RRC configured pool of RS indexes or from the list/set/pool of at least N_tot_rs QCL source RS indexes as one or more of the BFD RSs for the set q00 or q01 associated with the indicated entity ID.

For instance, in the MAC CE command configuring/indicating the entity ID and having a total of N_q0 entries, only N_q0' entries (out of the total N_q0 entries) are set to valid RS indexes from the higher layer RRC configured pool of RS indexes or from the list/set/pool of at least N_tot_rs QCL source RS indexes, and the remaining (N_q0-N_q0') entries are not configured or absent; for this case, the N_q0' RS indexes are configured/selected/updated as the corresponding N_q0' BFD RSs (out of the total N_q0 BFD RSs) for the set q00 or q01 associated with the indicated entity ID. Alternatively, in the MAC CE command configuring/indicating the entity ID and having a total of N_q0 entries, only N_q0' entries (out of the total N_q0 entries) are set to RS indexes (from the higher layer RRC configured pool of RS indexes or from the list/set/pool of at least N_tot_rs QCL source RS indexes) different from their corresponding BFD RSs in the BFD RS beam set q00 or q01 associated with the indicated entity ID; for this case, the N_q0' RS indexes are configured/selected/updated as the corresponding N_q0' BFD RSs (out of the total N_q0 BFD RSs) for the set q00 or q01 associated with the indicated entity ID.

In yet another example (example-4.a.3), the UE could be first higher layer RRC configured by the network a list/set/pool of N_tot_rs RS resource indexes (e.g., corresponding to SSB indexes or CSI-RS resource configuration indexes). The UE could then receive from the network a MAC CE activation/subselection command to activate or select one or more RS indexes from the higher layer RRC configured pool of RS indexes or one or more RS indexes from the list/set/pool of at least N_tot_rs QCL source RS indexes as one or more BFD RSs for the set q00 or q01.

For instance, the MAC CE activation/subselection command could contain N_tot_rs first bit positions and N_tot_rs second bit positions with each first/second bit position corresponding to a RS index in the higher layer RRC configured pool of RS indexes or a RS index in the list/set/pool of at least N_tot_rs QCL source RS indexes. Furthermore, the N_tot_rs first bit positions could be associated with the set q00 (or q01), and the N_tot_rs second bit positions could be associated with the set q01 (or q00). If a first bit position in the MAC CE activation/subselection command is set to "1", the corresponding RS index from the higher layer RRC configured pool of RS indexes or from the list/set/pool of at least N_tot_rs QCL source RS indexes is then activated/selected as one BFD RS in the set q00 (or q01); if a second bit position in the MAC CE activation/subselection command is set to "1", the corresponding RS index from the higher layer RRC configured pool of RS indexes or from the list/set/pool of at least N_tot_rs QCL source RS indexes is then activated/selected as one BFD RS in the set q01 (or q00). The MAC CE activation/subselection command could contain more than one (e.g., N_q0>1) first bit positions configured as "1"s and more than one (e.g., N_q0>1) second bit positions configured as "1"s.

For example, the UE could be first provided by the network, e.g., via higher layer parameter failureDetectionResourcesToAddModList0/beamFailureDetectionResourceList0 or failureDetectionResourcesToAddModList1/beamFailureDetectionResourceList1, one or more first BFD RSs corresponding to SSB indexes or periodic 1-port CSI-RS resource configuration indexes in the BFD RS beam set q00 or q01. The UE could then receive from the network a MAC CE activation/subselection command as described above with the first bit positions activating/selecting one or more RS indexes from the higher layer RRC configured pool of RS indexes or from the list/set/pool of at least N_tot_rs QCL source RS indexes as one or more second BFD RSs in the set q00 (or q01), or with the second bit positions activating/selecting one or more RS indexes from the higher layer RRC configured pool of RS indexes or from the list/set/pool of at least N_tot_rs QCL source RS indexes as one or more second BFD RSs in the set q01 (or q00). That is, for this case, the BFD RS beam set q00 or q01 could contain both higher layer RRC configured first BFD RSs and MAC CE activated second BFD RSs.

For another example, as discussed above, the BFD RS beam set q00 or q01 could contain N_q0 BFD RSs each corresponding to a SSB index or a periodic 1-port CSI-RS resource configuration index. The UE could receive from the network a MAC CE activation/subselection command as described above with the first bit positions activating/selecting N_q0 RS indexes from the higher layer RRC configured pool of RS indexes or from the list/set/pool of at least N_tot_rs QCL source RS indexes as the N_q0 BFD RSs in the set q00 (or q01), or with the second bit positions activating/selecting N_q0 RS indexes from the higher layer RRC configured pool of RS indexes or from the list/set/pool of at least N_tot_rs QCL source RS indexes as the N_q0 BFD RSs in the set q01 (or q00). The MAC CE activation/subselection command could contain N_q0 first bit positions configured as "1"s or N_q0 second bit positions configured as "1"s.

Yet for another example, the UE could be first provided by the network, e.g., via higher layer parameter failureDetectionResourcesToAddModList0/beamFailureDetectionResourceList0 or failureDetectionResourcesToAddModList1/beamFailureDetectionResourceList1, N_q0 BFD RSs corresponding to SSB indexes or periodic 1-port CSI-RS resource configuration indexes in the BFD RS beam set q00 or q01. The UE could then receive from the network a first MAC CE activation/subselection command as described above with the first bit positions activating/selecting N_q0' RS indexes from the higher layer RRC configured pool of RS indexes or from the list/set/pool of at least N_tot_rs QCL source RS indexes for the set q00 (or q01), or with the second bit positions activating/selecting N_q0' RS indexes from the higher layer RRC configured pool of RS indexes or from the list/set/pool of at least N_tot_rs QCL source RS indexes for the set q01 (or q00).

The UE could also receive from the network a second MAC CE command/bitmap containing N_q0 first bit positions with each first bit position corresponding to a BFD RS in the set q00 (or q01) and N_q0 second bit positions with each second bit position corresponding to a BFD RS in the set q01 (or q00). If a first bit position in the second MAC CE command/bitmap is set to "1", the corresponding BFD RS in the BFD RS beam set q00 (or q01) could be replaced/updated by a RS index—activated/selected by a first bit position in the first MAC CE activation/subselection command from the higher layer RRC configured pool of RS indexes or from the list/set/pool of at least N_tot_rs QCL source RS indexes—corresponding to the first bit position in the second MAC CE command/bitmap; if a second bit position in the second MAC CE command/bitmap is set to "1", the corresponding BFD RS in the BFD RS beam set q01 (or q00) could be replaced/updated by a RS index—activated/selected by a second bit position in the first MAC CE activation/subselection command from the higher layer RRC configured pool of RS indexes or from the list/set/pool of at least N_tot_rs QCL source RS indexes—corresponding to the second bit position in the second MAC CE command/bitmap.

For this example, the second MAC CE command/bitmap could contain N_q0' first bit positions configured as "1"s, and the N_q0' first bit positions configured as "1"s (e.g., ordered from the least significant bit to the most significant bit) are one-to-one mapped/associated to the N_q0' RS indexes (e.g., ordered from the lowest RS index/ID to the highest RS index/ID) activated/selected by the N_q0' first bit positions in the first MAC CE activation/subselection command from the higher layer RRC configured pool of RS indexes or from the list/set/pool of at least N_tot_rs QCL source RS indexes. Furthermore, the second MAC CE command/bitmap could also contain N_q0' second bit positions configured as "1"s, and the N_q0' second bit positions configured as "1"s (e.g., ordered from the least significant bit to the most significant bit) are one-to-one mapped/associated to the N_q0' RS indexes (e.g., ordered from the lowest RS index/ID to the highest RS index/ID) activated/selected by the N_q0' second bit positions in the first MAC CE activation/subselection command from the higher layer RRC configured pool of RS indexes or from the list/set/pool of at least N_tot_rs QCL source RS indexes.

In another example (example-4.a.4), the UE could be first higher layer RRC configured by the network a list/set/pool of N_tot_rs RS resource indexes (e.g., corresponding to SSB indexes or CSI-RS resource configuration indexes). The UE could then receive from the network a MAC CE command to configure/select one or more RS indexes from the higher layer RRC configured pool of RS indexes or from the list/set/pool of at least N_tot_rs QCL source RS indexes as one or more BFD RSs for the set q00 or q01. For instance, the MAC CE command could contain N_q0 first entries with each first entry corresponding to a BFD RS in the set q00 (or q01) and N_q0 second entries with each second entry corresponding to a BFD RS in the set q01 (or q00). If a first entry in the MAC CE command is set to a RS index from the higher layer RRC configured pool of RS indexes or from the list/set/pool of at least N_tot_rs QCL source RS indexes, the RS index is then configured/selected as the corresponding BFD RS in the set q00 (or q01); if a second entry in the MAC CE command is set to a RS index from the higher layer RRC configured pool of RS indexes or from the list/set/pool of at least N_tot_rs QCL source RS indexes, the RS index is then configured/selected as the corresponding BFD RS in the set q01 (or q00).

For example, as discussed above, the BFD RS beam set q00 or q01 could contain N_q0 BFD RSs each corresponding to a SSB index or a periodic 1-port CSI-RS resource configuration index. The UE could receive from the network a MAC CE command as described above with the first entries configuring/selecting N_q0 RS indexes from the higher layer RRC configured pool of RS indexes or from the list/set/pool of at least N_tot_rs QCL source RS indexes as the N_q0 BFD RSs in the set q00 (or q01), or with the second entries configuring/selecting N_q0 RS indexes from the higher layer RRC configured pool of RS indexes or from the list/set/pool of at least N_tot_rs QCL source RS indexes as the N_q0 BFD RSs in the set q01 (or q00). The MAC CE command could contain N_q0 first entries with each first entry configuring/selecting a RS index from the higher layer RRC configured pool of RS indexes or from the list/set/pool of at least N_tot_rs QCL source RS indexes as the corresponding BFD RS in the set q00 (or q01) or N_q0 second entries with each second entry configuring/selecting a RS index from the higher layer RRC configured pool of RS indexes or from the list/set/pool of at least N_tot_rs QCL source RS indexes as the corresponding BFD RS in the set q01 (or q00).

For another example, the UE could be first provided by the network, e.g., via higher layer parameter failureDetectionResourcesToAddModList0/beamFailureDetectionResourceList0 or failureDetectionResourcesToAddModList1/beamFailureDetectionResourceList1, N_q0 BFD RSs corresponding to SSB indexes or periodic 1-port CSI-RS resource configuration indexes in the BFD RS beam set q00 or q01. The UE could then receive from the network a MAC CE command as described above with first entries configuring/selecting N_q0' RS indexes from the higher layer RRC configured pool of RS indexes or from the list/set/pool of at least N_tot_rs QCL source RS indexes as one or more of the BFD RSs for the set q00 (or q01) or with second entries configuring/selecting N_q0'' RS indexes from the higher layer RRC configured pool of RS indexes or from the list/set/pool of at least N_tot_rs QCL source RS indexes as one or more of the BFD RSs for the set q01 (or q00).

For instance, in the MAC CE command having N_q0 first entries and N_q0 second entries, (1) only N_q0' first entries (out of the total N_q0 first entries) are set to valid RS indexes from the higher layer RRC configured pool of RS indexes or from the list/set/pool of at least N_tot_rs QCL source RS indexes, and the remaining (N_q0-N_q0') first entries are not configured or absent; for this case, the N_q0' RS indexes are configured/selected/updated as the corresponding N_q0' BFD RSs (out of the total N_q0 BFD RSs) for the set q00 (or q01); or (2) only N_q0" second entries (out of the total N_q0 second entries) are set to valid RS indexes from the higher layer RRC configured pool of RS indexes or from the list/set/pool of at least N_tot_rs QCL source RS indexes, and the remaining (N_q0-N_q0") second entries are not configured or absent; for this case, the N_q0" RS indexes are configured/selected/updated as the corresponding N_q0" BFD RSs (out of the total N_q0 BFD RSs) for the set q01 (or q00).

Alternatively, in the MAC CE command having N_q0 first entries and N_q0 second entries, (1) only N_q0' first entries (out of the total N_q0 first entries) are set to RS indexes (from the higher layer RRC configured pool of RS indexes or from the list/set/pool of at least N_tot_rs QCL source RS indexes) different from their corresponding BFD RSs in the BFD RS beam set q00 (or q01); for this case, the N_q0' RS indexes are configured/selected/updated as the corresponding N_q0' BFD RSs (out of the total N_q0 BFD RSs) for the set q00 (or q01); or (2) only N_q0" second entries (out of the total N_q0 second entries) are set to RS indexes (from the higher layer RRC configured pool of RS indexes or from the list/set/pool of at least N_tot_rs QCL source RS indexes) different from their corresponding BFD RSs in the BFD RS beam set q01 (or q00); for this case, the N_q0" RS indexes are configured/selected/updated as the corresponding N_q0" BFD RSs (out of the total N_q0 BFD RSs) for the set q01 (or q00).

In yet another example (example-4.a.5), the UE could be first higher layer RRC configured by the network a first list/set/pool of N_tot_rs RS resource indexes (e.g., corresponding to SSB indexes or CSI-RS resource configuration indexes), and a second list/set/pool of N_tot_rs RS resource indexes (e.g., corresponding to SSB indexes or CSI-RS resource configuration indexes). The UE could then receive from the network a first MAC CE activation/subselection command to activate or select one or more RS indexes from the higher layer RRC configured first list/set/pool of RS indexes or one or more RS indexes from a first list/set/pool of at least N_tot_rs QCL source RS indexes as one or more BFD RSs for the set q00, or a second MAC CE activation/subselection command to activate or select one or more RS indexes from the higher layer RRC configured second list/set/pool of RS indexes or one or more RS indexes from a second list/set/pool of at least N_tot_rs QCL source RS indexes as one or more BFD RSs for the set q01. The first MAC CE activation/subselection command or the second MAC CE activation/subselection command could also contain/indicate an entity ID. In the present disclosure, the entity ID could correspond a BFD RS beam set ID/index, a NBI RS beam set ID/index, a PCI, a PCI index pointing/corresponding to an entry/PCI from a list/set/pool of PCIs that are higher layer configured to the UE, a value of CORESETPoolIndex, a value of CORESETGroupIndex, a one-bit flag indicator, a CORESET pool ID/index, a CORESET group ID/index, a CORESET ID/index, a TCI state ID/index, a TRP-specific index/ID value, a TRP-specific higher layer signaling index/ID value or a TRP-specific RS set index/ID value.

For instance, the first (or second) MAC CE activation/subselection command could contain an entity ID (e.g., a BFD RS beam set index/ID) and a total of N_tot_rs bit positions with each bit position corresponding to a RS index in the higher layer RRC configured first (or second) list/set/pool of RS indexes or a RS index in the first (or second) list/set/pool of at least N_tot_rs QCL source RS indexes. If a bit position in the first (or second) MAC CE activation/subselection command indicating/configuring the entity ID is set to "1", the corresponding RS index from the higher layer RRC configured first (or second) list/set/pool of RS indexes or from the first (or second) list/set/pool of at least N_tot_rs QCL source RS indexes is then activated/selected as one BFD RS in the set q00 (or q01) associated with the indicated entity ID. The first (or second) MAC CE activation/subselection command could contain more than one (e.g., N_q0>1) bit positions configured as "1"s.

The first list/set/pool of at least N_tot_rs QCL source RS indexes could correspond the RSs or RS indexes associated with or indicated in a third list/set/pool of TCI states/TCI state IDs, and the second list/set/pool of at least N_tot_rs QCL source RS indexes could correspond the RSs or RS indexes associated with or indicated in a fourth list/set/pool of TCI states/TCI state IDs. For this case, the third and fourth lists/sets/pools of TCI states/TCI state IDs could be respectively determined/selected from the first list/set/pool of TCI states/TCI state IDs following those specified in the example-4.A, example-4.B, example-4.C or example-4.D in the present disclosure.

Alternatively, the third list/set/pool of TCI states/TCI state IDs could be determined/selected from a fifth list/set/pool of TCI states/TCI state IDs following those specified in the example-4.A, example-4.B, example-4.C or example-4.D in the present disclosure, and the fourth list/set/pool of TCI states/TCI state IDs could be determined/selected from a sixth list/set/pool of TCI states/TCI state IDs following those specified in the example-4.A, example-4.B, example-4.C or example-4.D in the present disclosure. The fifth or six list/set/pool of TCI states/TCI state IDs could be similarly configured to the first list/set/pool of TCI states/TCI state IDs.

For example, the UE could be first provided by the network, e.g., via higher layer parameter failureDetectionResourcesToAddModList0/beamFailureDetectionResourceList0 or failureDetectionResourcesToAddModList1/beamFailureDetectionResourceList1, one or more first BFD RSs corresponding to SSB indexes or periodic 1-port CSI-RS resource configuration indexes in the BFD RS beam set q00 or q01. The UE could then receive from the network the first (or second) MAC CE activation/subselection command as described above indicating/configuring an entity ID (e.g., a BFD RS beam set index/ID) and activating/selecting one or more RS indexes from the higher layer RRC configured first (or second) list/set/pool of RS indexes or from the first (or second) list/set/pool of at least N_tot_rs QCL source RS indexes as one or more second BFD RSs in the set q00 (or q01) associated with the indicated entity ID. That is, for this case, the BFD RS beam set q00 or q01 could contain both higher layer RRC configured first BFD RSs and MAC CE activated second BFD RSs.

For another example, as discussed above, the BFD RS beam set q00 or q01 could contain N_q0 BFD RSs each corresponding to a SSB index or a periodic 1-port CSI-RS resource configuration index. The UE could receive from the network the first (or second) MAC CE activation/subselection command as described above indicating/configuring an entity ID (e.g., a BFD RS beam set index/ID) and activating/selecting N_q0 RS indexes from the higher layer RRC configured first (or second) list/set/pool of RS indexes or from the first (or second) list/set/pool of at least N_tot_rs QCL source RS indexes as the N_q0 BFD RSs in the set q00 (or q01) associated with the indicated entity ID. The first (or second) MAC CE activation/subselection command could contain an entity ID (e.g., a BFD RS beam set index/ID) and N_q0 bit positions configured as "1"s.

Yet for another example, the UE could be first provided by the network, e.g., via higher layer parameter failureDetectionResourcesToAddModList0/beamFailureDetectionResourceList0 or failureDetectionResourcesToAddModList1/beamFailureDetectionResourceList1, N_q0 BFD RSs corresponding to SSB indexes or periodic 1-port CSI-RS resource configuration indexes in the BFD RS beam set q00 or q01. The UE could then receive from the network the first (or second) MAC CE activation/subselection command as described above configuring/indicating an entity ID (e.g., a BFD RS beam set index/ID) and activating/selecting N_q0' RS indexes from the higher layer RRC configured first (or second) list/set/pool of RS indexes or from the first (or second) list/set/pool of at least N_tot_rs QCL source RS indexes.

The UE could also receive from the network a third MAC CE command/bitmap configuring/indicating an entity ID (e.g., a BFD RS beam set index/ID) containing a total of N_q0 bit positions with each bit position corresponding to a BFD RS in the set q00, or a fourth MAC CE command/bitmap configuring/indicating an entity ID (e.g., a BFD RS beam set index/ID) containing a total of N_q0 bit positions with each bit position corresponding to a BFD RS in the set q01. The entity ID configured/indicated in the first MAC CE activation/subselection command could be the same as the entity ID configured/indicated in the third MAC CE command/bitmap, and the entity ID configured/indicated in the second MAC CE activation/subselection command could be the same as the entity ID configured/indicated in the fourth MAC CE command/bitmap.

If a bit position in the third (or fourth) MAC CE command/bitmap configuring/indicating the entity ID is set to "1", the corresponding BFD RS in the BFD RS beam set q00 (or q01) associated with the indicated entity ID could be replaced/updated by a RS index—activated/selected by the first (or second) MAC CE activation/subselection command configuring/indicating the entity ID from the higher layer RRC configured first (or second) list/set/pool of RS indexes or from the first (or second) list/set/pool of at least N_tot_rs QCL source RS indexes—corresponding to the bit position in the third (or fourth) MAC CE command/bitmap configuring/indicating the entity ID.

For this example, the third (or fourth) MAC CE command/bitmap configuring/indicating the entity ID could contain N_q0' bit positions configured as "1"s, and the N_q0' bit positions configured as "1"s (e.g., ordered from the least significant bit to the most significant bit) are one-to-one mapped/associated to the N_q0' RS indexes (e.g., ordered from the lowest RS index/ID to the highest RS index/ID) activated/selected by the first (or second) MAC CE activation/subselection command configuring/indicating the entity ID from the higher layer RRC configured first (or second) list/set/pool of RS indexes or from the first (or second) list/set/pool of at least N_tot_rs QCL source RS indexes.

In the above discussed design examples, the higher layer RRC configured (first or second) list/set/pool of N_tot_rs RS resource indexes (e.g., corresponding to SSB indexes or CSI-RS resource configuration indexes) could also contain/include/indicate an entity ID, where the entity ID could correspond a PCI, a PCI index pointing/corresponding to an entry/PCI from a list/set/pool of PCIs that are higher layer configured to the UE, a value of CORESETPoolIndex, a value of CORESETGroupIndex, a one-bit flag indicator, a CORESET pool ID/index, a CORESET group ID/index, a CORESET ID/index, a TCI state ID/index, a TRP-specific index/ID value, a TRP-specific higher layer signaling index/ID value or a TRP-specific RS set index/ID value.

In the above discussed design example-4.a.1, example-4.a.2, example-4.a.3, example-4.a.4 or example-4.a.5, if entity ID is absent or not configured in a MAC CE activation/subselection command or a MAC CE command or a bitmap, the MAC CE activation/subselection command or the MAC CE command or the bitmap could be associated with/configured for the set q00 (or q01); otherwise, i.e., entity ID is present or configured, the corresponding MAC CE activation/subselection command or MAC CE command or bitmap could be associated with/configured for the set q01 (or q00).

The UE could be provided/configured by the network one or more BFD thresholds Qout's, each associated with an entity ID. As discussed above, in the present disclosure, an entity ID could correspond to a PCI value, a PCI index pointing/corresponding to an entry/PCI in a list of PCIs that are higher layer configured to the UE, a CORESETPoolIndex value, a TRP-specific index/ID value, a TRP-specific higher layer signaling index/ID value, or a TRP-specific RS set index/ID value. For instance, the UE could be higher layer RRC configured by the network two BFD thresholds Qout0 and Qout1 with Qout0 corresponding to a PCI/PCI index (e.g., the serving cell PCI/PCI index) or a value of CORESETPoolIndex (e.g., 0) and Qout1 corresponding to another (different) PCI/PCI index (e.g., a PCI/PCI index different from the serving cell PCI/PCI index) or another (different) value of CORESETPoolIndex (e.g., 1).

In one example (example-4.1.27), the UE could access the radio link quality of one or more BFD RSs (corresponding to one or more SSB indexes or one or more periodic CSI-RS resource configuration indexes) associated with an entity ID in the BFD RS beam set q0, q00, or q01 against a BFD threshold associated with the same entity ID as that associated with the one or more BFD RSs. The one or more BFD RSs (corresponding to one or more SSB indexes or one or more periodic CSI-RS resource configuration indexes) could have the same values as the RS indexes in the RS sets indicated in one or more TCI states for respective CORESETs associated with the (same) entity ID that the UE uses for monitoring PDCCH.

The UE could apply the BFD threshold associated with an entity ID to the L1-RSRP measurement obtained from a SSB or a CSI-RS resource associated with the same entity ID as that associated with the BFD threshold in q0, q00, or q01, and/or apply the BFD threshold associated with an entity ID to the L1-RSRP measurement obtained from a CSI-RS resource associated with the same entity ID as that associated with the BFD threshold in q0, q00, or q01 after scaling a respective CSI-RS reception power with a value provided by powerControlOffsetSS associated with the same entity ID as that associated with the BFD threshold. The physical layer in the UE could provide an indication for an entity ID to higher layers when the radio link quality for all corresponding periodic CSI-RS resource configuration indexes or SSB indexes associated with the (same) entity ID in q0, q00, or q01 is worse than the BFD threshold associated with the (same) entity ID.

The physical layer could inform the higher layers when the radio link quality for an entity ID is worse than the BFD threshold associated with the (same) entity ID a periodicity determined by the maximum between the shortest periodicity among the SSBs and/or the periodic CSI-RS configurations associated with the (same) entity ID in q0, q00, or q01 that the UE uses to assess the radio link quality for the (same) entity ID and 2 msec. For instance, the UE could be higher layer RRC configured by the network two BFD thresholds Qout0 and Qout1 with Qout0 corresponding to a PCI/PCI index (e.g., the serving cell PCI/PCI index) or a value of CORESETPoolIndex (e.g., 0) and Qout1 corresponding to another (different) PCI/PCI index (e.g., a PCI/PCI index different from the serving cell PCI/PCI index) or another (different) value of CORESETPoolIndex (e.g., 1).

The UE could apply the BFD threshold Qout0 to the L1-RSRP measurement obtained from a SSB or a CSI-RS resource associated with the same PCI/PCI index (e.g., the serving cell PCI/PCI index) or the same value of CORESETPoolIndex (e.g., 0) as that associated with Qout0 in q0, q00, or q01, and/or apply the BFD threshold Qout0 to the L1-RSRP measurement obtained from a CSI-RS resource associated with the same PCI/PCI index (e.g., the serving cell PCI/PCI index) or the same value of CORESETPoolIndex (e.g., 0) as that associated with Qout0 in q0, q00, or q01 after scaling a respective CSI-RS reception power with a value provided by powerControlOffsetSS associated with the same PCI/PCI index (e.g., the serving cell PCI/PCI index) or the same value of CORESETPoolIndex (e.g., 0) as that associated with Qout0; the UE could apply the BFD threshold Qout1 to the L1-RSRP measurement obtained from a SSB or a CSI-RS resource associated with the same PCI/PCI index (e.g., a PCI/PCI index different from the serving cell PCI/PCI index) or the same value of CORESETPoolIndex (e.g., 1) as that associated with Qout1 in q0, q00, or q01, and/or apply the BFD threshold Qout1 to the L1-RSRP measurement obtained from a CSI-RS resource associated with the same PCI/PCI index (e.g., a PCI/PCI index different from the serving cell PCI/PCI index) or the same value of CORESETPoolIndex (e.g., 1) as that associated with Qout1 in q0, q00, or q01 after scaling a respective CSI-RS reception power with a value provided by powerControlOffsetSS associated with the same PCI/PCI index (e.g., a PCI/PCI index different from the serving cell PCI/PCI index) or the same value of CORESETPoolIndex (e.g., 1) as that associated with Qout1.

For this case, the physical layer in the UE could provide a first indication for the same PCI/PCI index (e.g., the serving cell PCI/PCI index) or the same value of CORESETPoolIndex (e.g., 0) as that associated with Qout0 to higher layers when the radio link quality for all corresponding periodic CSI-RS resource configuration indexes or SSB indexes associated with the same PCI/PCI index (e.g., the serving cell PCI/PCI index) or the same value of CORESETPoolIndex (e.g., 0) as that associated with Qout0 in q0, q00, or q01 is worse than Qout0. The physical layer could inform the higher layers when the radio link quality for the same PCI/PCI index (e.g., the serving cell PCI/PCI index) or the same value of CORESETPoolIndex (e.g., 0) as that associated with Qout0 is worse than the BFD threshold Qout0 a periodicity determined by the maximum between the shortest periodicity among the SSBs and/or the periodic CSI-RS configurations associated with the same PCI/PCI index (e.g., the serving cell PCI/PCI index) or the same value of CORESETPoolIndex (e.g., 0) as that associated with Qout0 in q0, q00, or q01 that the UE uses to assess the radio link quality for the same PCI/PCI index (e.g., the serving cell PCI/PCI index) or the same value of CORESETPoolIndex (e.g., 0) as that associated with Qout0 and 2 msec.

Furthermore, the physical layer in the UE could provide a second indication for the same PCI/PCI index (e.g., a PCI/PCI index different from the serving cell PCI/PCI index) or the same value of CORESETPoolIndex (e.g., 1) as that associated with Qout1 to higher layers when the radio link quality for all corresponding periodic CSI-RS resource configuration indexes or SSB indexes associated with the same PCI/PCI index (e.g., a PCI/PCI index different from the serving cell PCI/PCI index) or the same value of CORESETPoolIndex (e.g., 1) as that associated with Qout1 in q0, q00, or q01 is worse than Qout1.

The physical layer could inform the higher layers when the radio link quality for the same PCI/PCI index (e.g., a PCI/PCI index different from the serving cell PCI/PCI index) or the same value of CORESETPoolIndex (e.g., 1) as that associated with Qout1 is worse than the BFD threshold Qout1 a periodicity determined by the maximum between the shortest periodicity among the SSBs and/or the periodic CSI-RS configurations associated with the same PCI/PCI index (e.g., a PCI/PCI index different from the serving cell PCI/PCI index) or the same value of CORESETPoolIndex (e.g., 1) as that associated with Qout1 in q0, q00, or q01 that the UE uses to assess the radio link quality for the same PCI/PCI index (e.g., a PCI/PCI index different from the serving cell PCI/PCI index) or the same value of CORESETPoolIndex (e.g., 1) as that associated with Qout1 and 2 msec.

In another example (example-4.1.28), the UE could access the radio link quality of one or more BFD RSs (corresponding to one or more SSB indexes or one or more periodic CSI-RS resource configuration indexes) in the BFD RS beam set q0, q00, or q01 associated with an entity ID against a BFD threshold associated with the same entity ID as that associated with the set q0, q00, or q01. The one or more BFD RSs (corresponding to one or more SSB indexes or one or more periodic CSI-RS resource configuration indexes) could have the same values as the RS indexes in the RS sets indicated in one or more TCI states for respective CORESETs associated with the (same) entity ID that the UE uses for monitoring PDCCH.

The UE could apply the BFD threshold associated with an entity ID to the L1-RSRP measurement obtained from a SSB or a CSI-RS resource in q0, q00, or q01 associated with the same entity ID as that associated with the BFD threshold, and/or apply the BFD threshold associated with an entity ID to the L1-RSRP measurement obtained from a CSI-RS resource in q0, q00, or q01 associated with the same entity ID as that associated with the BFD threshold after scaling a respective CSI-RS reception power with a value provided by powerControlOffsetSS associated with the same entity ID as that associated with the BFD threshold.

The physical layer in the UE could provide an indication for an entity ID to higher layers when the radio link quality for all corresponding periodic CSI-RS resource configuration indexes or SSB indexes in q0, q00, or q01 associated with the (same) entity ID is worse than the BFD threshold associated with the (same) entity ID. The physical layer could inform the higher layers when the radio link quality for an entity ID is worse than the BFD threshold associated with the (same) entity ID a periodicity determined by the maximum between the shortest periodicity among the SSBs and/or the periodic CSI-RS configurations in q0, q00, or q01 associated with the (same) entity ID that the UE uses to assess the radio link quality for the (same) entity ID and 2 msec.

For instance, the UE could be higher layer RRC configured by the network two BFD thresholds Qout0 and Qout1 with Qout0 corresponding to a PCI/PCI index (e.g., the serving cell PCI/PCI index) or a value of CORESETPoolIndex (e.g., 0) and Qout1 corresponding to another (different) PCI/PCI index (e.g., a PCI/PCI index different from the serving cell PCI/PCI index) or another (different) value of CORESETPoolIndex (e.g., 1).

The UE could apply the BFD threshold Qout0 to the L1-RSRP measurement obtained from a SSB or a CSI-RS resource in q0, q00, or q01 associated with the same PCI/PCI index (e.g., the serving cell PCI/PCI index) or the same value of CORESETPoolIndex (e.g., 0) as that associated with Qout0, and/or apply the BFD threshold Qout0 to the L1-RSRP measurement obtained from a CSI-RS resource in q0, q00, or q01 associated with the same PCI/PCI index (e.g., the serving cell PCI/PCI index) or the same value of CORESETPoolIndex (e.g., 0) as that associated with Qout0 after scaling a respective CSI-RS reception power with a value provided by powerControlOffsetSS associated with the same PCI/PCI index (e.g., the serving cell PCI/PCI index) or the same value of CORESETPoolIndex (e.g., 0) as that associated with Qout0; the UE could apply the BFD threshold Qout1 to the L1-RSRP measurement obtained from a SSB or a CSI-RS resource in q0, q00, or q01 associated with the same PCI/PCI index (e.g., a PCI/PCI index different from the serving cell PCI/PCI index) or the same value of CORESETPoolIndex (e.g., 1) as that associated with Qout1, and/or apply the BFD threshold Qout1 to the L1-RSRP measurement obtained from a CSI-RS resource in q0, q00, or q01 associated with the same PCI/PCI index (e.g., a PCI/PCI index different from the serving cell PCI/PCI index) or the same value of CORESETPoolIndex (e.g., 1) as that associated with Qout1 after scaling a respective CSI-RS reception power with a value provided by powerControlOffsetSS associated with the same PCI/PCI index (e.g., a PCI/PCI index different from the serving cell PCI/PCI index) or the same value of CORESETPoolIndex (e.g., 1) as that associated with Qout1.

For this case, the physical layer in the UE could provide a first indication for the same PCI/PCI index (e.g., the serving cell PCI/PCI index) or the same value of CORESETPoolIndex (e.g., 0) as that associated with Qout0 to higher layers when the radio link quality for all corresponding periodic CSI-RS resource configuration indexes or SSB indexes in q0, q00, or q01 associated with the same PCI/PCI index (e.g., the serving cell PCI/PCI index) or the same value of CORESETPoolIndex (e.g., 0) as that associated with Qout0 is worse than Qout0.

The physical layer could inform the higher layers when the radio link quality for the same PCI/PCI index (e.g., the serving cell PCI/PCI index) or the same value of CORESETPoolIndex (e.g., 0) as that associated with Qout0 is worse than the BFD threshold Qout0 a periodicity determined by the maximum between the shortest periodicity among the SSBs and/or the periodic CSI-RS configurations in q0, q00, or q01 associated with the same PCI/PCI index (e.g., the serving cell PCI/PCI index) or the same value of CORESETPoolIndex (e.g., 0) as that associated with Qout0 that the UE uses to assess the radio link quality for the same PCI/PCI index (e.g., the serving cell PCI/PCI index) or the same value of CORESETPoolIndex (e.g., 0) as that associated with Qout0 and 2 msec.

Furthermore, the physical layer in the UE could provide a second indication for the same PCI/PCI index (e.g., a PCI/PCI index different from the serving cell PCI/PCI index) or the same value of CORESETPoolIndex (e.g., 1) as that associated with Qout1 to higher layers when the radio link quality for all corresponding periodic CSI-RS resource configuration indexes or SSB indexes in q0, q00, or q01 associated with the same PCI/PCI index (e.g., a PCI/PCI index different from the serving cell PCI/PCI index) or the same value of CORESETPoolIndex (e.g., 1) as that associated with Qout1 is worse than Qout1.

The physical layer could inform the higher layers when the radio link quality for the same PCI/PCI index (e.g., a PCI/PCI index different from the serving cell PCI/PCI index) or the same value of CORESETPoolIndex (e.g., 1) as that associated with Qout1 is worse than the BFD threshold Qout1 a periodicity determined by the maximum between the shortest periodicity among the SSBs and/or the periodic CSI-RS configurations in q0, q00, or q01 associated with the same PCI/PCI index (e.g., a PCI/PCI index different from the serving cell PCI/PCI index) or the same value of CORESETPoolIndex (e.g., 1) as that associated with Qout1 that the UE uses to assess the radio link quality for the same PCI/PCI index (e.g., a PCI/PCI index different from the serving cell PCI/PCI index) or the same value of CORESETPoolIndex (e.g., 1) as that associated with Qout1 and 2 msec.

The UE could maintain one or more BFI counters each associated with an entity ID. As discussed above, in the present disclosure, an entity ID could correspond to a PCI value, a PCI index pointing/corresponding to an entry/PCI in a list of PCIs that are higher layer configured to the UE, a CORESETPoolIndex value, a TRP-specific index/ID value, a TRP-specific higher layer signaling index/ID value, or a TRP-specific RS set index/ID value.

In one example (example-4.1.30), the higher layers in the UE may increment the BFI count (by one) in the BFI counter associated with an entity ID if the higher layers receive from the physical layer in the UE that the radio link quality for the (same) entity ID is worse than BFD threshold associated with the (same) entity ID. The UE may declare a beam failure for one or more BFD RSs (corresponding to one or more SSB indexes or one or more periodic CSI-RS resource configuration indexes) associated with an entity ID in q0, q00, or q01 if the BFI count in the BFI counter associated with the (same) entity ID reaches the maximum number of BFI counts (e.g., provided by the higher layer parameter maxBFIcount) before a BFD timer expires.

After the higher layers in the UE declare beam failure for one or more BFD RSs (corresponding to one or more SSB indexes or one or more periodic CSI-RS resource configuration indexes) associated with an entity ID in q0, q00, or q01, the higher layers in the UE may reset the BFI count in the BFI counter associated with the (same) entity ID or the BFD timer to zero. For instance, the UE could maintain two BFI counters BFI_COUNTER_0 and BFI_COUNTER_1 with BFI_COUNTER_0 associated a PCI/PCI index (e.g., the serving cell PCI/PCI index) or a value of CORESETPoolIndex (e.g., 0) and BFI_COUNTER_1 associated with another (different) PCI/PCI index (e.g., a PCI/PCI index different from the serving cell PCI/PCI index) or another (different) value of CORESETPoolIndex (e.g., 1).

For this case, the higher layers in the UE may increment the BFI count (by one) in the BFI counter BFI_ COUNTER_0 if the higher layers receive from the physical layer in the UE that the radio link quality for the same PCI/PCI index (e.g., the serving cell PCI/PCI index) or the same value of CORESETPoolIndex (e.g., 0) as that associated with BFI_COUNTER_0 is worse than the BFD threshold, e.g., Qout0, associated with the same PCI/PCI index (e.g., the serving cell PCI/PCI index) or the same value of CORESETPoolIndex (e.g., 0) as that associated with BFI_COUNTER_0. The UE may declare a beam failure for one or more BFD RSs (corresponding to one or more SSB indexes or one or more periodic CSI-RS resource configuration indexes) associated with the same PCI/PCI index (e.g., the serving cell PCI/PCI index) or the same value of CORESETPoolIndex (e.g., 0) as that associated with BFI_COUNTER_0 in q0, q00, or q01 if the BFI count in the BFI counter BFI_COUNTER_0 reaches the maximum number of BFI counts (e.g., provided by the higher layer parameter maxBFIcount) before a BFD timer expires.

After the higher layers in the UE declare beam failure for one or more BFD RSs (corresponding to one or more SSB indexes or one or more periodic CSI-RS resource configuration indexes) associated with the same PCI/PCI index (e.g., the serving cell PCI/PCI index) or the same value of CORESETPoolIndex (e.g., 0) as that associated with BFI_COUNTER_0 in q0, q00, or q01, the higher layers in the UE may reset the BFI count in the BFI counter BFI_COUNTER_0 or the BFD timer to zero. Furthermore, the higher layers in the UE may increment the BFI count (by one) in the BFI counter BFI_COUNTER_1 if the higher layers receive from the physical layer in the UE that the radio link quality for the same PCI/PCI index (e.g., a PCI/PCI index different from the serving cell PCI/PCI index) or the same value of CORESETPoolIndex (e.g., 1) as that associated with BFI_COUNTER_1 is worse than the BFD threshold, e.g., Qout1, associated with the same PCI/PCI index (e.g., a PCI/PCI index different from the serving cell PCI/PCI index) or the same value of CORESETPoolIndex (e.g., 1) as that associated with BFI_COUNTER_1.

The UE may declare a beam failure for one or more BFD RSs (corresponding to one or more SSB indexes or one or more periodic CSI-RS resource configuration indexes) associated with the same PCI/PCI index (e.g., a PCI/PCI index different from the serving cell PCI/PCI index) or the same value of CORESETPoolIndex (e.g., 1) as that associated with BFI_COUNTER_1 in q0, q00, or q01 if the BFI count in the BFI counter BFI_COUNTER_1 reaches the maximum number of BFI counts (e.g., provided by the higher layer parameter maxBFIcount) before a BFD timer expires.

After the higher layers in the UE declare beam failure for one or more BFD RSs (corresponding to one or more SSB indexes or one or more periodic CSI-RS resource configuration indexes) associated with the same PCI/PCI index (e.g., a PCI/PCI index different from the serving cell PCI/PCI index) or the same value of CORESETPoolIndex (e.g., 1) as that associated with BFI_COUNTER_1 in q0, q00, or q01, the higher layers in the UE may reset the BFI count in the BFI counter BFI_COUNTER_1 or the BFD timer to zero.

In another example (example-4.1.31), the higher layers in the UE may increment the BFI count (by one) in the BFI counter associated with an entity ID if the higher layers receive from the physical layer in the UE that the radio link quality for the (same) entity ID is worse than BFD threshold associated with the (same) entity ID. The UE may declare a beam failure for one or more BFD RSs (corresponding to one or more SSB indexes or one or more periodic CSI-RS resource configuration indexes) in q0, q00, or q01 associated with an entity ID if the BFI count in the BFI counter associated with the (same) entity ID reaches the maximum number of BFI counts (e.g., provided by the higher layer parameter maxBFIcount) before a BFD timer expires.

After the higher layers in the UE declare beam failure for one or more BFD RSs (corresponding to one or more SSB indexes or one or more periodic CSI-RS resource configuration indexes) in q0, q00, or q01 associated with an entity ID, the higher layers in the UE may reset the BFI count in the BFI counter associated with the (same) entity ID or the BFD timer to zero. For instance, the UE could maintain two BFI counters BFI_COUNTER_0 and BFI_COUNTER_1 with BFI_COUNTER_0 associated a PCI/PCI index (e.g., the serving cell PCI/PCI index) or a value of CORESETPoolIndex (e.g., 0) and BFI_COUNTER_1 associated with another (different) PCI/PCI index (e.g., a PCI/PCI index different from the serving cell PCI/PCI index) or another (different) value of CORESETPoolIndex (e.g., 1).

For this case, the higher layers in the UE may increment the BFI count (by one) in the BFI counter BFI_COUNTER_0 if the higher layers receive from the physical layer in the UE that the radio link quality for the same PCI/PCI index (e.g., the serving cell PCI/PCI index) or the same value of CORESETPoolIndex (e.g., 0) as that associated with BFI_COUNTER_0 is worse than the BFD threshold, e.g., Qout0, associated with the same PCI/PCI index (e.g., the serving cell PCI/PCI index) or the same value of CORESETPoolIndex (e.g., 0) as that associated with BFI_COUNTER_0. The UE may declare a beam failure for q0, q00, or q01 associated with the same PCI/PCI index (e.g., the serving cell PCI/PCI index) or the same value of CORESETPoolIndex (e.g., 0) as that associated with BFI_COUNTER_0 if the BFI count in the BFI counter BFI_COUNTER_0 reaches the maximum number of BFI counts (e.g., provided by the higher layer parameter maxBFIcount) before a BFD timer expires.

After the higher layers in the UE declare beam failure for q0, q00, or q01 associated with the same PCI/PCI index (e.g., the serving cell PCI/PCI index) or the same value of CORESETPoolIndex (e.g., 0) as that associated with BFI_COUNTER_0, the higher layers in the UE may reset the BFI count in the BFI counter BFI_COUNTER_0 or the BFD timer to zero. Furthermore, the higher layers in the UE may increment the BFI count (by one) in the BFI counter BFI_COUNTER_1 if the higher layers receive from the physical layer in the UE that the radio link quality for the same PCI/PCI index (e.g., a PCI/PCI index different from the serving cell PCI/PCI index) or the same value of CORESETPoolIndex (e.g., 1) as that associated with BFI_COUNTER_1 is worse than the BFD threshold, e.g., Qout1, associated with the same PCI/PCI index (e.g., a PCI/PCI index different from the serving cell PCI/PCI index) or the same value of CORESETPoolIndex (e.g., 1) as that associated with BFI_COUNTER_1.

The UE may declare a beam failure for q0, q00, or q01 associated with the same PCI/PCI index (e.g., a PCI/PCI index different from the serving cell PCI/PCI index) or the same value of CORESETPoolIndex (e.g., 1) as that associated with BFI_COUNTER_1 if the BFI count in the BFI counter BFI_COUNTER_1 reaches the maximum number of BFI counts (e.g., provided by the higher layer parameter maxBFIcount) before a BFD timer expires. After the higher layers in the UE declare beam failure for q0, q00, or q01 associated with the same PCI/PCI index (e.g., a PCI/PCI index different from the serving cell PCI/PCI index) or the same value of CORESETPoolIndex (e.g., 1) as that associated with BFI_COUNTER_1, the higher layers in the UE may reset the BFI count in the BFI counter BFI_COUNTER_1 or the BFD timer to zero.

The UE could be explicitly configured/indicated by the network (e.g., via higher layer RRC signaling) a single list/set of NBI RS resources, e.g., via higher layer parameter candidateBeamRSList. In the present disclosure, the list/set of the NBI RS resources can also be referred to as a NBI RS beam set denoted by q1. The NBI RS resources in the NBI RS beam set q1 could be periodic 1-port or 2-port CSI-RS resource configuration indexes or SSB indexes or other types of SSBs/CSI-RS resources. One or more of the NBI RS resources corresponding to either SSB resources/SSB resource indexes or periodic 1-port or 2-port CSI-RS resources/CSI-RS resource configuration indexes in the NBI RS beam set q1 could be from/associated with one or more PCIs/PCI indexes, e.g., one or more non-serving cell PCIs/PCI indexes different from the serving cell PCI/PCI index or the serving cell PCI/PCI index.

For example, a NBI RS resource configured in the NBI RS beam set q1 provided by the higher layer parameter candidateBeamRSList is for or associated with a PCI (e.g., corresponding to a non-serving cell PCI) if the PCI information/value is indicated/included in the NBI RS beam set q1. For another example, the NBI RS beam set q1 (e.g., provided by the higher layer parameter candidateBeamRSList) could contain one or more NBI RS resources corresponding to either SSB resources/SSB resource indexes or periodic 1-port or 2-port CSI-RS resources/CSI-RS resource configuration indexes associated with the serving cell PCI/PCI index, and one or more NBI RS resources corresponding to either SSB resources/SSB resource indexes or periodic 1-port or 2-port CSI-RS resources/CSI-RS resource configuration indexes associated with one or more PCIs/PCI indexes different from the serving cell PCI/PCI index.

In the present disclosure, a PCI index could correspond/point to the corresponding PCI (value) in a list/set/pool of PCIs that are higher layer configured to the UE, wherein the list/set/pool of PCIs could comprise one or more PCIs different from the serving cell PCI or the serving cell PCI. Yet for another example, if the UE is provided by the network in PDCCH-Config different values of CORESET-PoolIndex for CORESETs, the NBI RS beam set q0 (e.g., provided by the higher layer parameter candidateBeamRSList) could contain one or more NBI RS resources corresponding to either SSB resources/SSB resource indexes or periodic 1-port or 2-port CSI-RS resources/CSI-RS resource configuration indexes associated with value 0 of CORESETPoolIndex, and one or more NBI RS resources corresponding to either SSB resources/SSB resource indexes or periodic 1-port or 2-port CSI-RS resources/CSI-RS resource configuration indexes associated with value 1 of CORESETPoolIndex.

The UE could be explicitly configured/indicated by the network (e.g., via RRC or/and MAC CE or/and DCI based signaling) at least two NBI RS beam sets (S_q1≥2) each containing at least one (N_q1≥1) NBI RS resource corresponding to a SSB resource/SSB index or a periodic 1-port or 2-port CSI-RS resource/CSI-RS resource configuration index. For instance, the UE could be configured by the network two NBI RS beam sets (S_q1=2) q10 and q11, e.g., via higher layer parameters candidateBeamRSList0 and candidateBeamRSList1, respectively. Each NBI RS beam set, i.e., q10 or q11 for S_q1=2, could contain/comprise/include one or more NBI RS resources (N_q1≥1) corresponding to one or more periodic 1-port or 2-port CSI-RS resources/CSI-RS resource configuration indexes or SSB resources/SSB indexes.

Various means of indicating the association between one or more of the NBI RS resources configured in the NBI RS beam set q1, q10, or q11 and one or more PCIs (corresponding to either the serving cell PCI or non-serving cell PCI(s)) are presented as follows.

In one example (example-4.2.1), the NBI RS beam set q1, q10, or q11, and therefore the corresponding higher layer parameter candidateBeamRSList or candidateBeamRSList0 or candidateBeamRSList1, could include/indicate a PCI value, e.g., corresponding to either a serving cell PCI or a non-serving cell PCI. A NBI RS resource configured/indicated in the NBI RS beam set q1, q10, or q11 (and therefore, in the corresponding higher layer parameter candidateBeamRSList or candidateBeamRSList0 or candidateBeamRSList1) corresponding to either a SSB resource/SSB index or a periodic 1-port or 2-port CSI-RS resource/CSI-RS resource configuration index is for or associated with the PCI indicated/configured therein.

If the configured NBI RS beam set q1, q10, or q11 (and therefore, the corresponding higher layer parameter candidateBeamRSList or candidateBeamRSList0 or candidateBeamRSList1) does not indicate/include any PCI value(s) or the PCI is absent in the NBI RS beam set q1, q10, or q11 (and therefore, in the corresponding higher layer parameter candidateBeamRSList or candidateBeamRSList0 or candidateBeamRSList1), the UE could expect that a NBI RS resource configured/indicated in the NBI RS beam set q1, q10, or q11 (and therefore, in the corresponding higher layer parameter candidateBeamRSList or candidateBeamRSList0 or candidateBeamRSList1) is for or associated with the serving cell PCI.

In another example (example-4.2.2), the NBI RS beam set q1, q10, or q11, and therefore, the corresponding higher layer parameter candidateBeamRSList or candidateBeamRSList0 or candidateBeamRSList1, could include/indicate a one-bit indicator/flag indicating either the serving cell PCI or a non-serving cell PCI. For instance, a NBI RS resource corresponding to either a SSB resource/SSB index or a periodic 1-port or 2-port CSI-RS resource/CSI-RS resource configuration index configured/indicated in the NBI RS beam set q1, q10, or q11 (and therefore, in the corresponding higher layer parameter candidateBeamRSList or candidateBeamRSList0 or candidateBeamRSList1) with the one-bit indicator/flag set to "1"/"ON"/"enabled" could be for or associated with the serving cell PCI (or the non-serving cell PCI), and a NBI RS resource corresponding to either a SSB resource/SSB index or a periodic 1-port or 2-port CSI-RS resource/CSI-RS resource configuration index configured/indicated in the NBI RS beam set q1, q10, or q11 (and therefore, in the corresponding higher layer parameter candidateBeamRSList or candidateBeamRSList0 or candidateBeamRSList1) with the one-bit indicator/flag set to "0"/"OFF"/"disabled" could be for or associated with the non-serving cell PCI (or the serving cell PCI).

If the configured NBI RS beam set q1, q10, or q11 (and therefore, the corresponding higher layer parameter candidateBeamRSList or candidateBeamRSList0 or candidateBeamRSList1) does not indicate/include the one-bit flag/indicator or the one-bit flag/indication is absent in the NBI RS beam set q1, q10, or q11 (and therefore, in the corresponding higher layer parameter candidateBeamRSList or candidateBeamRSList0 or candidateBeamRSList1), the UE could expect that a NBI RS resource configured/indicated in the NBI RS beam set q1, q10, or q11 (and therefore, in the corresponding higher layer parameter candidate- BeamRSList or candidateBeamRSList0 or candidateBeamRSList1) is for or associated with the serving cell PCI.

In yet another example (example-4.2.3), the NBI RS beam set q1, q10, or q11, and therefore, the corresponding higher layer parameter candidateBeamRSList or candidateBeamRSList0 or candidateBeamRSList1, could include/indicate a multi-bit indicator with each state of the multi-bit indicator corresponding to a PCI (e.g., either a serving cell PCI or a non-serving cell PCI). A NBI RS resource corresponding to a SSB resource/SSB index or a periodic 1-port or 2-port CSI-RS resource/CSI-RS resource configuration index configured/indicated in the NBI RS beam set q1, q10, or q11 (and therefore, in the corresponding higher layer parameter candidateBeamRSList or candidateBeamRSList0 or candidateBeamRSList1) is for or associated with the PCI associated with/corresponding to the multi-bit indicator indicated/configured therein.

If the configured NBI RS beam set q1, q10, or q11 (and therefore, the corresponding higher layer parameter candidateBeamRSList or candidateBeamRSList0 or candidateBeamRSList1) does not indicate/include the multi-bit indicator or the multi-bit indicator is absent in the NBI RS beam set q1, q10, or q11 (and therefore, in the corresponding higher layer parameter candidateBeamRSList or candidateBeamRSList0 or candidateBeamRSList1), the UE could expect that a NBI RS resource configured/indicated in the NBI RS beam set q1, q10, or q11 (and therefore, in the corresponding higher layer parameter higher layer parameter candidateBeamRSList or candidateBeamRSList0 or candidateBeamRSList1) is for or associated with the serving cell PCI.

In yet another example (example-4.2.4), the NBI RS beam set q1, q10, or q11, and therefore, the corresponding higher layer parameter candidateBeamRSList or candidateBeamRSList0 or candidateBeamRSList1, could include/indicate an index to an entry in a set/list/pool of PCIs (e.g., including both the serving cell PCI and non-serving cell PCIs higher layer configured to the UE). A NBI RS resource corresponding to a SSB resource/SSB index or a periodic 1-port or 2-port CSI-RS resource/CSI-RS resource configuration index configured/indicated in the NBI RS beam set q1, q10, or q11 (and therefore, the corresponding higher layer parameter candidateBeamRSList or candidateBeamRSList0 or candidateBeamRSList1) is for or associated with the indicated entry (and therefore, the corresponding PCI) in the set/list/pool of PCIs. If the configured NBI RS beam set q1, q10, or q11 (and therefore, the corresponding higher layer parameter candidateBeamRSList or candidateBeamRSList0 or candidateBeamRSList1) does not indicate/include any index to an entry in the set/list/pool of PCIs or the index to an entry in the set/list/pool of PCIs is absent in the NBI RS beam set q1, q10, or q11 (and therefore, in the corresponding higher layer parameter candidateBeamRSList or candidateBeamRSList0 or candidateBeamRSList1), the UE could expect that a NBI RS resource configured/indicated in the NBI RS beam set q1, q10, or q11 (and therefore, in the corresponding higher layer parameter candidateBeamRSList or candidateBeamRSList0 or candidateBeamRSList1) is for or associated with the serving cell PCI.

In yet another example (example-4.2.5), the NBI RS beam set q1, q10, or q11, and therefore, the corresponding higher layer parameter candidateBeamRSList or candidateBeamRSList0 or candidateBeamRSList1, could include/indicate an index/ID of another higher layer RRC parameter, wherein one or more PCIs or PCI information could be indicated/included. A NBI RS resource corresponding to a SSB resource/SSB index or a periodic 1-port or 2-port CSI-RS resource/CSI-RS resource configuration index configured/indicated in the NBI RS beam set q1, q10, or q11 (and therefore, in the corresponding higher layer parameter candidateBeamRSList or candidateBeamRSList0 or candidateBeamRSList1) is for or associated with the indicated RRC parameter (and therefore, the corresponding PCI(s) or PCI information indicated/included therein).

If the configured NBI RS beam set q1, q10, or q11 (and therefore, the corresponding higher layer parameter candidateBeamRSList or candidateBeamRSList0 or candidateBeamRSList1) does not indicate/include any index/ID of any other RRC parameters indicating/including one or more PCIs or PCI information or the index/ID of another higher layer RRC parameter indicating/including one or more PCIs or PCI information is absent in the NBI RS beam set q1, q10, or q11 (and therefore, in the corresponding higher layer parameter candidateBeamRSList or candidateBeamRSList0 or candidateBeamRSList1), the UE could expect that a NBI RS resource configured/indicated in the NBI RS beam set q1, q10, or q11 (and therefore, in the corresponding higher layer parameter candidateBeamRSList or candidateBeamRSList0 or candidateBeamRSList1) is for or associated with the serving cell PCI.

In yet another example (example-4.2.6), the NBI RS beam set q1, q10, or q11, and therefore, the corresponding higher layer parameter candidateBeamRSList or candidateBeamRSList0 or candidateBeamRSList1, could include/indicate an entity ID. In the present disclosure, an entity ID could correspond to a PCI value, a CORESETPoolIndex value, a TRP-specific index/ID value, a TRP-specific higher layer signaling index/ID value, or a TRP-specific RS set index/ID value. A NBI RS resource corresponding to a SSB resource/SSB index or a periodic 1-port or 2-port CSI-RS resource/CSI-RS resource configuration index configured/indicated in the NBI RS beam set q1, q10, or q11 (and therefore, in the corresponding higher layer parameter candidateBeamRSList or candidateBeamRSList0 or candidateBeamRSList1) is for or associated with the indicated entity ID (and therefore, the corresponding PCI value, CORESETPoolIndex value, TRP-specific index/ID value, TRP-specific higher layer signaling index/ID value or TRP-specific RS set index/ID value).

If the configured NBI RS beam set q1, q10, or q11 (and therefore, the corresponding higher layer parameter candidateBeamRSList or candidateBeamRSList0 or candidateBeamRSList1) does not indicate/include any entity ID or the entity ID is absent in the NBI RS beam set q1, q10, or q11 (and therefore, in the corresponding higher layer parameter candidateBeamRSList or candidateBeamRSList0 or candidateBeamRSList1), the UE could expect that a NBI RS resource configured/indicated in the NBI RS beam set q1, q10, or q11 (and therefore, in the corresponding higher layer parameter candidateBeamRSList or candidateBeamRSList0 or candidateBeamRSList1) is for or associated with the serving cell PCI.

In yet another example (example-4.2.7), when configured by the network to perform inter-cell BFR operation, e.g., when the UE is provided/configured by the network a higher layer parameter InterCellBFR set to "enabled," the (first) NBI RS beam set q10 (e.g., provided by candidateBeamRSList0) could be configured for/associated with the serving cell PCI/PCI index (or a PCI/PCI index different from the serving cell PCI/PCI index), and the (second) NBI RS beam set q11 (e.g., provided by candidateBeamRSList1) could be configured for/associated with the PCI/PCI index different from the serving cell PCI/PCI index (or the serving cell PCI/PCI index), wherein a PCI index corresponds/points to the corresponding PCI in a first/second list/set/pool of PCIs comprising PCI(s) different from the serving cell PCI or the serving cell PCI.

Alternatively, when the UE is provided/configured by the network the higher layer parameter InterCellBFR set to "enabled," the (first) NBI RS beam set q10 (e.g., provided by candidateBeamRSList0) could be configured for/associated with the first (or second/last) PCI in the first/second list/set/pool of PCIs or the lowest (or highest) PCI in the first/second list/set/pool of PCIs or the PCI index corresponding/pointing to the lowest (or highest) PCI in the first/second list/set/pool of PCIs, and the (second) NBI RS beam set q11 (e.g., provided by candidateBeamRSList1) could be configured for/associated with the second/last (or first) PCI in the first/second list/set/pool of PCIs or the highest (or lowest) PCI in the first/second list/set/pool of PCIs or the PCI index corresponding/pointing to the highest (or lowest) PCI in the first/second list/set/pool of PCIs.

Optionally, when the UE is provided/configured by the network the higher layer parameter InterCellBFR set to "enabled" and two different CORESETPoolIndex values 0 and 1 in PDCCH-Config for CORESETs, the (first) NBI RS beam set q10 (e.g., provided by candidateBeamRSList0) could be configured for/associated with value 0 (or 1) of CORESETPoolIndex, and the (second) NBI RS beam set q11 (e.g., provided by candidateBeamRSList1) could be configured for/associated with value 1 (or 0) of CORESETPoolIndex.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.2.8), a set of at least one (e.g., M>1) entity IDs could be included/indicated/configured in the NBI RS beam set q1, q10, or q11 including/indicating/configuring a set of at least one (e.g., M>1) NBI RS resources such as SSB resources/SSB indexes or periodic 1-port or 2-port CSI-RS resources/CSI-RS resource configuration indexes. In the present disclosure, an entity ID could correspond to a PCI value (corresponding to either a serving cell PCI or a non-serving cell PCI), an index to an entry in a list of PCIs configured to the UE, a CORESETPoolIndex value, a TRP-specific index/ID value, a TRP-specific higher layer signaling index/ID value, a TRP-specific RS set index/ID value, a one-bit flag/indicator indicating either the serving cell PCI or a non-serving cell PCI or a multi-bit indicator with each state of the multi-bit indicator corresponding to a different PCI.

Each entity ID in the set of M entity IDs included/indicated/configured in the NBI RS beam set q1, q10, or q11 (provided by the higher layer parameter candidateBeamRSList or candidateBeamRSList0 or candidateBeamRSList1) could correspond to one or more NBI RS resources such as SSB resources/SSB indexes or periodic 1-port or 2-port CSI-RS resources/CSI-RS resource indexes configured/indicated/included in the NBI RS beam set q1, q10, or q11. For example, a set of M>1 PCI values could be included/indicated/configured in the NBI RS beam set q1, q10, or q11 (e.g., provided by the higher layer parameter candidateBeamRSList or candidateBeamRSList0 or candidateBeamRSList1) including/indicating/configuring a set of M NBI RS resources such as SSB resources/SSB indexes or periodic 1-port or 2-port CSI-RS resources/CSI-RS resource configuration indexes.

Each of the M>1 indicated PCIs could correspond to a different NBI RS resource such as SSB resource/SSB index or periodic 1-port or 2-port CSI-RS resource/CSI-RS resource index included/indicated/configured in the NBI RS beam set q1, q10, or q11. For instance, in the NBI RS beam set q1, q10, or q11 provided by the higher layer parameter candidateBeamRSList or candidateBeamRSList0 or candidateBeamRSList1, the m-th PCI or the m-th lowest (or the m-th highest) PCI value in the set of M>1 PCIs could correspond to the m-th NBI RS resource such as SSB resource/SSB index or periodic 1-port or 2-port CSI-RS resource/CSI-RS resource configuration index in the NBI RS beam set q1, q10, or q11, where m=1, 2, . . . , M.

For another example, a set of M>1 indexes each pointing to an entry in a first list/set/pool of PCIs could be included/indicated/configured in the NBI RS beam set q1, q10, or q11 (e.g., provided by the higher layer parameter candidateBeamRSList or candidateBeamRSList0 or candidateBeamRSList1) including/indicating/configuring a set of M NBI RS resources such as SSB resources/SSB indexes or periodic 1-port or 2-port CSI-RS resources/CSI-RS resource indexes. Each of the M>1 indicated indexes, and therefore, the corresponding entry/PCI in the first list/set/pool of PCIs could correspond to a different NBI RS resource such as SSB resource/SSB index or periodic 1-port or 2-port CSI-RS resource/CSI-RS resource configuration index included/indicated/configured in the NBI RS beam set q1, q10, or q11.

For instance, in the NBI RS beam set q1, q10, or q11 provided by the higher layer parameter candidateBeamRSList or candidateBeamRSList0 or candidateBeamRSList1, the m-th index in the set of M>1 indexes, and therefore, the corresponding entry/PCI in the first list/set/pool of PCIs, could correspond to the m-th NBI RS resource such as SSB resource/SSB index or periodic 1-port or 2-port CSI-RS resource/CSI-RS resource configuration index in the NBI RS beam set q1, q10, or q11, where m=1, 2, . . . , M.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.2.9), a set of at least one (e.g., M1>1) entity IDs could be included/indicated/configured in the NBI RS beam set q1, q10, or q11 including/indicating/configuring a set of at least one (e.g., M>1) NBI RS resources such as SSB resources/SSB indexes or periodic 1-port or 2-port CSI-RS resources/CSI-RS resource configuration indexes.

In the present disclosure, an entity ID could correspond to a PCI value (corresponding to either a serving cell PCI or a non-serving cell PCI), an index to an entry in a list of PCIs configured to the UE, a CORESETPoolIndex value, a TRP-specific index/ID value, a TRP-specific higher layer signaling index/ID value, a TRP-specific RS set index/ID value, a one-bit flag/indicator indicating either the serving cell PCI or a non-serving cell PCI or a multi-bit indicator with each state of the multi-bit indicator corresponding to a different PCI. Each entity ID in the set of M1 entity IDs included/indicated/configured in the NBI RS beam set q1, q10, or q11 (provided by the higher layer parameter candidateBeamRSList or candidateBeamRSList0 or candidateBeamRSList1) could correspond to one or more NBI RS resources such as SSB resources/SSB indexes or periodic 1-port or 2-port CSI-RS resources/CSI-RS resource configuration indexes configured/indicated/included in the NBI RS beam set q1, q10, or q11.

For example, a set of M1>1 PCI values could be included/indicated/configured in the NBI RS beam set q1, q10, or q11 (e.g., provided by the higher layer parameter candidateBeamRSList or candidateBeamRSList0 or candidateBeamRSList1) including/indicating/configuring a first set of M NBI RS resources such as SSB resources/SSB indexes or periodic 1-port or 2-port CSI-RS resources/CSI-RS resource configuration indexes. Each of the M1>1 indicated PCIs could be associated with/linked to a second set of NBI RS resources such as SSB resources/SSB indexes or periodic 1-port or 2-port CSI-RS resources/CSI-RS resource indexes out of the first set of NBI RS resources included/indicated/configured in the NBI RS beam set q1, q10, or q11.

For instance, the UE could be provided by the network in the NBI RS beam set q1, q10, or q11 provided by the higher layer parameter candidateBeamRSList or candidateBeamRSList0 or candidateBeamRSList1 (e.g., M1) PCI-NBIRS association parameters each indicating a PCI value and a second set of NBI RS resources such as SSB resources/SSB indexes or periodic 1-port or 2-port CSI-RS resources/CSI-RS resource configuration indexes out of the first set of M NBI RS resources included/configured/indicated in the NBI RS beam set q1, q10, or q11. The second set of NBI RS resources and the PCI value indicated in the same PCI-NBIRS association parameter are associated, i.e., the second set of NBI RS resources are configured for the PCI if they are indicated in the same PCI-NBIRS association parameter.

For another example, a set of M1>1 indexes pointing to M1>1 entries in a first list/set/pool of PCIs could be included/indicated/configured in the NBI RS beam set q1, q10, or q11 (e.g., provided by the higher layer parameter candidateBeamRSList or candidateBeamRSList0 or candidateBeamRSList1) including/indicating/configuring a set of M NBI RS resources such as SSB resources/SSB indexes or periodic 1-port or 2-port CSI-RS resources/CSI-RS resource configuration indexes. Each of the M1>1 indicated indexes, and therefore, the corresponding entry/PCI in the first list/set/pool of PCIs could be associated with/linked to a second set of NBI RS resources such as SSB resources/SSB indexes or periodic 1-port or 2-port CSI-RS resources/CSI-RS resource configuration indexes out of the first set of M NBI RS resources included/indicated/configured in the NBI RS beam set q1, q10, or q11.

For instance, the UE could be provided by the network in the NBI RS beam set q1, q10, or q11 provided by the higher layer parameter candidateBeamRSList or candidateBeamRSList0 or candidateBeamRSList1 (e.g., M1) PCIidx-NBIRS association parameters each indicating an index pointing to an entry/PCI in the first set/list/pool of PCIs and a second set of NBI RS resources such as SSB resources/SSB indexes or periodic 1-port or 2-port CSI-RS resources/CSI-RS resource configuration indexes out of the first set of M NBI RS resources included/configured/indicated in the NBI RS beam set q1, q10, or q11. The second set of NBI RS resources and the index, and therefore the corresponding entry/PCI in the first set/pool/list of PCIs indicated in the same PCIidx-NBIRS association parameter are associated, i.e., the second set of NBI RS resources are configured for the index, and therefore the corresponding entry/PCI in the first set/pool/list of PCIs if they are indicated in the same PCIidx-NBIRS parameter.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.2.10), a set of at least one (e.g., M1>1) entity IDs could be included/indicated/configured in the NBI RS beam set q1, q10, or q11 including/indicating/configuring a set of at least one (e.g., M>1) NBI RS resources such as SSB resources/SSB indexes or periodic 1-port or 2-port CSI-RS resources/CSI-RS resource configuration indexes. In the present disclosure, an entity ID could correspond to a PCI value (corresponding to either a serving cell PCI or a non-serving cell PCI), an index to an entry in a list of PCIs configured to the UE, a CORESETPoolIndex value, a TRP-specific index/ID value, a TRP-specific higher layer signaling index/ID value, a TRP-specific RS set index/ID value, a one-bit flag/indicator indicating either the serving cell PCI or a non-serving cell PCI or a multi-bit indicator with each state of the multi-bit indicator corresponding to a different PCI.

Each entity ID in the set of M1 entity IDs included/indicated/configured in the NBI RS beam set q1, q10, or q11 (provided by the higher layer parameter candidateBeamRSList or candidateBeamRSList0 or candidateBeamRSList1) could correspond to one or more NBI RS resources such as SSB resources/SSB indexes or periodic 1-port or 2-port CSI-RS resources/CSI-RS resource configuration indexes configured/indicated/included in the NBI RS beam set q1, q10, or q11. The set of M NBI RS resources could be partitioned/divided into M1 groups of NBI RS resources each including/indicating/configuring one or more NBI RS resources. Here, a group of NBI RS resources could be referred to as a NBI RS resource group.

For instance, the r-th NBI RS resource group (e.g., the r-th NBI RS resource group) among the M1 NBI RS resource groups (r=1, . . . , M1) could comprise/include $k_r$ NBI RS resources such as SSB resources/SSB indexes or periodic 1-port or 2-port CSI-RS resources/CSI-RS resource configuration indexes out of the total M NBI RS resources; hence, $M=\Sigma_{r=1}^{M1} k_r$. In this case, each entity ID in the set of M1 entity IDs included/indicated/configured in the NBI RS beam set q1, q10, or q11 (provided by the higher layer parameter candidateBeamRSList or candidateBeamRSList0 or candidateBeamRSList1) could correspond to one or more NBI RS resource groups included/indicated/configured in the NBI RS beam set q1, q10, or q11.

For example, a set of M1>1 PCI values could be included/indicated/configured in the NBI RS beam set q1, q10, or q11

(e.g., provided by the higher layer parameter candidateBeamRSList or candidateBeamRSList0 or candidateBeamRSList1) including/indicating/configuring a set of M NBI RS resources such as SSB resources/SSB indexes or periodic 1-port or 2-port CSI-RS resources/CSI-RS resource configuration indexes, which are further divided/partitioned into M1 NBI RS resource groups as discussed above. Each of the M1>1 indicated PCIs could correspond to a different NBI RS resource group including/indicating/configuring one or more SSB resources/SSB indexes or one or more periodic 1-port or 2-port CSI-RS resources/CSI-RS resource configuration indexes included/indicated/configured in the NBI RS beam set q1, q10, or q11.

For instance, in the NBI RS beam set q1, q10, or q11 provided by the higher layer parameter candidateBeamRSList or candidateBeamRSList0 or candidateBeamRSList1, the r-th PCI or the r-th lowest (or the r-th highest) PCI value in the set of M1>1 PCIs could correspond to the r-th NBI RS resource group including/indicating/configuring one or more SSB resources/SSB indexes or one or more periodic 1-port or 2-port CSI-RS resources/CSI-RS resource configuration indexes among the M1 NBI RS resource groups partitioned/divided from the set of M>1 NBI RS resources; that is, the r-th NBI RS resource group, and therefore the corresponding SSB resources/SSB indexes or periodic 1-port or 2-port CSI-RS resources/CSI-RS resource configuration indexes configured therein, is configured for the r-th PCI, where r=1, 2, . . . , M1.

Optionally, the serving cell PCI could correspond to the s-th NBI RS resource group including/indicating/configuring one or more SSB resources/SSB indexes or one or more periodic 1-port or 2-port CSI-RS resources/CSI-RS resource configuration indexes among the M1 NBI RS resource groups partitioned/divided from the set of M>1 NBI RS resources; that is, the s-th NBI RS resource group, and therefore the corresponding SSB resources/SSB indexes or periodic 1-port or 2-port CSI-RS resources/CSI-RS resource configuration indexes configured therein, is configured for the serving cell PCI, where s could be determined according to: (1) fixed in the system specifications or deterministic per RRC configuration, e.g., 1 (i.e., the $1^{st}$ NBI RS resource group), (2) configured/indicated by the network, or (3) autonomously determined by the UE.

For another example, a set of M1>1 indexes pointing to M1>1 entries in a first list/set/pool of PCIs could be included/indicated/configured in the NBI RS beam set q1, q10, or q11 (e.g., provided by the higher layer parameter candidateBeamRSList or candidateBeamRSList0 or candidateBeamRSList1) including/indicating/configuring a set of M NBI RS resources such as SSB resources/SSB indexes or periodic 1-port or 2-port CSI-RS resources/CSI-RS resource configuration indexes, which are further partitioned/divided into M1 NBI RS resource groups as discussed above. Each of the M1>1 indicated indexes, and therefore, the corresponding entry/PCI in the first list/set/pool of PCIs could correspond to a different NBI RS resource group including/indicating/configuring one or more SSB resources/SSB indexes or one or more periodic 1-port or 2-port CSI-RS resources/CSI-RS resource configuration indexes.

For instance, in the NBI RS beam set q1, q10, or q11 provided by the higher layer parameter candidateBeamRSList or candidateBeamRSList0 or candidateBeamRSList1, the r-th index in the set of M1>1 indexes, and therefore, the corresponding entry/PCI in the first list/set/pool of PCIs, could correspond to the r-th NBI RS resource group including/indicating/configuring one or more SSB resources/SSB indexes or one or more periodic 1-port or 2-port CSI-RS resources/CSI-RS resource configuration indexes among the M1 NBI RS resource groups partitioned/divided from the set of M>1 NBI RS resources; that is, the r-th NBI RS resource group, and therefore the corresponding SSB resources/SSB indexes or periodic 1-port or 2-port CSI-RS resources/CSI-RS resource configuration indexes configured therein, is configured for the r-th index, and therefore the corresponding entry/PCI in the first set/list/pool of PCIs, where r=1, 2, . . . , M1.

Optionally, the index corresponding to the serving cell PCI in the first set/list/pool of PCIs could correspond to the s-th NBI RS resource group including/indicating/configuring one or more SSB resources/SSB indexes or one or more periodic 1-port or 2-port CSI-RS resources/CSI-RS resource configuration indexes among the M1 NBI RS resource groups partitioned/divided from the set of M>1 NBI RS resources; that is, the s-th NBI RS resource group, and therefore the corresponding SSB resources/SSB indexes or periodic 1-port or 2-port CSI-RS resources/CSI-RS resource configuration indexes configured therein, is configured for the index pointing to the serving cell PCI in the first set/list/pool of PCIs, and therefore the serving cell PCI, where s could be determined according to: (1) fixed in the system specifications or deterministic per RRC configuration, e.g., 1 (i.e., the $1^{st}$ NBI RS resource group), (2) configured/indicated by the network, or (3) autonomously determined by the UE.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.2.11), a set of at least one (e.g., M1>1) entity IDs could be included/indicated/configured in the NBI RS beam set q1, q10, or q11 including/indicating/configuring a set of at least one (e.g., M>1) NBI RS resources such as SSB resources/SSB indexes or periodic 1-port or 2-port CSI-RS resources/CSI-RS resource configuration indexes.

In the present disclosure, an entity ID could correspond to a PCI value (corresponding to either a serving cell PCI or a non-serving cell PCI), an index to an entry in a list of PCIs configured to the UE, a CORESETPoolIndex value, a TRP-specific index/ID value, a TRP-specific higher layer signaling index/ID value, a TRP-specific RS set index/ID value, a one-bit flag/indicator indicating either the serving cell PCI or a non-serving cell PCI or a multi-bit indicator with each state of the multi-bit indicator corresponding to a different PCI.

Each entity ID in the set of M1 entity IDs included/indicated/configured in the NBI RS beam set q1, q10, or q11 (provided by the higher layer parameter candidateBeamRSList or candidateBeamRSList0 or candidateBeamRSList1) could correspond to one or more NBI RS resources such as SSB resources/SSB indexes or periodic 1-port or 2-port CSI-RS resources/CSI-RS resource configuration indexes configured/indicated/included in the NBI RS beam set q1, q10, or q11. The UE could be provided by the network in the NBI RS beam set q1, q10, or q11 provided by the higher layer parameter candidateBeamRSList or candidateBeamRSList0 or candidateBeamRSList1, M1 groups of NBI RS resources each including/indicating/configuring one or more NBI RS resources obtained/configured from the set of M NBI RS resources, i.e., the NBI RS beam set q1, q10, or q11. Here, a group of NBI RS resources could be referred to as a NBI RS resource group.

For instance, the r-th configured NBI RS resource group among the M1 configured NBI RS resource groups could comprise/include $k_r$ NBI RS resources such as SSB resources/SSB resource indexes or periodic 1-port or 2-port CSI-RS resources/CSI-RS resource configuration indexes out of the total M NBI RS resources; hence, $M=\Sigma_{r=1}^{M1} 1 k_r$. Each configured NBI RS resource group could include/indicate/configure an entity ID (e.g., one of M1 entity IDs). For example, each configured NBI RS resource group could include/indicate/configure a PCI value. The NBI RS resources (SSB resources/SSB indexes or periodic 1-port or 2-port CSI-RS resources/CSI-RS resource configuration indexes) in a NBI RS resource group are configured for the PCI indicated in the same NBI RS resource group.

Optionally, the s-th configured NBI RS resource group among the M1 configured NBI RS resource groups could include/indicate/configure the serving cell PCI; that is, the SSB resources/SSB indexes or periodic 1-port or 2-port CSI-RS resources/CSI-RS resource configuration indexes in the s-th NBI RS resource group are configured for the serving cell PCI, where s could be determined according to: (1) fixed in the system specifications or deterministic per RRC configuration, e.g., 1 (i.e., the $1^{st}$ NBI RS resource group), (2) configured/indicated by the network, or (3) autonomously determined by the UE.

For another example, each configured NBI RS resource group could include/indicate/configure an index pointing to an entry/PCI in a first set/list/pool of PCIs. The NBI RS resources (SSB resources/SSB indexes or periodic 1-port or 2-port CSI-RS resources/CSI-RS resource configuration indexes) in a NBI RS resource group are configured for the index indicated in the same NBI RS resource group, and therefore the corresponding entry/PCI in the first list/set/pool of PCIs.

Optionally, the s-th configured NBI RS resource group among the M1 configured NBI RS resource groups could include/indicate/configure the index corresponding to the serving cell PCI in the first set/list/pool of PCIs; that is, the SSB resources/SSB indexes or periodic 1-port or 2-port CSI-RS resources/CSI-RS resource configuration indexes in the s-th NBI RS resource group are configured for the index pointing to the serving cell PCI in the first set/list/pool of PCIs, and therefore the serving cell PCI, where s could be determined according to: (1) fixed in the system specifications or deterministic per RRC configuration, e.g., 1 (i.e., the $1^{st}$ NBI RS resource group), (2) configured/indicated by the network, or (3) autonomously determined by the UE.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

As discussed above, a NBI RS resource in the NBI RS beam set q1, q10, or q11 could correspond to a periodic 1-port or 2-port CSI-RS resource/CSI-RS resource configuration index, e.g., provided by the higher layer parameter NZP-CSI-RS-Resource. A periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, could be for or associated with a PCI (e.g., corresponding to a non-serving cell PCI) if the PCI information/value is indicated/included in the corresponding parameter configuring the periodic 1-port or 2-port CSI-RS resource/CSI-RS resource configuration index, e.g., in the higher layer parameter NZP-CSI-RS-Resource.

In one example (example-4.2.12), the parameter configuring a periodic 1-port or 2-port CSI-RS resource/CSI-RS resource configuration index, e.g., the higher layer parameter NZP-CSI-RS-Resource, could include/indicate a PCI value, e.g., corresponding to either a serving cell PCI or a non-serving cell PCI. The periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the PCI indicated/configured in the same NZP-CSI-RS-Resource.

If the higher layer parameter, e.g., NZP-CSI-RS-Resource, configuring the periodic 1-port or 2-port CSI-RS resource/CSI-RS resource configuration index does not indicate/include any PCI value(s) or the PCI is absent in the higher layer parameter, e.g., NZP-CSI-RS-Resource, configuring the periodic 1-port or 2-port CSI-RS resource/CSI-RS resource configuration index, the UE could expect that the periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the serving cell PCI.

In another example (example-4.2.13), the parameter configuring a periodic 1-port or 2-port CSI-RS resource/CSI-RS resource configuration index, e.g., the higher layer parameter NZP-CSI-RS-Resource could include/indicate a one-bit indicator/flag indicating either the serving cell PCI or a non-serving cell PCI. For instance, the periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, with the one-bit indicator/flag set to "1"/"ON"/"enabled" could be for or associated with the serving cell PCI (or the non-serving cell PCI), and the periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, with the one-bit indicator/flag set to "0"/"OFF"/"disabled" could be for or associated with the non-serving cell PCI (or the serving cell PCI).

If the higher layer parameter NZP-CSI-RS-Resource configuring the periodic 1-port or 2-port CSI-RS resource/CSI-RS resource configuration index does not indicate/include the one-bit flag/indicator or the one-bit flag/indication is absent in the higher layer parameter NZP-CSI-RS-Resource configuring the periodic 1-port or 2-port CSI-RS resource/CSI-RS resource configuration index, the UE could expect that the periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the serving cell PCI.

In yet another example (example-4.2.14), the parameter configuring a periodic 1-port or 2-port CSI-RS resource/CSI-RS resource configuration index, e.g., the higher layer parameter NZP-CSI-RS-Resource could include/indicate a multi-bit indicator with each state of the multi-bit indicator corresponding to a PCI (e.g., either a serving cell PCI or a non-serving cell PCI). The periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the PCI associated with/corresponding to the multi-bit indicator indicated/configured in the same NZP-CSI-RS-Resource.

If the higher layer parameter NZP-CSI-RS-Resource configuring the periodic 1-port or 2-port CSI-RS resource/CSI-RS resource configuration index does not indicate/include the multi-bit indicator or the multi-bit indicator is absent in the higher layer parameter NZP-CSI-RS-Resource configuring the periodic 1-port or 2-port CSI-RS resource/CSI-RS resource configuration index, the UE could expect that the periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the serving cell PCI.

In yet another example (example-4.2.15), the parameter configuring a periodic 1-port or 2-port CSI-RS resource/CSI-RS resource configuration index, e.g., the higher layer parameter NZP-CSI-RS-Resource could include/indicate an index pointing to an entry in a first set/list/pool of PCIs (e.g., including both the serving cell PCI and non-serving cell PCIs configured to the UE). The periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the index, and therefore the corresponding entry/PCI in the first set/list/pool of PCIs, indicated in the same NZP-CSI-RS-Resource.

If the higher layer parameter NZP-CSI-RS-Resource configuring the periodic 1-port or 2-port CSI-RS resource/CSI-RS resource configuration index does not indicate/include any index to an entry in the first set/list/pool of PCIs or the index to an entry in the first set/list/pool of PCIs is absent in the higher layer parameter NZP-CSI-RS-Resource configuring the periodic 1-port or 2-port CSI-RS resource/CSI-RS resource configuration index, the UE could expect that the periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the serving cell PCI.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.2.16), the parameter configuring a periodic 1-port or 2-port CSI-RS resource/CSI-RS resource configuration index, e.g., the higher layer parameter NZP-CSI-RS-Resource could include/indicate an index/ID of another higher layer RRC parameter, wherein one or more PCIs or PCI information could be indicated/included. The periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the RRC parameter (and therefore, the corresponding PCI(s) or PCI information indicated/included therein) indicated in the same NZP-CSI-RS-Resource.

If the higher layer parameter NZP-CSI-RS-Resource configuring the periodic 1-port or 2-port CSI-RS resource/CSI-RS resource configuration index does not indicate/include any index/ID of any other RRC parameters indicating/including one or more PCIs or PCI information or the index/ID of another higher layer RRC parameter indicating/including one or more PCIs or PCI information is absent in the higher layer parameter NZP-CSI-RS-Resource configuring the periodic 1-port or 2-port CSI-RS resource/CSI-RS resource configuration index, the UE could expect that the periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the serving cell PCI.

In yet another example (example-4.2.17), the parameter configuring a periodic 1-port or 2-port CSI-RS resource/CSI-RS resource configuration index, e.g., the higher layer parameter NZP-CSI-RS-Resource could include/indicate an entity ID. In the present disclosure, an entity ID could correspond to a PCI value, a CORESETPoolIndex value, a TRP-specific index/ID value, a TRP-specific higher layer signaling index/ID value, or a TRP-specific RS set index/ID value. The periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the entity ID (and therefore, the corresponding PCI value, CORESETPoolIndex value, TRP-specific index/ID value, TRP-specific higher layer signaling index/ID value or TRP-specific RS set index/ID value) indicated in the same NZP-CSI-RS-Resource.

If the higher layer parameter NZP-CSI-RS-Resource configuring the periodic 1-port or 2-port CSI-RS resource/CSI-RS resource configuration index does not indicate/include any entity ID or the entity ID is absent in the higher layer parameter NZP-CSI-RS-Resource configuring the periodic 1-port or 2-port CSI-RS resource/CSI-RS resource configuration index, the UE could expect that the periodic 1-port or 2-port CSI-RS resource/CSI-RS resource configuration index provided by the higher layer parameter NZP-CSI-RS-Resource, and therefore, the corresponding NBI RS resource in the NBI RS beam set q1, q10, or q11, is for or associated with the serving cell PCI.

In yet another example (example-4.2.18), a periodic 1-port or 2-port CSI-RS resource/CSI-RS resource configuration index could be quasi co-located (QCL'ed) with a SSB resource/SSB resource index associated with an entity ID. In the present disclosure, an entity ID could correspond to a PCI value, a PCI index pointing/corresponding to an entry/PCI in a list of PCIs that are higher layer configured to the UE, a CORESETPoolIndex value, a TRP-specific index/ID value, a TRP-specific higher layer signaling index/ID value, or a TRP-specific RS set index/ID value.

For instance, a SSB resource/SSB resource index could be configured as a QCL source RS in a TCI state, and the corresponding TCI state ID/index could be indicated in the parameter, e.g., the higher layer parameter NZP-CSI-RS-Resource, configuring a periodic 1-port or 2-port CSI-RS resource/CSI-RS resource configuration index. For this case, the periodic 1-port or 2-port CSI-RS resource/CSI-RS resource configuration index is said to be quasi co-located (QCL'ed) with the SSB resource/SSB resource index and associated with the same entity ID as that associated with the SSB resource/SSB resource index. Hence, if the periodic 1-port or 2-port CSI-RS resource/CSI-RS resource configuration index is configured as a NBI RS resource in the NBI RS beam set q1, q10, or q11, the NBI RS resource is for or associated with the entity ID (and therefore, the corresponding PCI value, PCI index pointing/corresponding to an entry/PCI in a list of PCIs that are higher layer configured to the UE, CORESETPoolIndex value, TRP-specific index/ID value, TRP-specific higher layer signaling index/ID value or TRP-specific RS set index/ID value).

As discussed above, a NBI RS resource in the NBI RS beam set q1, q10, or q11 could correspond to a SSB resource/SSB index, e.g., provided by the higher layer parameter SSB-Index. A SSB resource/SSB index provided by the higher layer parameter SSB-Index, and therefore, the corresponding NBI RS resource in the NBI RS beam set q1, q10, or q11, could be for or associated with a PCI (e.g., corresponding to a non-serving cell PCI) if the PCI information/value is indicated/included in the corresponding parameter configuring the SSB resource/SSB index, e.g., in the higher layer parameter SSB-Index.

In one example (example-4.2.19), the parameter configuring a SSB resource/SSB index, e.g., the higher layer parameter SSB-Index, could include/indicate a PCI value, e.g., corresponding to either a serving cell PCI or a non-serving cell PCI. The SSB resource/SSB index provided by the higher layer parameter SSB-Index, and therefore, the corresponding NBI RS resource in the NBI RS beam set q1, q10, or q11, is for or associated with the PCI indicated/configured in the same SSB-Index. If the higher layer parameter, e.g., SSB-Index, configuring the SSB resource/SSB index does not indicate/include any PCI value(s) or the PCI is absent in the higher layer parameter, e.g., SSB-Index, configuring the SSB resource/SSB index, the UE could expect that the SSB resource/SSB index provided by the higher layer parameter SSB-Index, and therefore, the corresponding NBI RS resource in the NBI RS beam set q1, q10, or q11, is for or associated with the serving cell PCI.

In another example (example-4.2.20), the parameter configuring a SSB resource/SSB index, e.g., the higher layer parameter SSB-Index could include/indicate a one-bit indicator/flag indicating either the serving cell PCI or a non-serving cell PCI. For instance, the SSB resource/SSB index provided by the higher layer parameter SSB-Index, and therefore, the corresponding NBI RS resource in the NBI RS beam set q1, q10, or q11, with the one-bit indicator/flag set to "1"/"ON"/"enabled" could be for or associated with the serving cell PCI (or the non-serving cell PCI), and the SSB resource/SSB index provided by the higher layer parameter SSB-Index, and therefore, the corresponding NBI RS resource in the NBI RS beam set q1, q10, or q11, with the one-bit indicator/flag set to "0"/"OFF"/"disabled" could be for or associated with the non-serving cell PCI (or the serving cell PCI).

If the higher layer parameter SSB-Index configuring the SSB resource/SSB index does not indicate/include the one-bit flag/indicator or the one-bit flag/indication is absent in the higher layer parameter SSB-Index configuring the SSB resource/SSB index, the UE could expect that the SSB resource/SSB index provided by the higher layer parameter SSB-Index, and therefore, the corresponding NBI RS resource in the NBI RS beam set q1, q10, or q11, is for or associated with the serving cell PCI.

In yet another example (example-4.2.21), the parameter configuring a SSB resource/SSB index, e.g., the higher layer parameter SSB-Index could include/indicate a multi-bit indicator with each state of the multi-bit indicator corresponding to a PCI (e.g., either a serving cell PCI or a non-serving cell PCI). The SSB resource/SSB index provided by the higher layer parameter SSB-Index, and therefore, the corresponding NBI RS resource in the NBI RS beam set q1, q10, or q11, is for or associated with the PCI associated with/corresponding to the multi-bit indicator indicated/configured in the same SSB-Index. If the higher layer parameter SSB-Index configuring the SSB resource/SSB index does not indicate/include the multi-bit indicator or the multi-bit indicator is absent in the higher layer parameter SSB-Index configuring the SSB resource/SSB index, the UE could expect that the SSB resource/SSB index provided by the higher layer parameter SSB-Index, and therefore, the corresponding NBI RS resource in the NBI RS beam set q1, q10, or q11, is for or associated with the serving cell PCI.

In yet another example (example-4.2.22), the parameter configuring a SSB resource/SSB index, e.g., the higher layer parameter SSB-Index could include/indicate an index pointing to an entry in a first set/list/pool of PCIs (e.g., including both the serving cell PCI and non-serving cell PCIs configured to the UE). The SSB resource/SSB index provided by the higher layer parameter SSB-Index, and therefore, the corresponding NBI RS resource in the NBI RS beam set q1, q10, or q11, is for or associated with the index, and therefore the corresponding entry/PCI in the first set/list/pool of PCIs, indicated in the same SSB-Index.

If the higher layer parameter SSB-Index configuring the SSB resource/SSB index does not indicate/include any index to an entry in the first set/list/pool of PCIs or the index to an entry in the first set/list/pool of PCIs is absent in the higher layer parameter SSB-Index configuring the SSB resource/SSB index, the UE could expect that the SSB resource/SSB index provided by the higher layer parameter SSB-Index, and therefore, the corresponding NBI RS resource in the NBI RS beam set q1, q10, or q11, is for or associated with the serving cell PCI.

Furthermore, the first list/set/pool of PCIs could be determined/configured according to: (1) for example, the UE could be higher layer configured by the network (e.g., via higher layer RRC signaling) the first list/set/pool of PCIs (e.g., including both the serving cell PCI and non-serving cell PCIs); and (2) for another example, the UE could be first higher layer configured by the network (e.g., via higher layer RRC signaling) a second list/set/pool of PCIs (e.g., including both the serving cell PCI and non-serving cell PCIs); the UE could then receive from the network a MAC CE activation command/bitmap to activate/indicate one or more entries from the higher layer RRC configured second list/set/pool of PCIs as the first list/set/pool of PCIs.

In yet another example (example-4.2.23), the parameter configuring a SSB resource/SSB index, e.g., the higher layer parameter SSB-Index could include/indicate an index/ID of another higher layer RRC parameter, wherein one or more PCIs or PCI information could be indicated/included. The SSB resource/SSB index provided by the higher layer parameter SSB-Index, and therefore, the corresponding NBI RS resource in the NBI RS beam set q1, q10, or q11, is for or associated with the RRC parameter (and therefore, the corresponding PCI(s) or PCI information indicated/included therein) indicated in the same SSB-Index. If the higher layer parameter SSB-Index configuring the SSB resource/SSB index does not indicate/include any index/ID of any other RRC parameters indicating/including one or more PCIs or PCI information or the index/ID of another higher layer RRC parameter indicating/including one or more PCIs or PCI information is absent in the higher layer parameter SSB-Index configuring the SSB resource/SSB index, the UE could expect that the SSB resource/SSB index provided by the higher layer parameter SSB-Index, and therefore, the corresponding NBI RS resource in the NBI RS beam set q1, q10, or q11, is for or associated with the serving cell PCI.

In yet another example (example-4.2.24), the parameter configuring a SSB resource/SSB index, e.g., the higher layer parameter SSB-Index could include/indicate an entity ID. In the present disclosure, an entity ID could correspond to a PCI value, a CORESETPoolIndex value, a TRP-specific index/ID value, a TRP-specific higher layer signaling index/ID value, or a TRP-specific RS set index/ID value. The SSB resource/SSB index provided by the higher layer parameter SSB-Index, and therefore, the corresponding NBI RS resource in the NBI RS beam set q1, q10, or q11, is for or associated with the entity ID (and therefore, the corresponding PCI value, CORESETPoolIndex value, TRP-specific index/ID value, TRP-specific higher layer signaling index/ID value or TRP-specific RS set index/ID value) indicated in the same SSB-Index.

If the higher layer parameter SSB-Index configuring the SSB resource/SSB index does not indicate/include any entity ID or the entity ID is absent in the higher layer parameter SSB-Index configuring the SSB resource/SSB index, the UE could expect that the SSB resource/SSB index provided by the higher layer parameter SSB-Index, and therefore, the corresponding NBI RS resource in the NBI RS beam set q1, q10, or q11, is for or associated with the serving cell PCI.

A NBI RS resource corresponding to either a SSB resource/SSB resource index or a periodic 1-port or 2-port CSI-RS resource/CSI-RS resource configuration index in a NBI RS beam set (e.g., NBI RS beam set q1, q10, or q11 as discussed above) could be associated with a BFD RS resource corresponding to either a SSB resource/SSB resource index or a periodic 1-port CSI-RS resource/CSI-RS resource configuration index in a BFD RS beam set (e.g., BFD RS beam set q0, q00, or q01 as discussed above). Optionally, a NBI RS beam set (e.g., NBI RS beam set q1, q10, or q11 as discussed above) could be associated with a BFD RS beam set (e.g., BFD RS beam set q0, q00, or q01 as discussed above).

In one example (example-4.2.25), the m-th NBI RS resource or NBI RS resource m or the NBI RS resource with the m-th lowest (or highest) resource ID/index in the NBI RS beam set q1, q10, or q11 could be associated with the n-th BFD RS resource or BFD RS resource nor the BFD RS resource with the n-th lowest (or highest) resource ID/index in the BFD RS beam set q0, q00, or q01, where m∈{1, . . . , M}, n∈{1, . . . , N}, and M and N represent the numbers of NBI RS resources and BFD RS resources in a NBI RS beam set and a BFD RS beam set, respectively. The values of m or n could be determined according to: (1) fixed in the system specifications and known to both the network and the UE sides, (2) provided/configured by the network via higher layer RRC signaling, MAC CE command or DCI format, or (3) autonomously determined by the UE. It is also possible that m=n or M=N. For this case, the m-th NBI RS resource or NBI RS resource m or the NBI RS resource with the m-th lowest (or highest) resource ID/index in the NBI RS beam set q1, q10, or q11 could be associated with the m-th BFD RS resource or BFD RS resource m or the BFD RS resource with the m-th lowest (or highest) resource ID/index in the BFD RS beam set q0, q00, or q01, where m=1, . . . , M (or N).

In another example (example-4.2.26), the first NBI RS beam set or the NBI RS beam set with the lowest set ID/index—e.g., NBI RS beam set q10—could be associated with the first BFD RS beam set or the BFD RS beam set with the lowest set ID/index—e.g., BFD RS beam set q00, and the second NBI RS beam set or the NBI RS beam set with the highest set ID/index—e.g., NBI RS beam set q11—could be associated with the second BFD RS beam set or the BFD RS beam set with the highest set ID/index—e.g., BFD RS beam set q01.

Hence, according to the above discussed association between a NBI RS resource and a BFD RS resource or the association between a NBI RS beam set and a BFD RS beam set, in one example (example-4.2.27), if a NBI RS resource is associated with a PCI/PCI index (e.g., corresponding to either the serving cell PCI/PCI index or a PCI/PCI index different from the serving cell PCI/PCI index) according to the above discussed design examples in the present disclosure, the BFD RS resource associated with the NBI RS resource is also associated with the same PCI/PCI index.

According to the above discussed association between a NBI RS resource and a BFD RS resource or the association between a NBI RS beam set and a BFD RS beam set, in another example (example-4.2.28), if a BFD RS resource is associated with a PCI/PCI index (e.g., corresponding to either the serving cell PCI/PCI index or a PCI/PCI index different from the serving cell PCI/PCI index) according to the above discussed design examples in the present disclosure, the NBI RS resource associated with the BFD RS resource is also associated with the same PCI/PCI index.

According to the above discussed association between a NBI RS resource and a BFD RS resource or the association between a NBI RS beam set and a BFD RS beam set, in yet another example (example-4.2.29), if a NBI RS beam set is associated with a PCI/PCI index (e.g., corresponding to either the serving cell PCI/PCI index or a PCI/PCI index different from the serving cell PCI/PCI index) according to the above discussed design examples in the present disclosure, the BFD RS beam set associated with the NBI RS beam set is also associated with the same PCI/PCI index.

According to the above discussed association between a NBI RS resource and a BFD RS resource or the association between a NBI RS beam set and a BFD RS beam set, in yet another example (example-4.2.30), if a BFD RS beam set is associated with a PCI/PCI index (e.g., corresponding to either the serving cell PCI/PCI index or a PCI/PCI index different from the serving cell PCI/PCI index) according to the above discussed design examples in the present disclosure, the NBI RS beam set associated with the BFD RS beam set is also associated with the same PCI/PCI index.

For the above described design examples, if a UE is provided by the network in PDCCH-Config two values of CORESETPoolIndex (e.g., 0 and 1), and/or, is configured/indicated by the network that the inter-cell (multi-TRP) operation is enabled, and/or, is configured/indicated by the network (SSB) information of PCI(s) other than the serving cell PCI for beam indication, measurement or reporting, the NBI RS beam set q10 or q11 could contain/include one or more NBI RS s (e.g., periodic 1-port or 2-port CSI-RS resource configuration indexes or SSB indexes) associated with one or more PCIs other than the serving cell PCI, wherein the serving cell PCI could be provided in the higher layer parameter ServingCellConfigCommon. As also discussed in the above design examples, the NBI RS beam sets q10 and q11 are mapped/associated to the BFD RS beam sets q00 and q01, respectively. Hence, if q10 (or q11) is associated with a PCI other than the serving cell PCI, the corresponding q00 (or q01) is also associated with the same PCI.

The UE could be provided/configured by the network one or more candidate beam detection (CBD) or new beam identification (NBI) thresholds Qin's, each associated with an entity ID. As discussed above, in the present disclosure, an entity ID could correspond to a PCI value, a PCI index pointing/corresponding to an entry/PCI in a list of PCIs that are higher layer configured to the UE, a CORESETPoolIndex value, a TRP-specific index/ID value, a TRP-specific higher layer signaling index/ID value, or a TRP-specific RS set index/ID value. For instance, the UE could be higher layer RRC configured by the network two CBD/NBI thresholds Qin0 and Qin1 with Qin0 corresponding to a PCI/PCI index (e.g., the serving cell PCI/PCI index) or a value of CORESETPoolIndex (e.g., 0) and Qin1 corresponding to another (different) PCI/PCI index (e.g., a PCI/PCI index different from the serving cell PCI/PCI index) or another (different) value of CORESETPoolIndex (e.g., 1).

In one example (example-4.2.31), after the UE has declared beam failure for one or more BFD RSs (corresponding to one or more SSB indexes or one or more periodic CSI-RS resource configuration indexes) associated with an entity ID in q0, q00, or q01, the UE could assess the radio link quality according to one or more NBI RSs (corresponding to one or more SSB indexes or one or more periodic CSI-RS resource configuration indexes) associated with the (same) entity ID or associated with the one or more BFD RSs in q1, q10, or q11 against the CBD/NBI threshold associated with the (same) entity ID. The UE may apply the CBD/NBI threshold associated with an entity ID to the L1-RSRP measurement obtained from a SSB associated with the same entity ID as that associated with the CBD/NBI threshold in q1, q10, or q11, and apply the CBD/NBI threshold associated with an entity ID to the L1-RSRP measurement obtained from a CSI-RS resource associated with the same entity ID as that associated with the CBD/NBI threshold in q1, q10, or q11 after scaling a respective CSI-RS reception power with a value provided by powerControlOffsetSS associated with the same entity ID as that associated with the CBD/NBI threshold.

According to the L1-RSRP measurements, the UE could identify the periodic CSI-RS resource configuration index or SSB index associated with the (same) entity ID from q1, q10, or q11, denoted by q_new_separate, that corresponds to the largest/highest measured L1-RSRP among the one or more NBI RSs associated with the (same) entity ID in q1, q10, or q11 larger than or equal to the CBD/NBI threshold associated with the (same) entity ID.

For instance, after the UE has declared beam failure for one or more BFD RSs (corresponding to one or more SSB indexes or one or more periodic CSI-RS resource configuration indexes) associated with a PCI/PCI index (e.g., the serving cell PCI/PCI index or a PCI/PCI index different from the serving cell PCI/PCI index) or a value of CORESETPoolIndex (e.g., 0 or 1) in q0, q00, or q01, the UE could assess the radio link quality according to one or more NBI RSs (corresponding to one or more SSB indexes or one or more periodic CSI-RS resource configuration indexes) associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the one or more BFD RSs in q1, q10, or q11 against the CBD/NBI threshold (e.g., Qin0 or Qin1) associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the one or more BFD RSs.

The UE may apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a SSB associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1) in q1, q10, or q11, and apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a CSI-RS resource associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1) in q1, q10, or q11 after scaling a respective CSI-RS reception power with a value provided by powerControlOffsetSS associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1).

According to the L1-RSRP measurements, the UE could identify the periodic CSI-RS resource configuration index or SSB index associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the one or more BFD RSs from q1, q10, or q11, denoted by q_new_separate, that corresponds to the largest/highest measured L1-RSRP among the one or more NBI RSs associated with the same PCI/PCI index (e.g., the serving cell PCI/PCI index or a PCI/PCI index different from the serving cell PCI/PCI index) or the same value of CORESETPoolIndex (e.g., 0 or 1) associated with the one or more BFD RSs in q1, q10, or q11 larger than or equal to the CBD/NBI threshold (e.g., Qin0 or Qin1) associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the one or more BFD RSs.

In another example (example-4.2.32), after the UE has declared beam failure for one or more BFD RSs (corresponding to one or more SSB indexes or one or more periodic CSI-RS resource configuration indexes) associated with an entity ID in q0, q00, or q01, the UE could assess the radio link quality according to one or more NBI RSs (corresponding to one or more SSB indexes or one or more periodic CSI-RS resource configuration indexes)—e.g., all of the NBI RSs—in q1, q10, or q11 associated with the (same) entity ID against the CBD/NBI threshold associated with the (same) entity ID.

The UE may apply the CBD/NBI threshold associated with an entity ID to the L1-RSRP measurement obtained from a SSB in q1, q10, or q11 associated with the same entity ID as that associated with the CBD/NBI threshold, and apply the CBD/NBI threshold associated with an entity ID to the L1-RSRP measurement obtained from a CSI-RS resource in q1, q10, or q11 associated with the same entity ID as that associated with the CBD/NBI threshold after scaling a respective CSI-RS reception power with a value provided by powerControlOffsetSS associated with the same entity ID as that associated with the CBD/NBI threshold.

According to the L1-RSRP measurements, the UE could identify the periodic CSI-RS resource configuration index or SSB index from q1, q10, or q11 associated with the (same) entity ID, denoted by q_new_separate, that corresponds to the largest/highest measured L1-RSRP among the one or more NBI RSs (e.g., all of the NBI RSs) in q1, q10, or q11 associated with the (same) entity ID larger than or equal to the CBD/NBI threshold associated with the (same) entity ID.

For instance, after the UE has declared beam failure for one or more BFD RSs (corresponding to one or more SSB indexes or one or more periodic CSI-RS resource configuration indexes) associated with a PCI/PCI index (e.g., the serving cell PCI/PCI index or a PCI/PCI index different from the serving cell PCI/PCI index) or a value of CORESETPoolIndex (e.g., 0 or 1) in q0, q00, or q01, the UE could assess the radio link quality according to one or more NBI RSs (corresponding to one or more SSB indexes or one or more periodic CSI-RS resource configuration indexes)—e.g., all of the NBI RSs—in q1, q10, or q11 associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the one or more BFD RSs against the CBD/NBI threshold (e.g., Qin0 or Qin1) associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the one or more BFD RSs.

The UE may apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a SSB in q1, q10, or q11 associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1), and apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a CSI-RS resource in q1, q10, or q11 associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1) after scaling a respective CSI-RS reception power with a value provided by powerControlOffsetSS associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1).

According to the L1-RSRP measurements, the UE could identify the periodic CSI-RS resource configuration index or SSB index from q1, q10, or q11 associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the one or more BFD RSs, denoted by q_new_separate, that corresponds to the largest/highest measured L1-RSRP among the one or more NBI RSs (e.g., among all of the NBI RSs) in q1, q10, or q11 associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the one or more BFD RSs larger than or equal to the CBD/NBI threshold (e.g., Qin0 or Qin1) associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the one or more BFD RSs.

In yet another example (example-4.2.33), after the UE has declared beam failure for one or more BFD RSs (corresponding to one or more SSB indexes or one or more periodic CSI-RS resource configuration indexes) associated with an entity ID in q0, q00, or q01, the UE could assess the radio link quality according to one or more NBI RSs (corresponding to one or more SSB indexes or one or more periodic CSI-RS resource configuration indexes)—e.g., according to all of the NBI RSs—in q1, q10, or q11 against a CBD/NBI threshold denoted by Qin_joint. The UE may apply the CBD/NBI threshold Qin_joint to the L1-RSRP measurement obtained from a SSB in q1, q10, or q11, and apply the CBD/NBI threshold Qin_joint to the L1-RSRP measurement obtained from a CSI-RS resource in q1, q10, or q11 after scaling a respective CSI-RS reception power with a value provided by powerControlOffsetSS.

According to the L1-RSRP measurements, the UE could identify the periodic CSI-RS resource configuration index or SSB index from q1, q10, or q11, denoted by q_new_joint, that corresponds to the largest/highest measured L1-RSRP among the one or more NBI RSs (e.g., among all of the NBI RSs) in q1, q10, or q11 larger than or equal to the CBD/NBI threshold Qin_joint.

In yet another example (example-4.2.34), after the UE has declared beam failure for one or more BFD RSs (corresponding to one or more SSB indexes or one or more periodic CSI-RS resource configuration indexes) associated with an entity ID in q0, q00, or q01, the UE could assess the radio link quality according to one or more NBI RSs (corresponding to one or more SSB indexes or one or more periodic CSI-RS resource configuration indexes) associated with a reference entity ID in q1, q10, or q11 against a CBD/NBI threshold denoted by Qin_ref. The UE may apply the CBD/NBI threshold Qin_ref to the L1-RSRP measurement obtained from a SSB associated with the reference entity ID in q1, q10, or q11, and apply the CBD/NBI threshold Qin_ref to the L1-RSRP measurement obtained from a CSI-RS resource associated with the reference entity ID in q1, q10, or q11 after scaling a respective CSI-RS reception power with a value provided by powerControlOffsetSS associated with the reference entity ID.

According to the L1-RSRP measurements, the UE could identify the periodic CSI-RS resource configuration index or SSB index associated with the reference entity ID from q1, q10, or q11, denoted by q_new_ref, that corresponds to the largest/highest measured L1-RSRP among the one or more NBI RSs associated with the reference entity ID in q1, q10, or q11 larger than or equal to the CBD/NBI threshold Qin_ref. The reference entity ID could correspond to the serving cell PCI/PCI index or value 1 of CORESETPoolIndex or CORESETPoolIndex value associated with the serving cell PCI/PCI index. Optionally, the UE could be provided/configured by the network the reference entity ID via higher layer RRC signaling or MAC CE command or DCI format.

In yet another example (example-4.2.35), after the UE has declared beam failure for one or more BFD RSs (corresponding to one or more SSB indexes or one or more periodic CSI-RS resource configuration indexes) associated with an entity ID in q0, q00, or q01, the UE could assess the radio link quality according to one or more NBI RSs (corresponding to one or more SSB indexes or one or more periodic CSI-RS resource configuration indexes)—e.g., all of the NBI RSs—in q1, q10, or q11 associated with a reference entity ID against a CBD/NBI threshold denoted by Qin_ref. The UE may apply the CBD/NBI threshold Qin_ref to the L1-RSRP measurement obtained from a SSB in q1, q10, or q11 associated with the reference entity ID, and apply the CBD/NBI threshold Qin_ref to the L1-RSRP measurement obtained from a CSI-RS resource in q1, q10, or q11 associated with the reference entity ID after scaling a respective CSI-RS reception power with a value provided by powerControlOffsetSS associated with the reference entity ID.

According to the L1-RSRP measurements, the UE could identify the periodic CSI-RS resource configuration index or SSB index associated from q1, q10, or q11 with the reference entity ID, denoted by q_new_ref, that corresponds to the largest/highest measured L1-RSRP among the one or more NBI RSs (e.g., all of the NBI RSs) in q1, q10, or q11 associated with the reference entity ID larger than or equal to the CBD/NBI threshold Qin_ref. The reference entity ID could correspond to the serving cell PCI/PCI index or value 1 of CORESETPoolIndex or CORESETPoolIndex value associated with the serving cell PCI/PCI index. Optionally, the UE could be provided/configured by the network the reference entity ID via higher layer RRC signaling or MAC CE command or DCI format.

In yet another example (example-4.2.36), after the UE has declared beam failure for q0, q00, or q01 associated with an entity ID, the UE could assess the radio link quality according to one or more NBI RSs (corresponding to one or more SSB indexes or one or more periodic CSI-RS resource configuration indexes) associated with the (same) entity ID in q1, q10, or q11 against the CBD/NBI threshold associated with the (same) entity ID. The UE may apply the CBD/NBI threshold associated with an entity ID to the L1-RSRP measurement obtained from a SSB associated with the same entity ID as that associated with the CBD/NBI threshold in q1, q10, or q11, and apply the CBD/NBI threshold associated with an entity ID to the L1-RSRP measurement obtained from a CSI-RS resource associated with the same entity ID as that associated with the CBD/NBI threshold in q1, q10, or q11 after scaling a respective CSI-RS reception power with a value provided by powerControlOffsetSS associated with the same entity ID as that associated with the CBD/NBI threshold.

According to the L1-RSRP measurements, the UE could identify the periodic CSI-RS resource configuration index or SSB index associated with the reference entity ID from q1, q10, or q11, denoted by q_new_separate, that corresponds to the largest/highest measured L1-RSRP among the one or more NBI RSs associated with the (same) entity ID in q1, q10, or q11 larger than or equal to the CBD/NBI threshold associated with the (same) entity ID.

For example, after the UE has declared beam failure for q00 associated with a PCI/PCI index (e.g., the serving cell PCI/PCI index) or a value of CORESETPoolIndex (e.g., 0), the UE could assess the radio link quality according to one or more NBI RSs (corresponding to one or more SSB indexes or one or more periodic CSI-RS resource configuration indexes) associated with the same PCI/PCI index (e.g., the serving cell PCI/PCI index) or the same value of CORESETPoolIndex (e.g., 0) as that associated with q00 against the CBD/NBI threshold (e.g., Qin0) associated with the same PCI/PCI index (e.g., the serving cell PCI/PCI index) or the same value of CORESETPoolIndex (e.g., 0) as that associated with q00.

The UE may apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a SSB associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1) in q1, q10, or q11, and apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a CSI-RS resource associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1) in q1, q10, or q11 after scaling a respective CSI-RS reception power with a value provided by powerControlOffsetSS associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1).

According to the L1-RSRP measurements, the UE could identify the periodic CSI-RS resource configuration index or SSB index associated with the same PCI/PCI index (e.g., the serving cell PCI/PCI index) or the same value of CORESETPoolIndex (e.g., 0) as that associated with q00 from q1, q10, or q11, denoted by q_new_separate, that corresponds to the largest/highest measured L1-RSRP among the one or more NBI RSs associated with the same PCI/PCI index (e.g., the serving cell PCI/PCI index) or the same value of CORESETPoolIndex (e.g., 0) as that associated with q00 in q1, q10, or q11 larger than or equal to the CBD/NBI threshold (e.g., Qin0) associated with the same PCI/PCI index (e.g., the serving cell PCI/PCI index) or the same value of CORESETPoolIndex (e.g., 0) as that associated with q00.

For another example, after the UE has declared beam failure for q01 associated with a PCI/PCI index (e.g., a PCI/PCI index different from the serving cell PCI/PCI index) or a value of CORESETPoolIndex (e.g., 1), the UE could assess the radio link quality according to one or more NBI RSs (corresponding to one or more SSB indexes or one or more periodic CSI-RS resource configuration indexes)

associated with the same PCI/PCI index (e.g., a PCI/PCI index different from the serving cell PCI/PCI index) or the same value of CORESETPoolIndex (e.g., 1) as that associated with q01 against the CBD/NBI threshold (e.g., Qin1) associated with the same PCI/PCI index (e.g., a PCI/PCI index different from the serving cell PCI/PCI index) or the same value of CORESETPoolIndex (e.g., 1) as that associated with q01.

The UE may apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a SSB associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1) in q1, q10, or q11, and apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a CSI-RS resource associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1) in q1, q10, or q11 after scaling a respective CSI-RS reception power with a value provided by powerControlOffsetSS associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1).

According to the L1-RSRP measurements, the UE could identify the periodic CSI-RS resource configuration index or SSB index associated with the same PCI/PCI index (e.g., a PCI/PCI index different from the serving cell PCI/PCI index) or the same value of CORESETPoolIndex (e.g., 1) as that associated with q01 from q1, q10, or q11, denoted by q_new_separate, that corresponds to the largest/highest measured L1-RSRP among the one or more NBI RSs associated with the same PCI/PCI index (e.g., a PCI/PCI index different from the serving cell PCI/PCI index) or the same value of CORESETPoolIndex (e.g., 1) as that associated with q01 in q1, q10, or q11 larger than or equal to the CBD/NBI threshold (e.g., Qin1) associated with the same PCI/PCI index (e.g., a PCI/PCI index different from the serving cell PCI/PCI index) or the same value of CORESETPoolIndex (e.g., 1) as that associated with q01.

In yet another example (example-4.2.37), after the UE has declared beam failure for q0, q00, or q01 associated with an entity ID, the UE could assess the radio link quality according to one or more NBI RSs (corresponding to one or more SSB indexes or one or more periodic CSI-RS resource configuration indexes)—e.g., all of the NBI RSs—in q1, q10, or q11 associated with the (same) entity ID against the CBD/NBI threshold associated with the (same) entity ID. The UE may apply the CBD/NBI threshold associated with an entity ID to the L1-RSRP measurement obtained from a SSB in q1, q10, or q11 associated with the same entity ID as that associated with the CBD/NBI threshold, and apply the CBD/NBI threshold associated with an entity ID to the L1-RSRP measurement obtained from a CSI-RS resource in q1, q10, or q11 associated with the same entity ID as that associated with the CBD/NBI threshold after scaling a respective CSI-RS reception power with a value provided by powerControlOffsetSS associated with the same entity ID as that associated with the CBD/NBI threshold.

According to the L1-RSRP measurements, the UE could identify the periodic CSI-RS resource configuration index or SSB index from q1, q10, or q11 associated with the (same) entity ID, denoted by q_new_separate, that corresponds to the largest/highest measured L1-RSRP among the one or more NBI RSs (e.g., all of the NBI RSs) in q1, q10, or q11 associated with the (same) entity ID larger than or equal to the CBD/NBI threshold associated with the (same) entity ID.

For example, after the UE has declared beam failure for q00 associated with a PCI/PCI index (e.g., the serving cell PCI/PCI index) or a value of CORESETPoolIndex (e.g., 0), the UE could assess the radio link quality according to one or more NBI RSs (corresponding to one or more SSB indexes or one or more periodic CSI-RS resource configuration indexes)—e.g., all of the NBI RSs—in q10 associated with the same PCI/PCI index (e.g., the serving cell PCI/PCI index) or the same value of CORESETPoolIndex (e.g., 0) as that associated with q00 against the CBD/NBI threshold (e.g., Qin0) associated with the same PCI/PCI index (e.g., the serving cell PCI/PCI index) or the same value of CORESETPoolIndex (e.g., 0) as that associated with q00.

The UE may apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a SSB in q1, q10, or q11 associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1), and apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a CSI-RS resource in q1, q10, or q11 associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1) after scaling a respective CSI-RS reception power with a value provided by powerControlOffsetSS associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1).

According to the L1-RSRP measurements, the UE could identify the periodic CSI-RS resource configuration index or SSB index from q10 associated with the same PCI/PCI index (e.g., the serving cell PCI/PCI index) or the same value of CORESETPoolIndex (e.g., 0) as that associated with q00, denoted by q_new_separate, that corresponds to the largest/highest measured L1-RSRP among the one or more NBI RSs (e.g., among all of the NBI RSs) in q10 associated with the same PCI/PCI index (e.g., the serving cell PCI/PCI index) or the same value of CORESETPoolIndex (e.g., 0) as that associated with q00 larger than or equal to the CBD/NBI threshold (e.g., Qin0) associated with the same PCI/PCI index (e.g., the serving cell PCI/PCI index) or the same value of CORESETPoolIndex (e.g., 0) as that associated with q00.

For another example, after the UE has declared beam failure for q01 associated with a PCI/PCI index (e.g., a PCI/PCI index different from the serving cell PCI/PCI index) or a value of CORESETPoolIndex (e.g., 1), the UE could assess the radio link quality according to one or more NBI RSs (corresponding to one or more SSB indexes or one or more periodic CSI-RS resource configuration indexes)—e.g., all of the NBI RSs—in q11 associated with the same PCI/PCI index (e.g., a PCI/PCI index different from the serving cell PCI/PCI index) or the same value of CORESETPoolIndex (e.g., 1) as that associated with q01 against the CBD/NBI threshold (e.g., Qin1) associated with the same PCI/PCI index (e.g., a PCI/PCI index different from the serving cell PCI/PCI index) or the same value of CORESETPoolIndex (e.g., 1) as that associated with q01.

The UE may apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a SSB in q1, q10, or q11 associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1), and apply the CBD/NBI threshold (e.g., Qin0 or Qin1) associated with a PCI/PCI index (e.g., the serving cell PCI/PCI index or a PCI/PCI index different from the serving cell PCI/PCI index) or a value of CORESETPoolIndex (e.g., 0 or 1) to the L1-RSRP measurement obtained from a CSI-RS resource in q1, q10, or q11 associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1) after scaling a respective CSI-RS reception power with a value provided by powerControlOffsetSS associated with the same PCI/PCI index (e.g., the serving cell PCI/PCI index or a PCI/PCI index different from the serving cell PCI/PCI index) or the same value of CORESETPoolIndex (e.g., 0 or 1) as that associated with the CBD/NBI threshold (e.g., Qin0 or Qin1).

According to the L1-RSRP measurements, the UE could identify the periodic CSI-RS resource configuration index or SSB index from q11 associated with the same PCI/PCI index (e.g., a PCI/PCI index different from the serving cell PCI/PCI index) or the same value of CORESETPoolIndex (e.g., 1) as that associated with q01, denoted by q_new_separate, that corresponds to the largest/highest measured L1-RSRP among the one or more NBI RSs (e.g., among all of the NBI RSs) in q11 associated with the same PCI/PCI index (e.g., a PCI/PCI index different from the serving cell PCI/PCI index) or the same value of CORESETPoolIndex (e.g., 1) as that associated with q01 larger than or equal to the CBD/NBI threshold (e.g., Qin1) associated with the same PCI/PCI index (e.g., a PCI/PCI index different from the serving cell PCI/PCI index) or the same value of CORESETPoolIndex (e.g., 1) as that associated with q01.

In yet another example (example-4.2.38), after the UE has declared beam failure for q0, q00, or q01 associated with an entity ID, the UE could assess the radio link quality according to one or more NBI RSs (corresponding to one or more SSB indexes or one or more periodic CSI-RS resource configuration indexes)—e.g., according to all of the NBI RSs—in q1, q10, or q11 against a CBD/NBI threshold denoted by Qin_joint. The UE may apply the CBD/NBI threshold Qin_joint to the L1-RSRP measurement obtained from a SSB in q1, q10, or q11, and apply the CBD/NBI threshold Qin_joint to the L1-RSRP measurement obtained from a CSI-RS resource in q1, q10, or q11 after scaling a respective CSI-RS reception power with a value provided by powerControlOffsetSS.

According to the L1-RSRP measurements, the UE could identify the periodic CSI-RS resource configuration index or SSB index from q1, q10, or q11, denoted by q_new_joint, that corresponds to the largest/highest measured L1-RSRP among the one or more NBI RSs (e.g., among all of the NBI RSs) in q1, q10, or q11 larger than or equal to the CBD/NBI threshold Qin_joint.

In yet another example (example-4.2.39), after the UE has declared beam failure for q0, q00, or q01 associated with an entity ID, the UE could assess the radio link quality according to one or more NBI RSs (corresponding to one or more SSB indexes or one or more periodic CSI-RS resource configuration indexes) associated with a reference entity ID in q1, q10, or q11 against a CBD/NBI threshold denoted by Qin_ref. The UE may apply the CBD/NBI threshold Qin_ref to the L1-RSRP measurement obtained from a SSB associated with the reference entity ID in q1, q10, or q11, and apply the CBD/NBI threshold Qin_ref to the L1-RSRP measurement obtained from a CSI-RS resource associated with the reference entity ID in q1, q10, or q11 after scaling a respective CSI-RS reception power with a value provided by powerControlOffsetSS associated with the reference entity ID.

According to the L1-RSRP measurements, the UE could identify the periodic CSI-RS resource configuration index or SSB index associated with the reference entity ID from q1, q10, or q11, denoted by q_new_ref, that corresponds to the largest/highest measured L1-RSRP among the one or more NBI RSs associated with the reference entity ID in q1, q10, or q11 larger than or equal to the CBD/NBI threshold Qin_ref. The reference entity ID could correspond to the serving cell PCI/PCI index or value 1 of CORESETPoolIndex or CORESETPoolIndex value associated with the serving cell PCI/PCI index. Optionally, the UE could be provided/configured by the network the reference entity ID via higher layer RRC signaling or MAC CE command or DCI format.

In yet another example (example-4.2.40), after the UE has declared beam failure for q0, q00, or q01 associated with an entity ID, the UE could assess the radio link quality according to one or more NBI RSs (corresponding to one or more SSB indexes or one or more periodic CSI-RS resource configuration indexes)—e.g., all of the NBI RSs—in q1, q10, or q11 associated with a reference entity ID against a CBD/NBI threshold denoted by Qin_ref. The UE may apply the CBD/NBI threshold Qin_ref to the L1-RSRP measurement obtained from a SSB in q1, q10, or q11 associated with the reference entity ID, and apply the CBD/NBI threshold Qin_ref to the L1-RSRP measurement obtained from a CSI-RS resource in q1, q10, or q11 associated with the reference entity ID after scaling a respective CSI-RS reception power with a value provided by powerControlOffsetSS associated with the reference entity ID.

According to the L1-RSRP measurements, the UE could identify the periodic CSI-RS resource configuration index or SSB index associated from q1, q10, or q11 with the reference entity ID, denoted by q_new_ref, that corresponds to the largest/highest measured L1-RSRP among the one or more NBI RSs (e.g., all of the NBI RSs) in q1, q10, or q11 associated with the reference entity ID larger than or equal to the CBD/NBI threshold Qin_ref. The reference entity ID could correspond to the serving cell PCI/PCI index or value 1 of CORESETPoolIndex or CORESETPoolIndex value associated with the serving cell PCI/PCI index. Optionally, the UE could be provided/configured by the network via the reference entity ID via higher layer RRC signaling or MAC CE command or DCI format.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to receive, via higher layer signaling, a first configuration of a plurality of transmission configuration indication (TCI) states and a second configuration of a control resource set (CORESET); and
a processor operably coupled to the transceiver, the processor configured to:
perform physical downlink control channel (PDCCH) monitoring on the CORESET based on two TCI states of the CORESET,
identify a beam failure detection (BFD) reference signal (RS) set including RS indexes in RSs associated with the two TCI states, and
detect beam failure based on the BFD RS set.

2. The UE of claim 1, wherein the RSs are downlink (DL) RSs of the two TCI states for quasi-colocation (QCL).

3. The UE of claim 2, wherein:
the transceiver is further configured to receive a demodulation reference signal (DM-RS) of a PDCCH in the CORESET,
the UE is configured with a single frequency network (SFN) scheme for the PDCCH, and
the DM-RS is quasi co-located with the DL RSs of the two TCI states.

4. The UE of claim 1, wherein the transceiver is further configured to receive a medium access control control element (MAC CE) including activation of the two TCI states among the plurality of the TCI states.

5. A base station (BS), comprising:
a processor; and
a transceiver operably coupled with the processor, the transceiver configured to transmit, to a user equipment (UE) via higher layer signaling, (i) a first configuration of a plurality of transmission configuration indication (TCI) states and (ii) a second configuration of a control resource set (CORESET)
wherein physical downlink control channel (PDCCH) monitoring on the CORESET is based on two TCI states of the CORESET,
wherein a beam failure detection (BFD) reference signal (RS) set includes RS indexes in RSs associated with the two TCI states, and
wherein beam failure detection is based on the BFD RS set.

6. The BS of claim 5, wherein the RSs are downlink (DL) RSs of the two TCI states for quasi-colocation (QCL).

7. The BS of claim 6, wherein:
the transceiver is further configured to transmit a demodulation reference signal (DM-RS) of a PDCCH in the CORESET,
the UE is configured with a single frequency network (SFN) scheme for the PDCCH, and
the DM-RS is quasi co-located with the DL RSs of the two TCI states.

8. The BS of claim 5 wherein the transceiver is further configured to transmit a medium access control control element (MAC CE) including activation of the two TCI states among the plurality of the TCI states.

9. A method of operating a user equipment (UE), the method comprising:
receiving, via higher layer signaling, a first configuration of a plurality of transmission configuration indication (TCI) states and a second configuration of a control resource set (CORESET);
performing physical downlink control channel (PDCCH) monitoring on the CORESET based on two TCI states of the CORESET;
identifying a beam failure detection (BFD) reference signal (RS) set including RS indexes in RSs associated with the two TCI states; and
detecting beam failure based on the BFD RS set.

10. The method of claim 9, wherein the RSs are downlink (DL) RSs of the two TCI states for quasi-colocation (QCL).

11. The method of claim 10, further comprising:
receiving a demodulation reference signal (DM-RS) of a PDCCH in the CORESET,
wherein the UE is configured with a single frequency network (SFN) scheme for the PDCCH, and
wherein the DM-RS is quasi co-located with the DL RSs of the two TCI states.

12. The method of claim 9, further comprising receiving a medium access control control element (MAC CE) including activation of the two TCI states among the plurality of the TCI states.

13. The method of claim 9, wherein identifying the BFD RS set including the RS indexes in the RSs associated with the two TCI states further comprises identifying, based on identification that the CORESET for the PDCCH monitoring is associated with the two TCI states, that the BFD RS set includes the RS indexes in the RSs associated with the two TCI states.

14. The UE of claim 1, wherein the processor is further configured to identify, based on identification that the CORESET for the PDCCH monitoring is associated with the two TCI states, that the BFD RS set includes the RS indexes in the RSs associated with the two TCI states.

15. The BS of claim 5, wherein the CORESET for the PDCCH monitoring being associated with the two TCI states indicates that the BFD RS set includes the RS indexes in the RSs associated with the two TCI states.

* * * * *